(12) United States Patent
Imafuku et al.

(10) Patent No.: US 6,564,054 B1
(45) Date of Patent: *May 13, 2003

(54) MOBILE COMMUNICATION SYSTEM

(75) Inventors: Keiko Imafuku, Fukuoka (JP);
Tomoko Yamashita, Fukuoka (JP);
Kouji Sugiyama, Fukuoka (JP);
Hironaga Miyazaki, Fukuoka (JP);
Koichi Yoshida, Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,237

(22) Filed: Aug. 4, 1999

(30) Foreign Application Priority Data

Feb. 19, 1999 (JP) ............................................. 11-041588

(51) Int. Cl.[7] .................................................. H04Q 7/20
(52) U.S. Cl. ........................ 455/432; 455/445; 455/435; 379/221.01
(58) Field of Search ................................ 455/422, 426, 455/432, 435, 439, 462, 465, 520, 7, 20, 554, 555, 445; 379/219, 220.01, 221.01–221.15; 370/217

(56) References Cited

U.S. PATENT DOCUMENTS

| 5,455,855 | A | * | 10/1995 | Hokari ................... 379/221.01 |
| 5,675,577 | A | * | 10/1997 | Komatsu ............... 379/221.01 |
| 5,726,975 | A | * | 3/1998 | Ito ......................... 379/221.01 |
| 5,930,348 | A | * | 7/1999 | Regnier et al. ........ 379/221.01 |
| 6,212,395 | B1 | * | 4/2001 | Lu et al. ..................... 455/465 |
| 6,282,423 | B1 | * | 8/2001 | Scott, II ..................... 455/439 |

FOREIGN PATENT DOCUMENTS

| JP | 6-269043 | 9/1994 |
| JP | 9-247741 | 9/1997 |

* cited by examiner

*Primary Examiner*—Lee Nguyen
*Assistant Examiner*—Simon Nguyen
(74) *Attorney, Agent, or Firm*—Katten Muchin Zavis Rosenman

(57) ABSTRACT

In a mobile communication system comprising a PBX connected to a mobile communication network through an interface unit and having a semi-public roaming function, a first PBX is connected to a second PBX having the semi-public roaming function with a leased circuit. The first PBX transmits a position registration/call transmission request of a PHS received by itself to a mobile communication network through the second PBX. The second PBX transmits a call reception request addressed to the PHS from the mobile communication network to the PHS through the first PBX.

16 Claims, 47 Drawing Sheets

MOBILE COMMUNICATION SYSTEM

BACKGROUND OF THE INVENTION

1. Field of the Invention

The present invention relates to a mobile communication system, and in particular to a mobile communication system composed of a private branch exchange (hereinafter occasionally abbreviated as PBX) connected to a mobile communication network through an interface unit and having a semi-public roaming function.

In recent years, with the semi (quasi)-public roaming function by which a public PHS (hereinafter simply referred to as PHS) as a mobile station can have services equal to those in the mobile communication network through a base station within the PBX, utilities of the PHS have been spread. It is important to certainly perform a position registration, a call transmission and a call reception between the PHS and the mobile communication network so that the PHS may have the services equal to those in the mobile communication network.

2. Description of the Related Art

FIG. 52 shows an arrangement of a prior art mobile communication system. This mobile communication system is composed of a base station (hereinafter abbreviated as BS) 19 having a PHS 22 within a semi-public area 80, a PBX 16 having a semi-public roaming function and accommodating the BS 19, and a PIU (PHS Interface Unit) 13 connecting the PBX 16 to a mobile communication network 10.

The mobile communication network 10 accommodates a public base station 91 which exists in a public base station management area 90 and is connected to a fixed communication network 92 to form a public communication network 93.

The PHS 22 makes a position registration in the mobile communication network 10 through the BS 19, the PBX 16, and the PIU 13. The PHS 22 controls the call transmission, the call reception, or the like together with a mobile station (not shown) existing in the area 90 or a telephone 94 accommodated in the fixed communication network 92.

Namely, the PBX 16 mediates a position registration and a call from the PHS 22 existing in the semi-public area 80 not covered with a radio wave of the public base station 91 to the mobile communication network 10 and a call from the mobile communication network 10 to the PHS, thereby enabling communications therebetween.

FIG.53 shows a principle of the position registration by the semi-public roaming function of the PBX 16. BS's 19 and 20 existing in general calling areas 81 and 82 respectively including PHS's 22 and 23 are accommodated in the PBX 16. This PBX 16 controls all of the PHS's existing in the semi-public area 80 including the areas 81 and 82 and is connected to the mobile communication network 10 through the PIU 13.

The PBX 16 makes a position registration in the mobile communication network 10 with a "normalizing call area No." corresponding to the general calling area where the PHS exists as PHS position information. The position information of the PHS's 22 and 23, for instance, is supposed to have the "normalizing call area No." of e.g. "1" and "2" respectively corresponding to the general calling areas 81 and 82 where the PHS's 22 and 23 exist for performing the position registration.

This will be described referring to a position registration sequence shown in FIG. 54. The BS 19 receives a SETUP message (position registering request) including a PS No. and the like from the PHS 22 to transmit the message to the PBX 16 (at step R10).

The PBX 16 returns a CALL-PROC message to the BS 19 and converts the SETUP message into a REGISTER message by the addition of the "normalizing call area No."="1" corresponding to the general calling area 81 (the BS 19) where the PHS 22 exists to transmit the REGISTER message to the PIU 13.

The PIU 13 stores the "normalizing call area No."="1" and transmits the REGISTER message excluding the "normalizing call area No." to the mobile communication network 10 to make the position registering request (at step R11).

Hereinafter, a FACILITY message (a certification request) from the mobile communication network 10 is converted into an INFO message at the PBX 16 to be sent to the BS 19 (and in turn the PHS 22) (at step R12), the INFO message (a certification response) from the BS 19 being converted into the FACILITY message to be transmitted to the mobile communication network 10 (at step R13), so that an REL-COMP message from the mobile communication network 10 is converted into a DISC message to be transmitted to the BS 19 (at step R14).

An REL message and the REL-COMP message are transmitted/received between the BS 19 and the PBX 16 to finish the position registration (at steps R15 and R16).

FIG. 55 shows a call reception sequence by the semi-public roaming function. When receiving a calling No., a called number, and the SETUP message (call reception request) including the PS No. from the mobile communication network 10, the PIU 13 prepares a SETUP message added with the "normalizing call area No." stored and transmits the SETUP message to the PBX 16.

The PBX 16 transmits the SETUP message excluding the "normalizing call area No." to the BS 19 (and in turn the PHS 22) corresponding to the "normalizing call area No." included in the received SETUP message (at step R20).

Hereinafter, the CALL-PROC message is transmitted from the BS 19 to the mobile communication network 10 (at step R21). After the messages of the certification request and the certification response are transmitted/received (at steps R22 and R23) in the same way as the position registering sequence, an ALERT message and a CONN message are sequentially transmitted from the BS 19 to the mobile communication network 10 (at steps R24 and R25). After a CONN-ACK message which is a response message of the CONN message is transmitted from the mobile communication network 10 to the BS 19 (at step R26), the communication is started (at step R27).

Next, a call transmission sequence by the semi-public roaming function will be described referring to FIG. 56.

The BS 19 transmits the SETUP message including the calling No., the called number and the PS No. to the mobile communication network 10 through the PBX 16 and the PIU 13 (at step R30). After transmitting the CALL-PROC message to the BS 19 (at step R31), the mobile communication network 10 transmits/receives the messages of the certification request and the certification response to/from the BS 19 (at steps R32 and R33).

After the ALERT message and the CONN message are transmitted from the mobile communication network 10 to the BS 19 through an RBT (Ring Back Tone) step (at steps R34, R35, and R36), the communication is started (at step R37).

When none of the PIU's connected to the PBX 16 is available due to a fault, congestion, non-equipping, and the like in such a prior art mobile communication system, it become impossible to perform the position registration or the call transmission from the PHS 22 and the call reception to the PHS 22. Accordingly, the PHS 22 is not able to communicate with the mobile communication network 10 through the PBX 16 having the semi-public roaming function unless the PIU becomes available after recovering from the fault, relieving the congestion, being equipped, or the like.

SUMMARY OF THE INVENTION

It is accordingly an object of the present invention to provide a mobile communication system composed of a PBX connected to a mobile communication network and having a semi-public roaming function wherein communications are realized between a PHS and a mobile communication network through the PBX where a PIU is not equipped or is unavailable.

In order to achieve the above-mentioned object, a mobile communication system, according to claim 1, of the present invention comprises; a first exchange for accommodating a base station which communicates with a mobile station, and a second exchange having a semi-public roaming function connected to the first exchange with a leased circuit and connected to a mobile communication network through an interface unit; the first exchange having a converting means for converting position information of the mobile station as prestored therein into virtual position information peculiar to the mobile communication network and for transmitting the virtual position information to the interface unit through the second exchange, and the second exchange having a transmission setting means for setting a transmission of response information from the mobile communication network for the virtual position information to the first exchange.

According to claim 2, the first and the second exchanges may comprise PBX's.

This will be described referring to an operation principle (1) shown in FIG. 1. The mobile communication system is composed of a base station (BS) 19, a mobile station (PHS) 22 within a management area 81 of the base station 19, a first private branch exchange (PBX) 16 accommodating the base station 19, a second PBX 17 connected to the PBX 16 through, e.g. leased circuit trunks (hereinafter simply referred to as leased circuit) 25 and 26, and an interface unit (PIU) 14 connecting the PBX 17 to a mobile communication network 10.

The PBX 16 and the PBX 17 respectively include the converting means and the transmitting setting means.

① When the PBX 16 receives the position information from the PHS 22 through the base station 19, the converting means of the PBX 16 determines the position of the PHS 22 with an allocated number of the base station 19 being made a key and converts the position information into virtual position information peculiar to the mobile communication network 10 to transmit the same to the PBX 17 through the leased circuit 25.

② The PBX 17 transmits the virtual position information received through the leased circuit 26 to the mobile communication network 10 through the PIU 14. At the same time, the transmitting setting means of the PBX 17 decides that the virtual position information is transmitted from a station other than itself and sets the transmission of the response information from the mobile communication network 10 for the virtual position information to the PBX 16 through the leased circuit 26.

This operation enables the position information of the PHS 22 within the management area 81 for the base station 19 to be transmitted to the mobile communication network 10 through the PBX 17 and the PIU 14 without being abandoned even when any PIU is not connected to the PBX 16 so that the response information for the position information from the mobile communication network 10 can be transmitted to the PBX 16 through the PBX 17 (see ③ in FIG. 1).

Also, in the present invention according to claim 3, the position inform and the virtual position information may respectively comprise position registering information and virtual position registering information.

Namely, even when any PIU is not connected to the PBX 16 the position registering information of the PHS 22 can be converted into the virtual position registering information, transmitted to the mobile communication network 10 through the PBX 17 and the PIU 14 without being abandoned so that the response information for the position registering information from the mobile communication network 10 can be transmitted to the PHS 22 through the PIU 14 and the PBX 17.

Also, in the present invention according to claim 4, the position information and the virtual position information may respectively comprise calling information and virtual calling information including the position registering information.

Namely, also in the calling information including the position registering information similar to that of claim 3, the converting means of the PBX 16 prepares the virtual calling information which is the position information included in the calling information from the PHS 22 and converted into the virtual position information, and transmits the virtual calling information to the PBX 17. The PBX 17 transmits the virtual calling information to the mobile communication network 10 through the PIU 14. At the same time the transmitting setting means of the PBX 17 sets the transmission of the response information corresponding to the virtual calling information to the PBX 16.

This operation makes it possible for the PBX 16 to transmit/receive the calling information and the response information between the PBX 16 and the mobile communication network 10 through the PBX 17.

Also, in the present invention according to claim 5, the converting means may invert the virtual position information into the position information.

Namely, the converting means of the PBX 16 inverts the virtual position information included in the response information sent from the mobile communication network 10 to the PBX 16 through the PBX 17 into the position information so that the response information can be transmitted to the PHS 22 based on the position information (see ④ in FIG. 1).

Also, in the present invention according to claim 6, the transmission setting means may set a transmission of called information addressed to the mobile station position-registered from the mobile communication network to the first PBX.

Namely, the transmitting setting means of the PBX 17 sets the transmission of the called information addressed to the position-registered PHS 22 to the PBX 16.

This operation makes it possible for the PBX 17 to transmit the called information addressed to the PHS 22 position-registered as to the management area 81 of the BS 19 to the PBX 16 (see ③ in FIG. 1).

Also, in the present invention according to claim 7, the first PBX may be connected to the mobile communication network through an interface unit the first PBX itself accommodates to perform the semi-public roaming function, and the first PBX may have a decision means for deciding whether or not its own interface unit is available, transmit the position information to the mobile communication network through its own interface unit when the interface unit is available, and transmit the position information to the mobile communication network through the second PBX when the interface unit is unavailable.

This will be described referring to an operation principle (2) shown in FIG. 2. This mobile communication system is different from that shown in FIG. 1 in that the first PBX 16 accommodates a PIU 13 connected to the mobile communication network 10 and has a decision means for deciding whether or not the PIU 13 is available.

In operation, when the position information is transmitted to the mobile communication network 10, the decision means in the PBX 16 decides whether or not the PIU 13 is available. When the PIU 13 is available, the position information is transmitted through the PIU 13 to the mobile communication network 10 (see ① in FIG. 2). When the PIU 13 is unavailable, the position information is transmitted through the second PBX 17 to the mobile communication network 10 as mentioned above (see ② in FIG. 2).

This operation makes it possible to transmit the position information through the second PBX 17 even when the PIU 13 can not be used because of a fault or congestion.

Also, in the present invention according to claim 8, the first PBX may be connected to a plurality of PBX's which accommodate the interface unit of the mobile communication network with a leased circuit, and when its own interface unit is not available, the decision means may decide whether or not the leased circuit is available and transmit the position information through the available leased circuit.

This will be described referring to an operation principle (3) shown in FIG. 3. This mobile communication system is different from that shown in FIG. 2 in that a PBX 18 which accommodates a PIU 15 connected to the mobile communication network 10 is connected to the PBX 16 through leased circuits 27 and 28.

In operation, when the PIU 13 of its own station is unavailable (see ① in FIG. 3), the decision means of the PBX 16 decides whether or not the leased circuits 25 and 27 are available. Then the position information is transmitted through an available leased circuit, e.g. the leased circuit 27 (see ②, ③ in FIG. 3). The operation of the PBX 18 is the same as that of the PBX 17 shown in FIG. 2.

This operation makes it possible for the PBX 16 to transmit the position information of the PHS 22 to the mobile communication network 10 through the PBX connected to the available leased circuit when the PIU 13 which the PBX 16 accommodates is unavailable.

Also, in the present invention according to claim 9, the first PBX may include a means for transmitting an inquiry message inquiring whether or not the accommodated interface unit is available to another PBX through the leased circuit, and a PBX which has received the inquiry message may have a means for returning a response message for the inquiry message.

This will be described referring to an operation principle (4) shown in FIG. 4. This mobile communication system is different from that shown in FIG. 3 in that the PBX 16 has a PIU status inquiring means inquiring whether or not the PIU's 14 and 15 respectively connected to the PBX's 17 and 18 are available and that the PBX's 17 and 18 respectively have a PIU status response means responding the status of the PIU's 14 and 15.

In operation, when the PIU 13 is unavailable (see ① in FIG. 4), the PIU status inquiring means of the PBX 16 transmits to the PBX's 17 and 18 messages respectively inquiring whether or not the accommodated PIU's 14 and 15 are available through the leased circuits 25 and 27 (see ② in FIG. 4). The PIU status response means of the PBX's 17 and 18 which have received the messages returns the response message indicating whether or not their own PIU's are available to the PBX 16 (see ③ in FIG. 4). The PBX 16 transmits the above-mentioned position information to a PBX which has indicated that its own PIU is available.

This operation makes it possible for the PBX 16 to transmit the position information through the PBX accommodating the available PIU. Accordingly, even when the position information is sent to a PBX in which the leased circuit is available but the accommodated PIU is unavailable, the position information is prevented from being abandoned.

Also, in the present invention according to claim 10, PBX's except the first PBX may have a means for notifying the first PBX of unit status information indicating whether or not the accommodated interface unit is available, and the first PBX may have a means for transmitting the position information to a PBX which stores the unit status information and accommodates the available interface unit.

This will be described referring to an operation principle (5) shown in FIG. 5. This mobile communication system is different from that shown in FIG. 4 is that the PBX's 17 and 18 respectively have PIU status notifying means which notify the PBX 16 whether or not their own PIU's 14 and 15 are available and that the PBX 16 has a PIU status storage means for storing the PIU statuses of the PBX's 17 and 18.

In operation, the PIU status notifying means of the PBX's 17 and 18 notify the PBX 16 of the status indicating whether or not their own PIU's are available (see ① in FIG. 5). The PIU status storage means of the PBX 16 stores the statuses of the PIU's 14 and 15 which have received the notification. When the PBX 16 can not use its own PIU 13 (see ② in FIG. 5), the PBX 16 transmits the position information to the mobile communication network 10 through a PBX having an available PIU based on the PIU status storage means.

This operation makes it possible to prevent the position information from being sent to an PBX accommodating an unavailable PIU and being abandoned by referring to the PIU status storage means without inquiring statuses of the PIU's accommodated in the PBX's 17 and 18.

Also, in the present invention according to claim 11, the first PBX may have a means for selecting a PBX which accommodates the interface unit based on a preset priority.

This will be described referring to a principle (6) shown in FIG. 6. This mobile communication system is different from that shown in FIG. 3 in that the PBS 16 has a selecting means instead of the decision means.

Namely, the selecting means of the PBS 16 selects a PBX according to a preset priority and transmits the position information to the mobile communication network 10 through a selected PBX (see ①, ② in FIG. 6).

This operation makes it possible for a maintenance person to transmit the position information to the mobile communication network 10 through a preset PBX and to provide fine and careful services.

Also, in the present invention according to claim 12, the first PBX may have a means for sequentially and equally selecting a PBX which accommodates the interface unit.

Namely, with the selecting means shown in FIG. 6 the PBX 16 can select the PBX's 17 and 18 connected to the PBX 16 not according to the priority but sequentially.

This operation makes it possible to disperse a load by equally selecting the PBX's 17 and 18.

Also, in the present invention according to claim 13, the first PBX may have a means for selecting another PBX which forms a transmission object of the position information according to a preset time zone.

Namely, the selecting means shown in FIG. 6 presets a time zone when the PBX's 17 and 18 are substituted for the priority. According to this presetting, the selecting means selects the PBX and sends the position information to the mobile communication network 10 through the selected PBX.

Also, in the present invention according to claim 14, the first PBX may have a means for transmitting the position information through an interface unit of another PBX when the circuit available number of its own present interface unit is more than a preset circuit available number.

This will be described referring to an operation principle (7) shown in FIG. 7. This mobile communication system is different from that shown in FIG. 2 in that the PBX 16 has an available PIU circuit number-management means instead of the decision means.

Namely, the management means compares a circuit number presently used at the PIU 13 with a preset available circuit number and controls the circuit to transmit the position information through another interface unit when an occupied circuit number is larger than the available circuit number.

This operation makes it possible to perform the position registration or the call transmission request through the leased circuit and the PIU of another PBX and to disperse the load when the available circuit of the PIU 13 has reached a fixed usage status.

Also, in the present invention according to claim 15, the first PBX may accommodate a plurality of base stations and may have a means for designating a PBX to which the position information is transmitted for each base station.

This will be described referring to an operation principle (8) shown in FIG. 8. This mobile communication system is different from that shown in FIG. 2 in that the PBX 16 further accommodates a BS 20, a PHS 23 exists in a management area 82 in the BS 20, and a management means is included instead of the decision means.

In operation, a corresponding relationship between the BS's 19, 20 and the PBX's including the PBX 16 is preset in the management means. When the position information is received from the BS 19, for instance, the management means transmits the received position information to the mobile communication network 10 through its own PIU 13 corresponding to the BS 19 (see ① in FIG. 8). When the position information is received from the BS 20, the management means transmits the position information through the PBX 17 corresponding to the BS 20 (see ② in FIG. 8).

This operation makes it possible to select an available PBX used per BS, to further select a PIU, and to disperse the load within the mobile communication system.

Also, in the present invention according to claim 16, mobile station and the interface unit respectively may comprise a PHS and a PHS interface unit.

BRIEF DESCRIPTION OF THE DRAWINGS

Throughout the figures, like reference numerals indicate like or corresponding components.

DESCRIPTION OF THE EMBODIMENTS

Embodiment (1)

Figure 1:
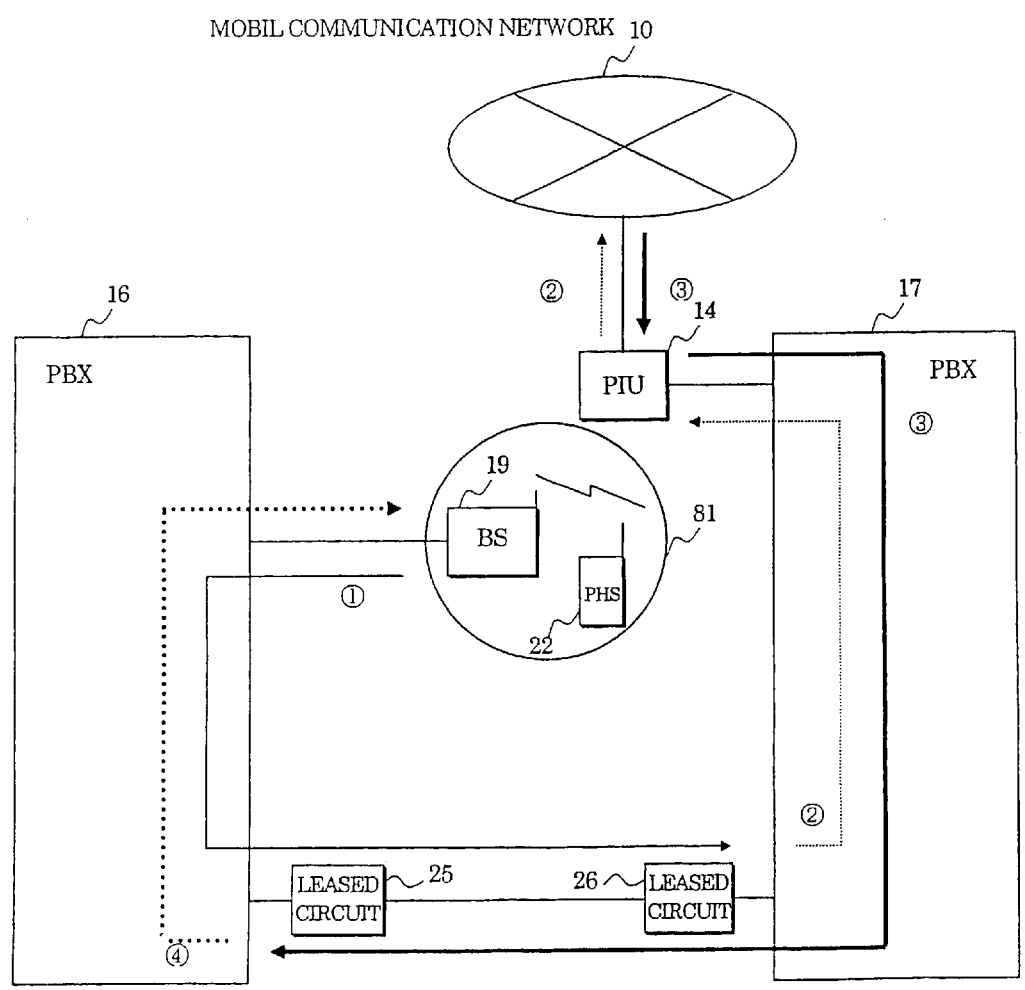
FIG. 1 is a block diagram showing an operation principle (1) of a mobile communication system according to the present invention.
Figure 2:
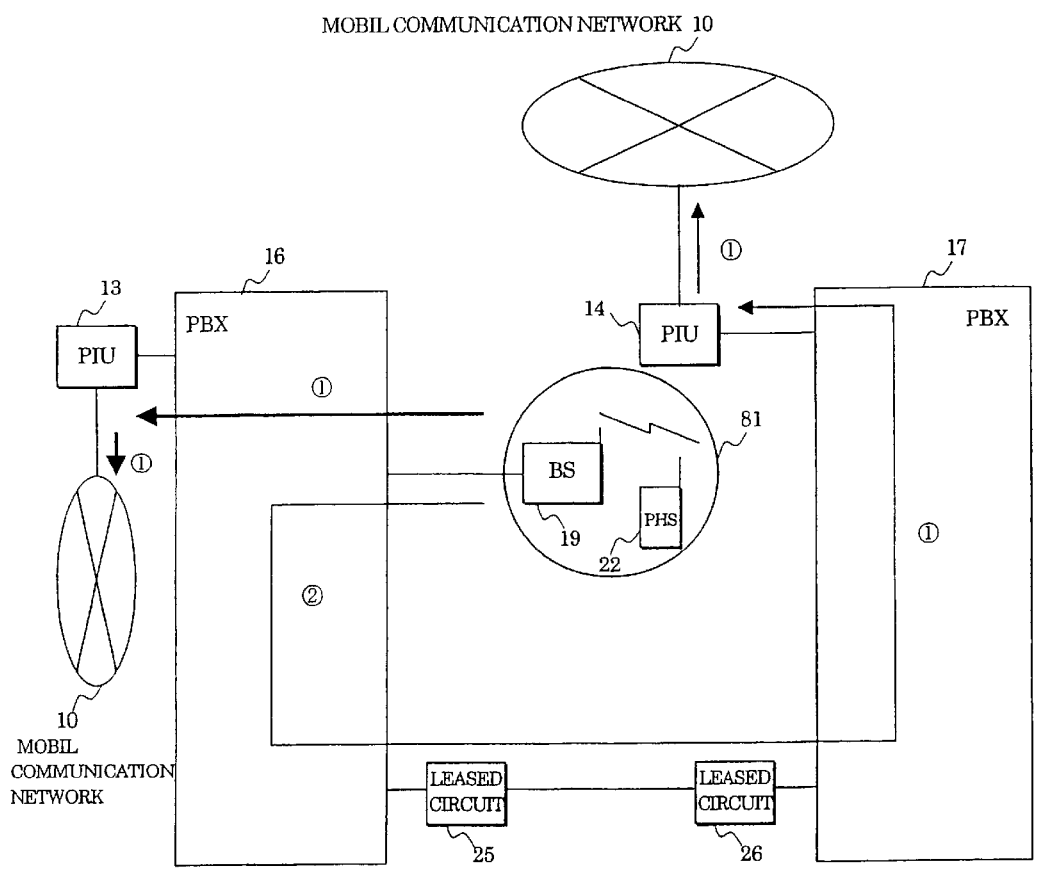
FIG. 2 is a block diagram showing an operation principle (2) of a mobile communication system according to the present invention.
Figure 3:
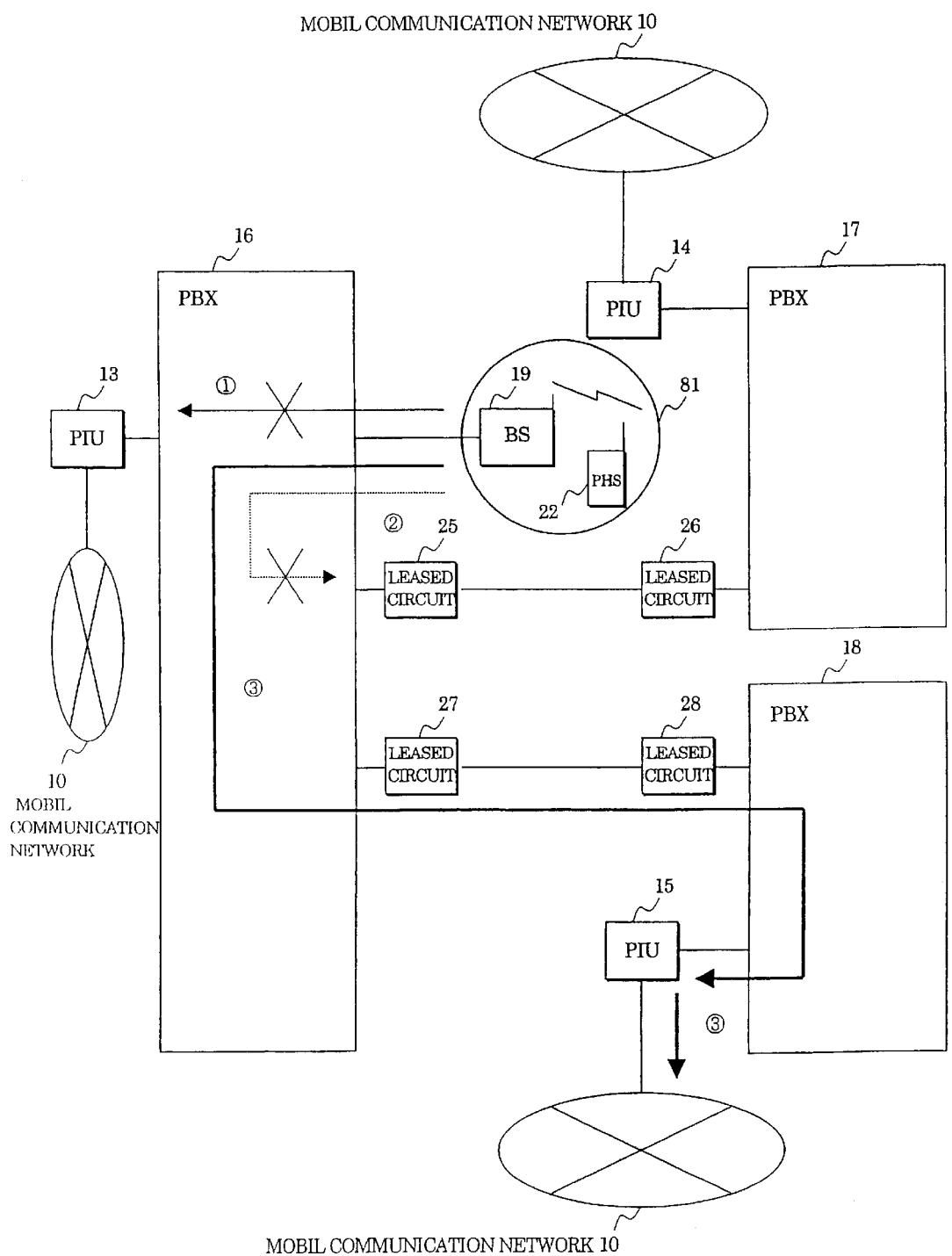
FIG. 3 is a block diagram showing an operation principle (3) of a mobile communication system according to the present invention.
Figure 4:
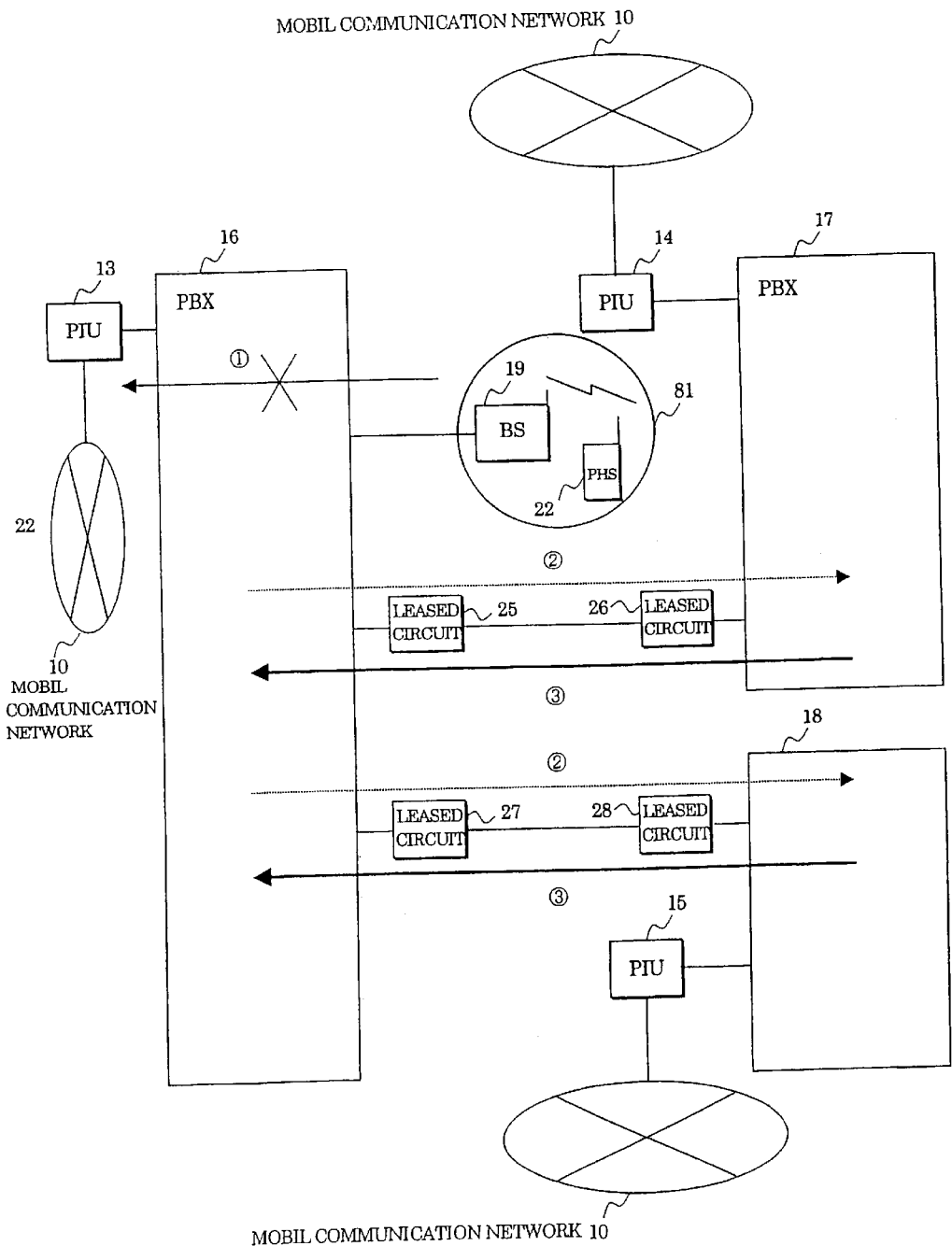
FIG. 4 is a block diagram showing an operation principle (4) of a mobile communication system according to the present invention.
Figure 5:
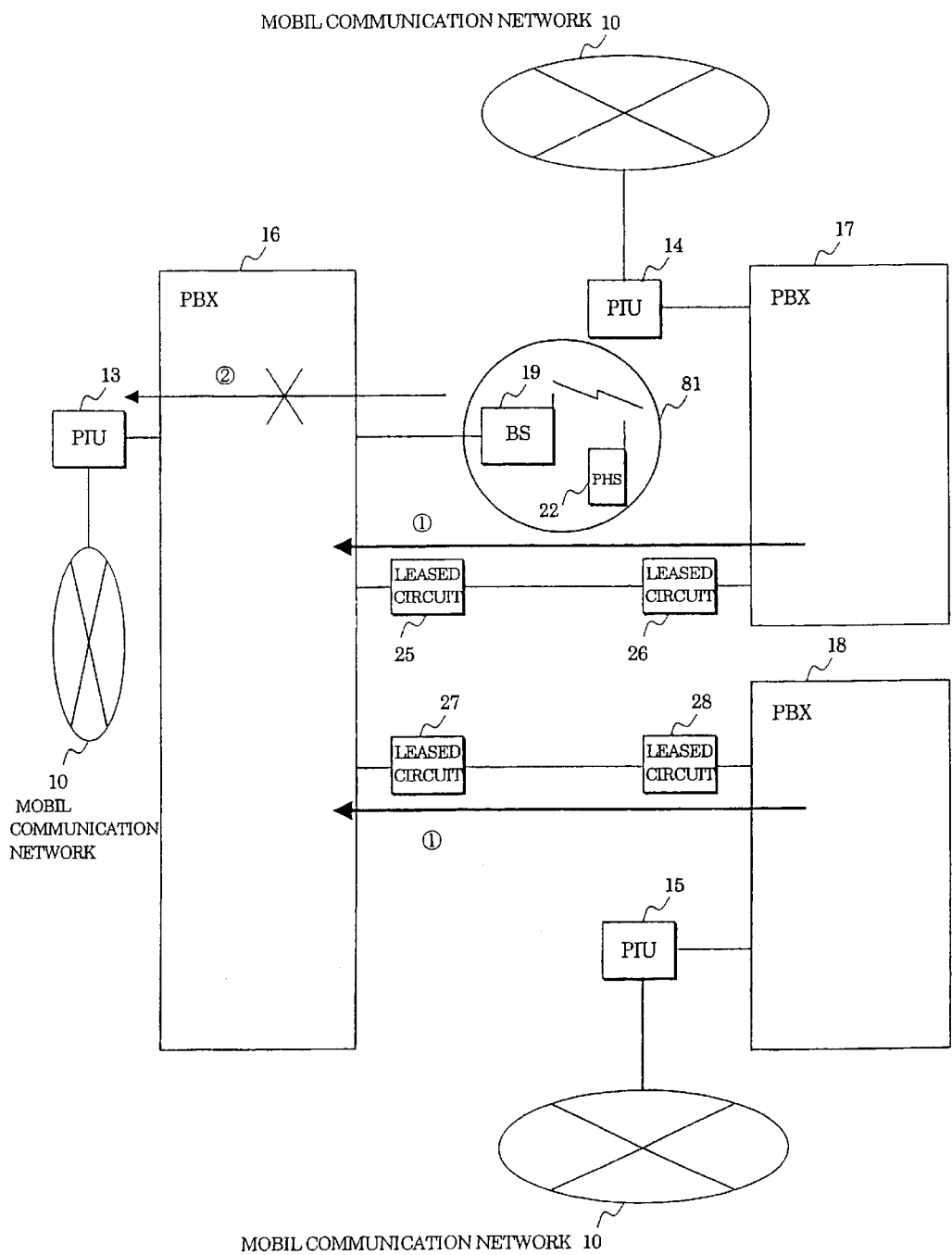
FIG. 5 is a block diagram showing an operation principle (5) of a mobile communication system according to the present invention.
Figure 6:
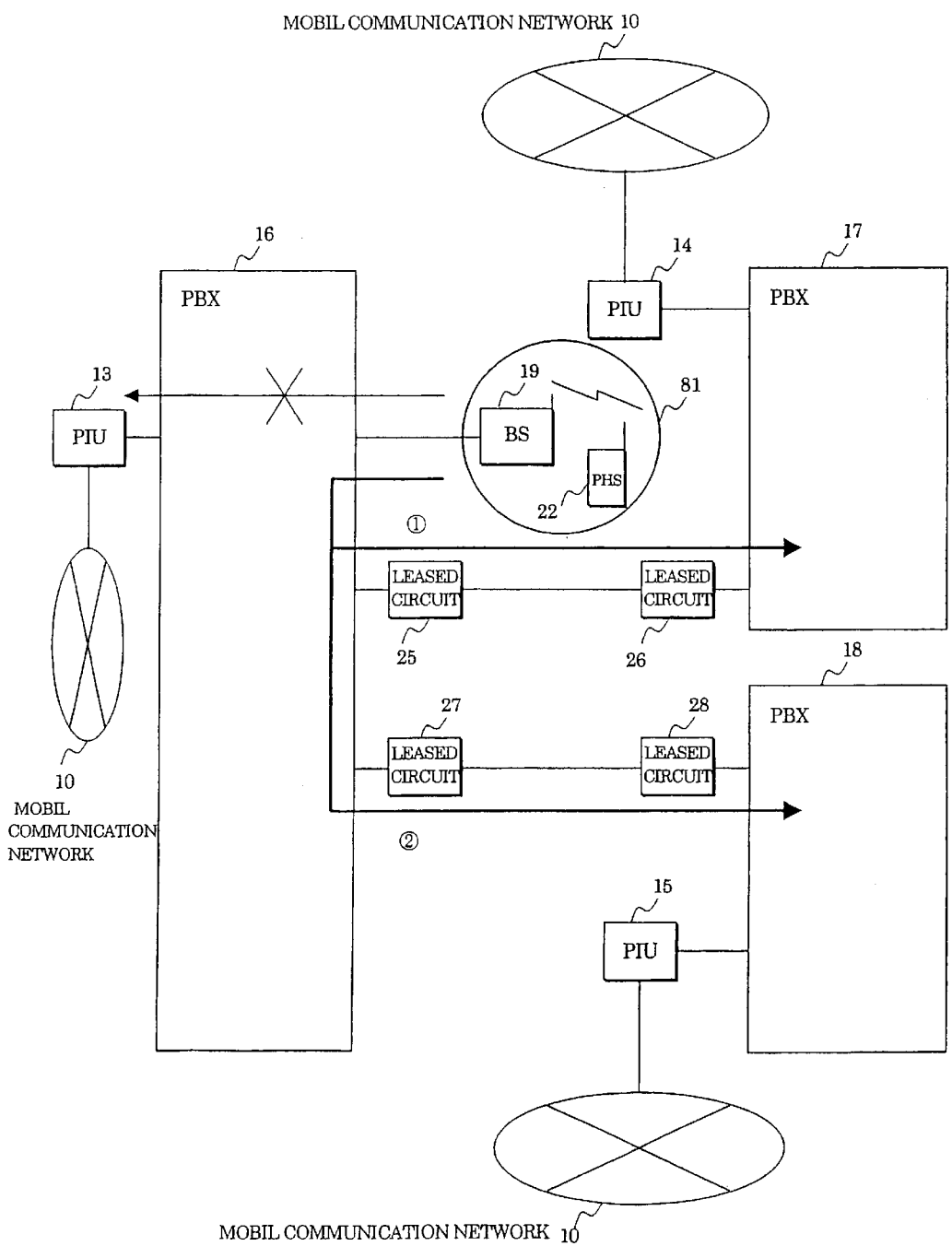
FIG. 6 is a block diagram showing an operation principle (6) of a mobile communication system according to the present invention.
Figure 7:
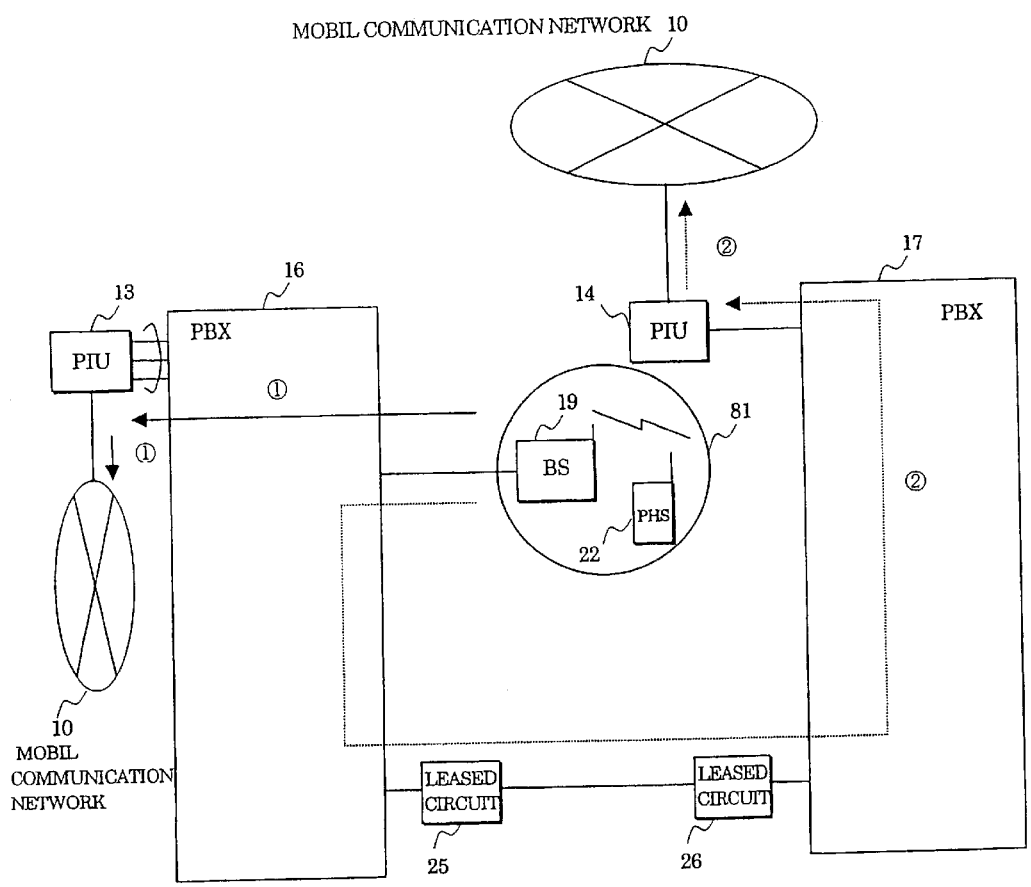
FIG. 7 is a block diagram showing an operation principle (7) of a mobile communication system according to the present invention.
Figure 8:
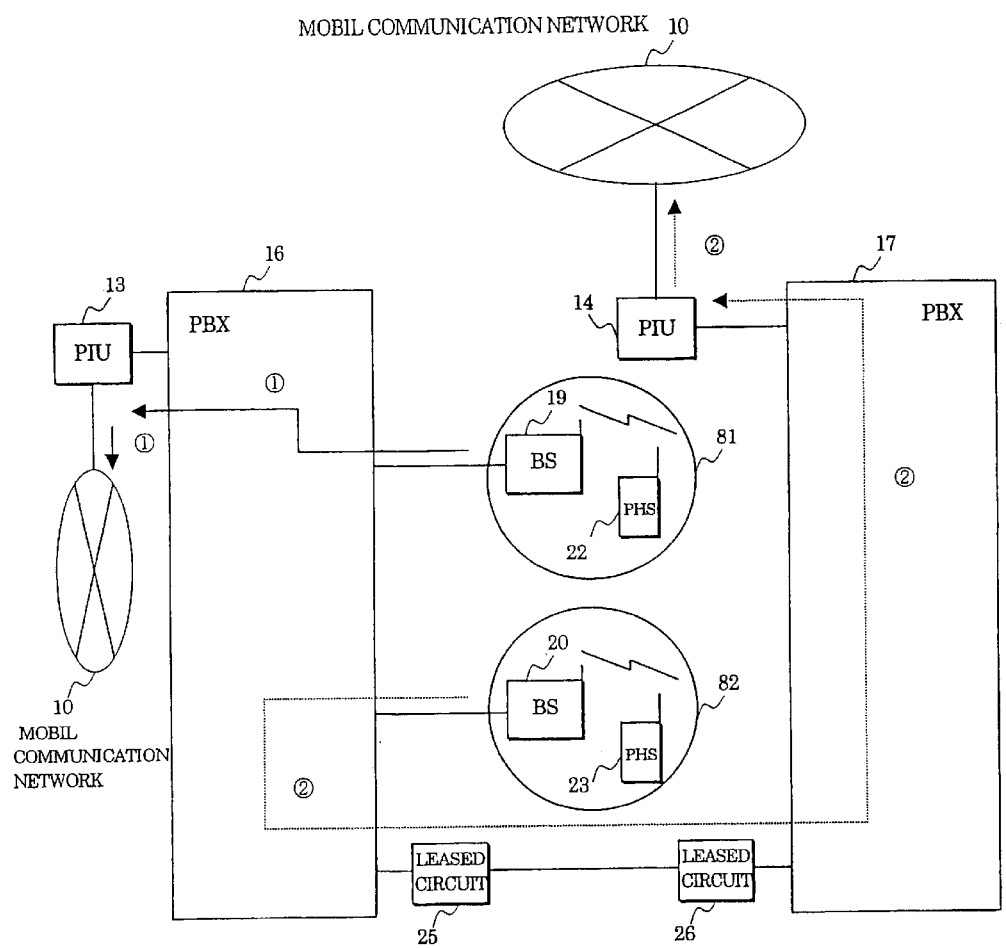
FIG. 8 is a block diagram showing an operation principle (8) of a mobile communication system according to the present invention.
Figure 9:
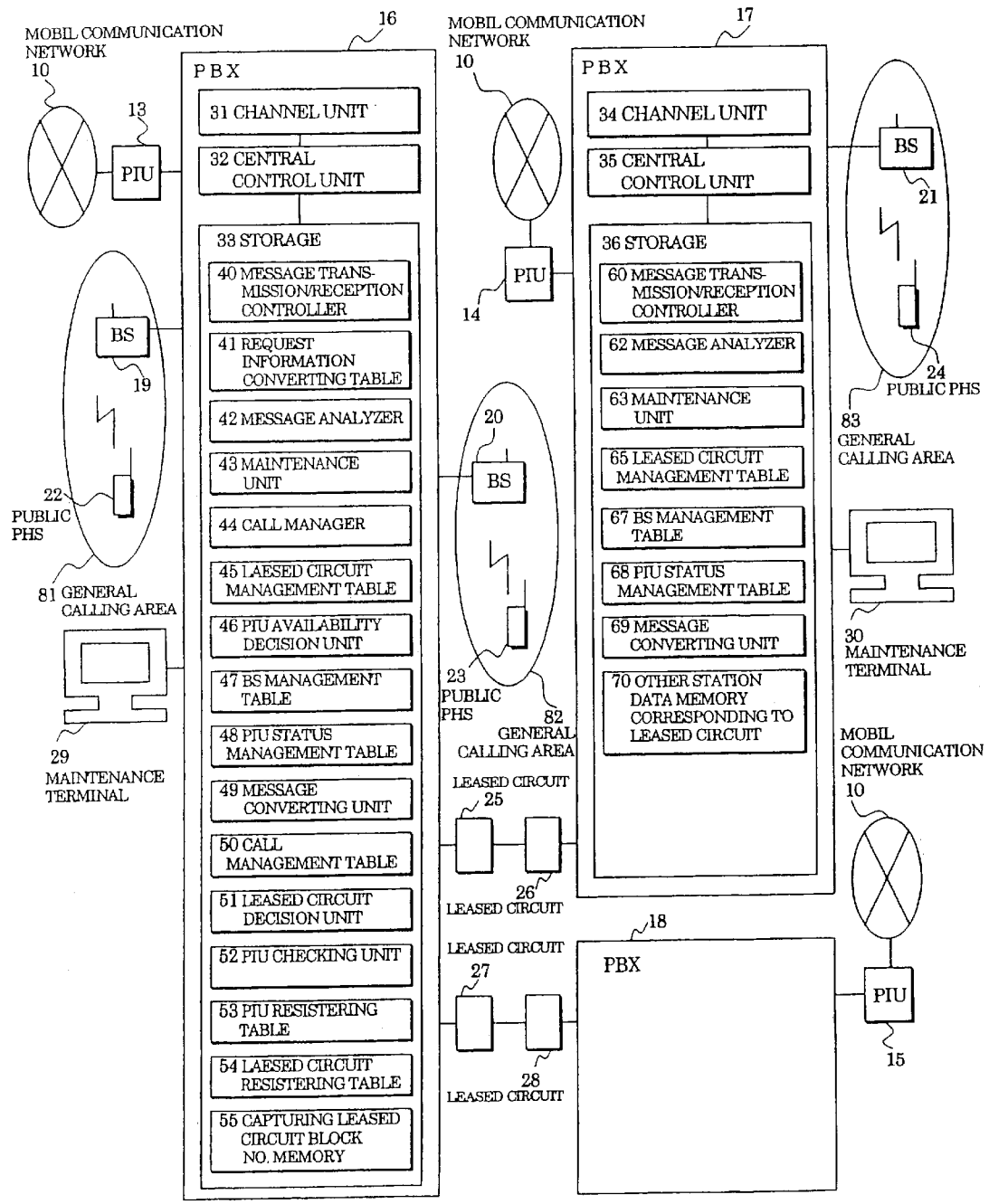
FIG. 9 is a block diagram showing a system arrangement in an embodiment (1) of a mobile communication system according to the present invention.

A system arrangement of an embodiment (1) of a mobile communication system according to the present invention schematically illustrated in FIGS. 1–6 as above-mentioned will be described referring to FIG. 9. The mobile communication system comprises the PBX's 16, 17, and 18 respectively accommodating the PIU's 13, 14, and 15 connected to the mobile communication network 10 so that the PBX 16 is connected to the PBX 17 and PBX 18 respectively through the leased circuits 25, 26 and the leased circuits 27, 28.

The PBX 16 accommodates the BS's 19 and 20 which respectively have the PHS's 22 and 23 within the general calling areas 81 and 82. The PBX 17 accommodates a BS 21 which has a PHS 24 within a general calling area 83. Also, maintenance terminals 29 and 30 are respectively connected to the PBX's 16 and 17.

The PBX's 16 and 17 are respectively composed of channel units 31 and 34, central control units 32 and 35, and storages 33 and 36.

The storage 33 of the PBX 16 is composed of a message transmission/reception controller 40, a request information converting table 41, a message analyzer 42, a maintenance unit 43, a call manager 44, a leased circuit management table 45, a PIU availability decision unit 46, a BS management table 47, a PIU status management table 48, a message converting unit 49, a call management table 50, a leased circuit decision unit 51, a PIU checking unit 52, a PIU registering table 53, a leased circuit registering table 54, and a capturing leased circuit block No. memory 55.

The storage 36 of the PBX 17 is composed of a message transmission/reception controller 60, a message analyzer 62, a maintenance unit 63, a leased circuit management table 65, a BS management table 67, a PIU status management table 68, a message converting unit 69, and an other station data memory 70 corresponding to a leased circuit. It is to be noted that since an internal arrangement of the PBX 18 is the same as that of the PBX 17 the description of the PBX 18 is hereby omitted.

There will firstly be described a procedure by which the PHS 22 makes a position registration in the mobile communication network 10 by using a semi-public roaming function of the PBX 16 or the PBX 17.

Figure 10:
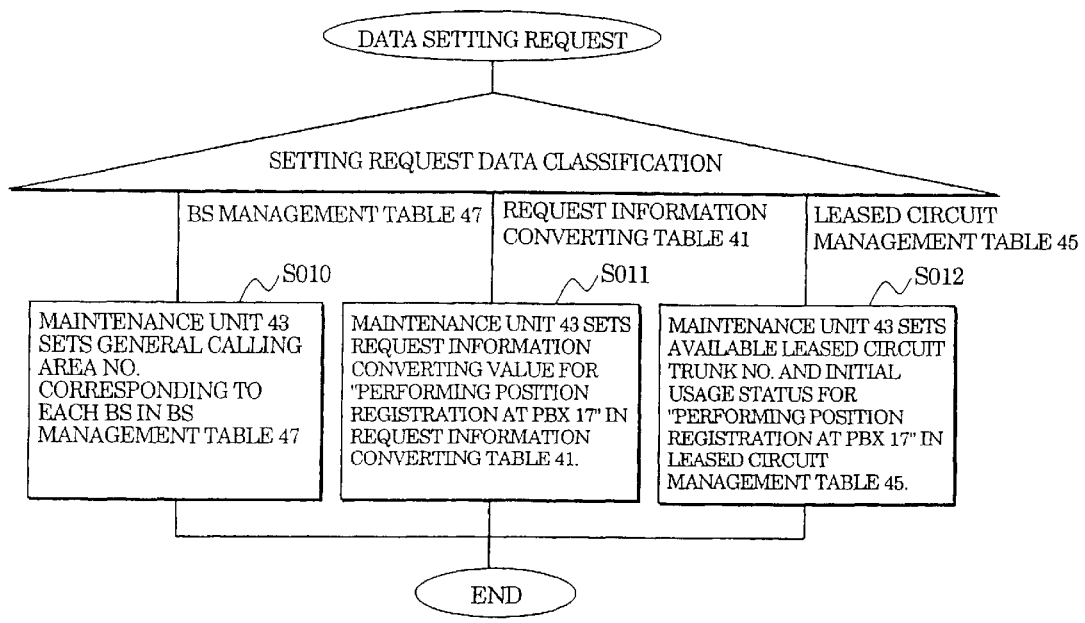
FIG. 10 is a flow chart showing a data setting procedure (1) in an embodiment (1) of a mobile communication system according to the present invention.

FIG. 10 shows an initial data setting flow in the PBX 16.

First of all, a maintenance person of the PBX 16 preliminarily makes a setting request for a general calling area No. of the BS's 19 and 20. A setting request, for instance, "the area No. of the general calling area 81 for the BS 19=1" is sent to the PBX 16 from the maintenance terminal 29.

The maintenance unit 43 decides that the data indicates the setting request for the BS management table 47, and sets the general calling area No.="1" in the area of the BS 19 with a unit number of the BS 19="19" being made an index (at step S010 in FIG. 10).

Figure 11:
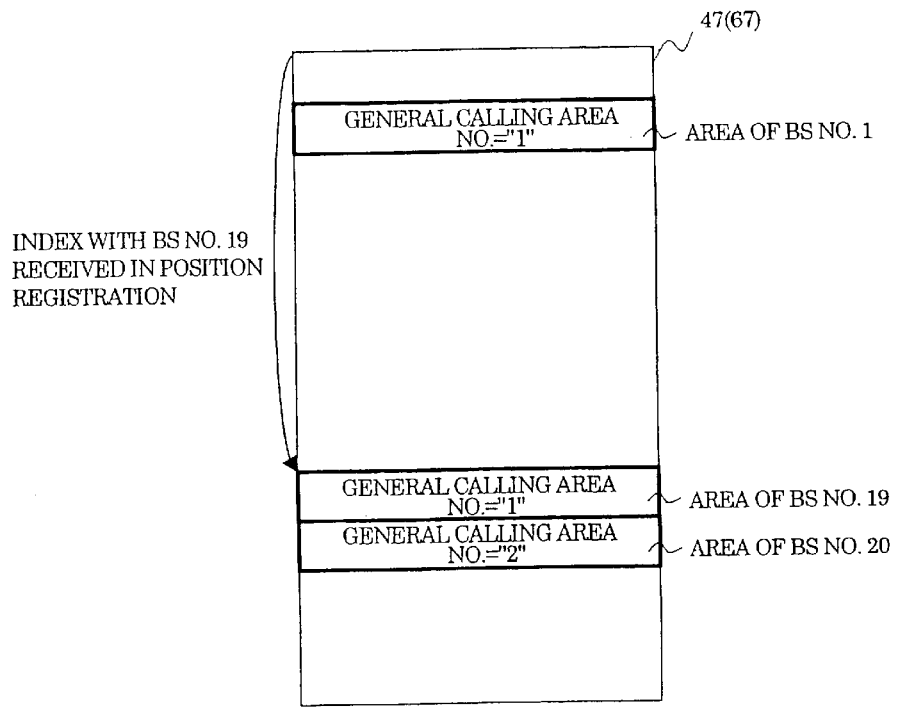
FIG. 11 is a diagram showing a BS management table example in an embodiment (1) of a mobile communication system according to the present invention.

FIG. 11 shows an example of the BS management table 47 in which the areas for storing the general calling area No. of each BS are provided in the order of the BS No. where "1" and "2" are respectively set in the general calling area No. of the BS's 19 and 20 in the BS management table 47.

Also, the maintenance person makes an other station position setting request for the position registration. The setting request, for instance, "a request information converting value=3" is sent from the maintenance terminal 29 to the PBX 16.

Figure 12:
FIG. 12 is a diagram showing a request information converting table example in an embodiment (1) of a mobile communication system according to the present invention.

FIG. 12 shows an example of the request information converting table 41. The request information converting value is to be set in this table 41. The maintenance unit 43 decides that the data indicates the setting request for the request information converting table 41, and sets the request information converting value="3" in the request information converting table 41 (at step S011 in FIG. 10).

Furthermore, the maintenance person makes a registration request for a trunk No. and a usage status i.e. availability of the leased circuit 25 which transmits a message at a position registering sequence to the PBX 17. The setting request, for instance, "the trunk No.=25, availability=1 (available)" is sent from the maintenance terminal 29 to the PBX 16.

Figure 13:
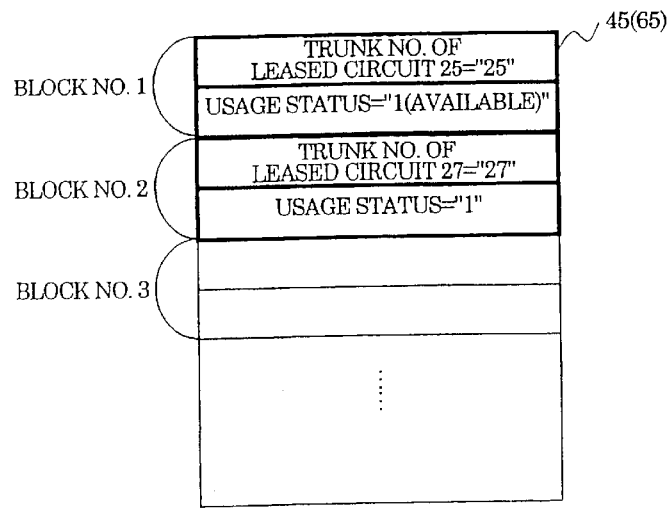
FIG. 13 is a diagram showing a leased circuit management table example in an embodiment (1) of a mobile communication system according to the present invention.

FIG. 13 shows an example of the leased circuit management table 45, where the trunk No. of each leased circuit the PBX 16 accommodates and the usage status are set.

The maintenance unit 43 decides that the data indicates the setting request for the leased circuit management table 45, and sets, for instance, "the trunk No.=25 and the availability=1 of the leased circuit 25" in a block No. 1 of the leased circuit management table 45 (at step S012 in FIG. 10).

Figure 14:
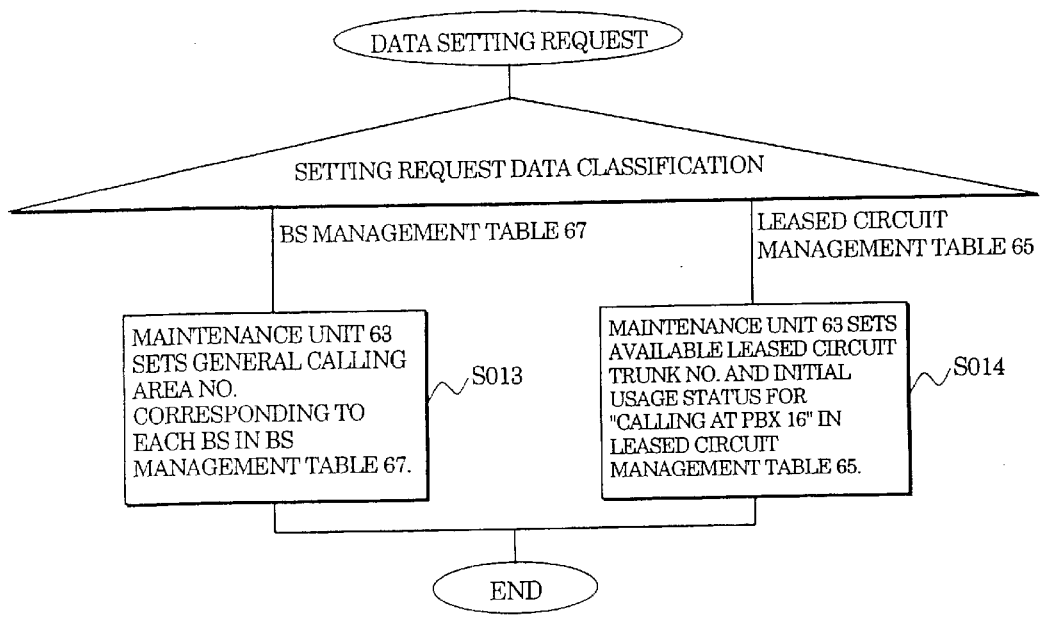
FIG. 14 is a flow chart showing a data setting procedure (2) in an embodiment (1) of a mobile communication system according to the present invention.

FIG. 14 shows an initial data setting flow in the PBX 17. The maintenance person of the PBX 17 preliminarily makes the registering request for the general calling area No. corresponding to the BS 21. The setting request, for instance "the area No. of the general calling area 83 for the BS 21 is =1" is sent from the maintenance terminal 30 to the PBX 17. If the data indicates the BS management table setting request, the maintenance unit 63 sets the general calling area No.="1" corresponding to the BS No. in the BS management table 67 (see FIG. 11).

The maintenance person of the PBX 17 sends the setting request for the trunk No. and the availability="available" of the leased circuit 26 which receives the message from the PBX 16 at the position registering sequence, e.g. "trunk No.=26, availablity=1", from the maintenance terminal 30 to the PBX 17. The maintenance unit 63 decides that the data indicates a leased circuit management table setting request, and sets the trunk No. and the availability of the leased circuit 26 in the leased circuit management table 65 (see FIG. 13).

FIGS. 15–18 show a position registering sequence when the PHS 22 performs a position registration.

Figure 15:
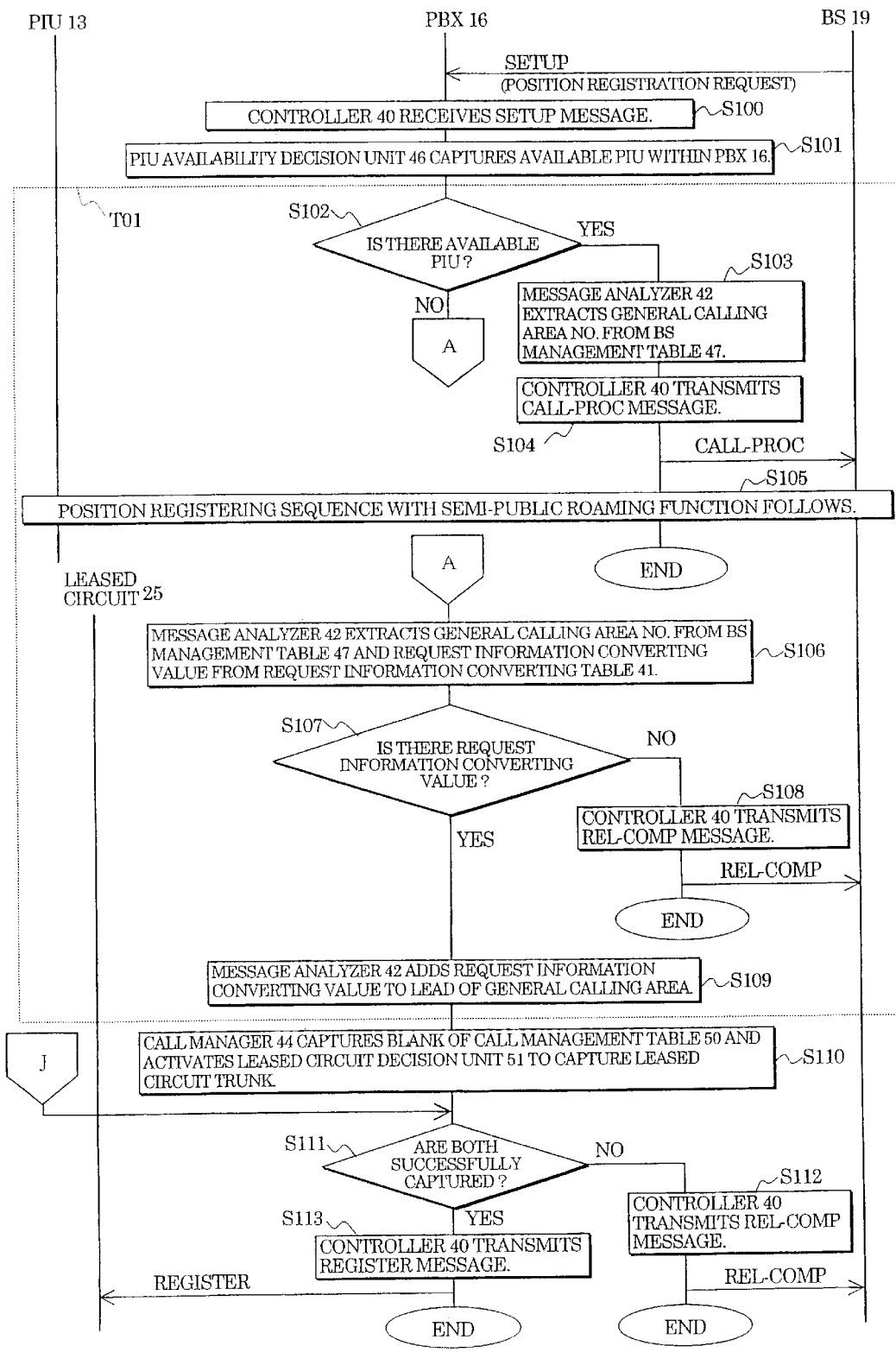
FIG. 15 is a flow chart (1) showing a position registering sequence of an embodiment (1) of a mobile communication system according to the present invention.

The message transmission/reception controller 40 firstly receives a position registering request (a SETUP message) which the PHS 22 has transmitted to the PBX 16 through the BS 19 (at step S100 in FIG. 15). The message transmission/ reception controller 40 reads the information element of the received SETUP message, recognizes the BS No. and a PS No. (an access No. of the PHS 22), and activates the message analyzer 42. The message analyzer 42 activates the PIU availability decision unit 46 to determine an available PIU in the PBX 16 (at steps S101 and S102).

If there is an available PIU, the message analyzer 42 extracts the general calling area No.="1" from the BS management table 47 (see FIG. 11) with the BS No. "19" being made a key, and transfers the area No. to the message transmission/reception controller 40 to make an activation request (at step S103).

The message transmission/reception controller 40 returns a CALL-PROC message to the PHS 22 with the transferred general calling area No.="1" being made a normalizing call area No. (at step S104), and performs a position registration in the mobile communication network 10 through the PIU 13 by performing the position registering sequence of the semi-public roaming function with the captured PIU 13 (at step S105).

When there is no available PIU, the message analyzer 42 extracts the general calling area No.="1" from the BS management table 47 based on the BS No.="19" and the request information converting value="3" set in the request information converting table 41 (see FIG. 12) (at step S106).

If the extracted request information converting value is e.g. "0" indicating no converting value, the message analyzer 42 decides it impossible to process, and activates the message transmission/reception controller 40 (at step S107). The message transmission/reception controller 40 returns an REL-COMP message to the PHS 24 (at step S108).

Since the extracted request information converting value is "3" as mentioned above, the message analyzer 42 adds the request information converting value="3" to the lead of the extracted general calling area No.="1" to activate the message transmission/reception controller 40 (at step S109). The message transmission/reception controller 40 transfers the general calling area No.="31" extracted from the message analyzer 42 to the call manager 44 to be activated.

Figure 19:
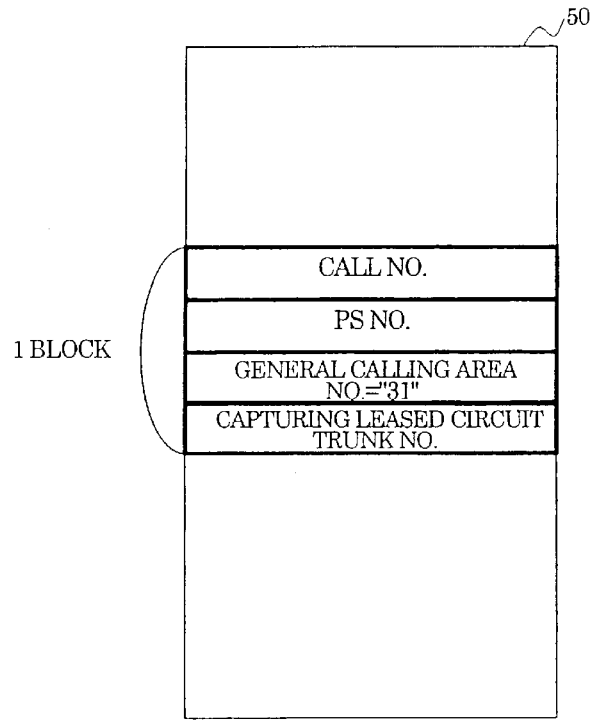
FIG. 19 is a diagram showing a call management table example in an embodiment (1) of a mobile communication system according to the present invention.

The call manager 44 captures a blank of the call management table 50 (see FIG. 19) and captures the leased circuit trunk by the leased circuit decision unit 51 (at step S110).

If the call management table 50 or the leased circuit trunk can not be captured, the call manager 44 decides it impossible to process, and activates the message transmission/reception controller 40. The message transmission/reception controller 40 returns the REL-COMP message to the PHS 22 (at steps S111 and S112).

When both of the call management table 50 and the leased circuit (e.g. the trunk No.="25") are captured, the call No., the PS No., the general calling area No.="31", and the capturing leased circuit trunk No.="25" are set in the call management table 50 to activate the message transmission/reception controller 40. The message transmission reception/controller 40 sets the call No., the PS No., and the general calling area No.="31" within the call management table 50 in a REGISTER message as the normalizing call area No. (a virtual position information) to activate the message converting unit 49. The message converting unit 49 converts the REGISTER message into a leased circuit protocol, which is transmitted to the PBX 17 through the captured leased circuit 25 (at step S113).

Figure 16:
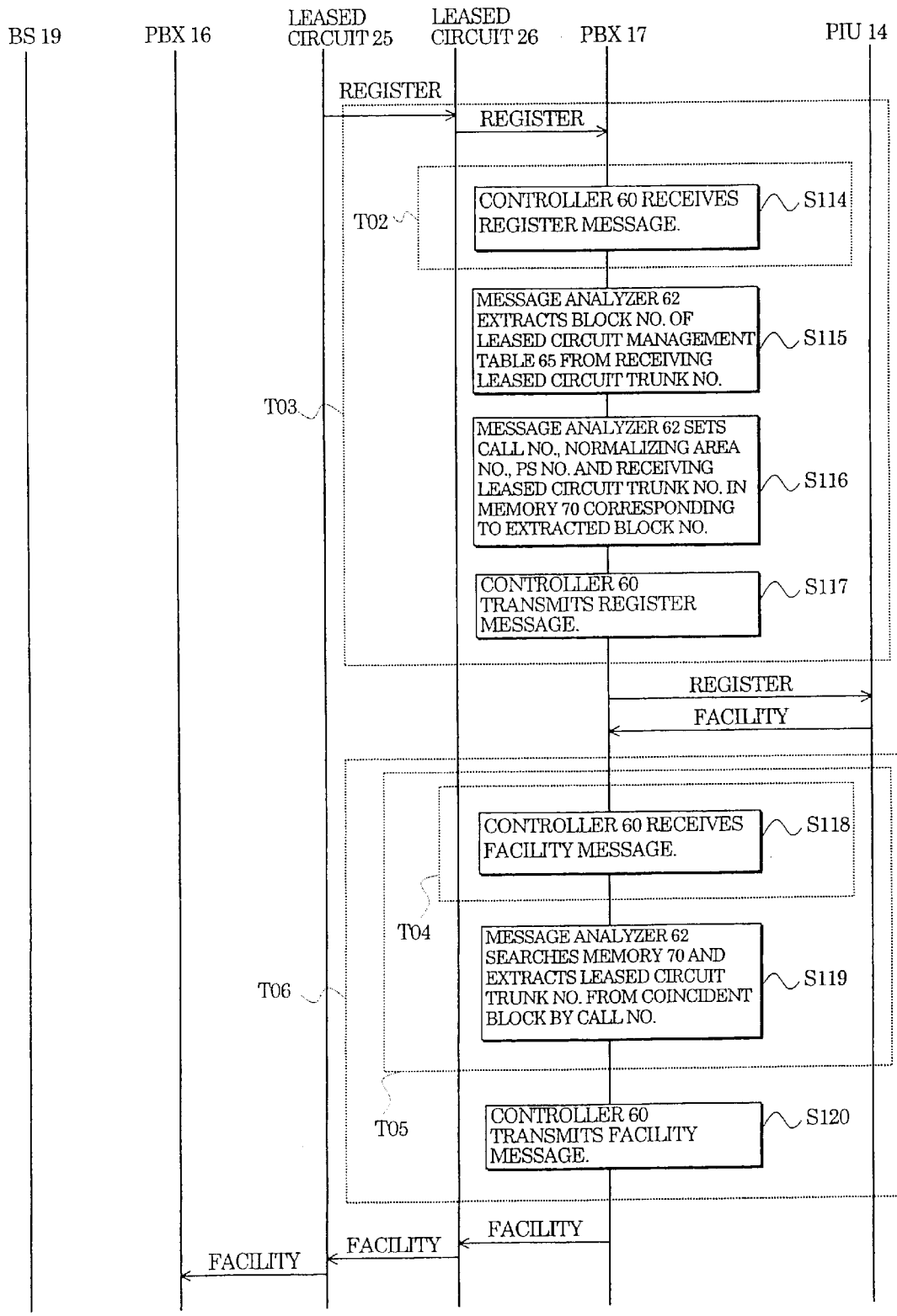
FIG. 16 is a flow chart (2) showing a position registering sequence of an embodiment (1) of a mobile communication system according to the present invention.

In FIG. 16, the transmission/reception controller 60 of the PBX 17 receives the REGISTER message through the leased circuits 25 and 26 (at step S114 in FIG. 16). The message transmission/reception controller 60 reads the information element of the received REGISTER message and extracts the normalizing call area No.="31" as well as the trunk No. of the called leased circuit 26="26" to activate the message analyzer 62 (at step S115).

The message analyzer 62 searches the leased circuit management table 65 referring to the trunk No. of the leased circuit 26 which is extracted and called="26" and extracts the block No. including the trunk No.="26". Then the message analyzer 62 searches the other station data memory 70 (see FIG. 20) with the block No. being indexed, determines the block corresponding to the called trunk No., and sets the call No., the PS No., the normalizing call area No.="31" and the trunk No. of the called leased circuit 26="26" upon receiving the REGISTER message to activate the message transmission/reception controller 60 (at step S116).

Figure 20:
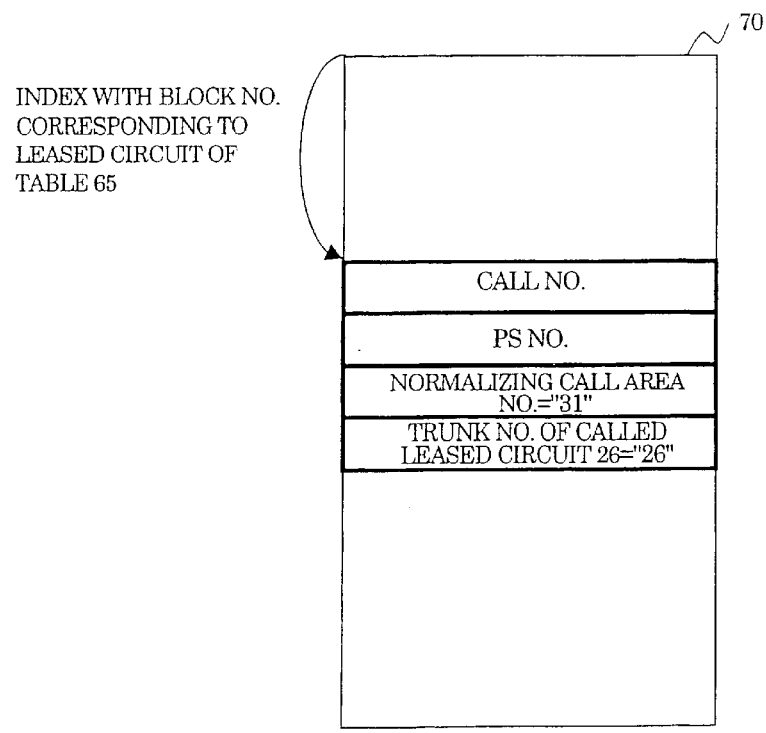
FIG. 20 is a diagram showing an other station data memory corresponding to a leased circuit example in an embodiment (1) of a mobile communication system according to the present invention.

In the embodiment of the other station data memory 70 shown in FIG. 20, the call No., the PS No., the normalizing call area No.="31", and the trunk No. of called leased circuit="26" are stored in the area indexed with the block No. of the leased circuit 26 of the leased circuit management table 65 (see FIG. 13)="26".

The message transmission/reception controller 60 activates the message converting unit 69, starts the position registering sequence of the semi-public roaming function with the PIU 14 after converting the message into the PIU protocol, and transmits the REGISTER message to the PIU 14 as the position registering request (at step S117).

Then, the message transmission/reception controller 60 reads the information element of a FACILITY message received from the PIU 14 as a certification request, extracts the call No., and activates the message analyzer 62 (at step S118). The message analyzer 62 searches the above mentioned other station data memory 70 by the extracted call No., and extracts the trunk No. of the called leased circuit 26 from the coincident or hit block to activate the message transmission/reception controller 60 (at step S119).

After activating the message converting unit 69 and converting the message into the leased circuit protocol, the message transmission/reception controller 60 transmits the received FACILITY message to the PBX 16 through the extracted leased circuit 26 (at step S120).

Figure 17:
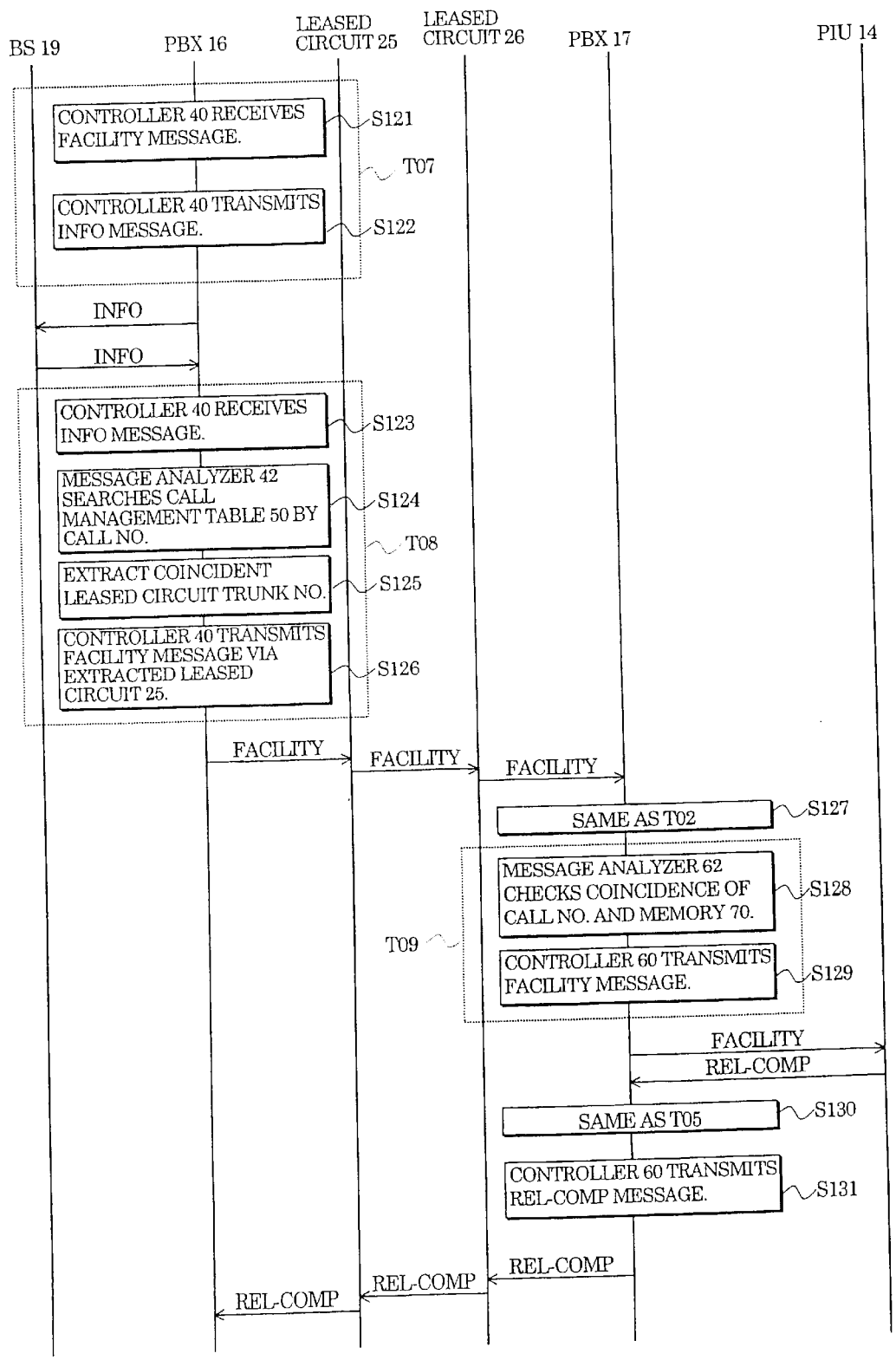
FIG. 17 is a flow chart (3) showing a position registering sequence of an embodiment (1) of a mobile communication system according to the present invention.

In FIG. 17, the message transmission/reception controller 40 of the PBX 16 receives the FACILITY message from the leased circuit 25 (at step S121), and returns an INFO message to the PHS 24 as the certification request after activating the message converting unit 49 and converting the message into a BS protocol (at step S122).

Then, the message transmission/reception controller 40 receives the INFO message from the PHS 22 as the certification response, extracts the call No., and activates the message analyzer 42 (at step S123). The message analyzer 42 searches the call management table 50 based on the extracted call No. (at step S124), extracts the trunk No. of the leased circuit 25 having the same call No. (at step S125), and activates the message transmission/reception controller 40. After activating the message converting unit 49 and converting the message into the leased circuit protocol, the transmission/reception controller 40 transmits the FACILITY message to the PBX 17 through the leased circuit 25 as the certification response (at step S126).

The message transmission/reception controller 60 of the PBX 17 reads the information element of the FACILITY message received from the leased circuit 26 as the certification response, extracts the calling No., and activates the message analyzer 62 (at step S127). The message analyzer 62 searches the call No. which is coincident with the extracted call No. from the other station data memory 70, and activates the message transmission/reception controller 60 (at step S128).

After activating the message converting unit 69 and converting the received FACILITY message into the PIU protocol, the message transmission/reception controller 60 transmits the message to the PIU 14 (at step S129).

The message transmission/reception controller 60 reads the information element of the REL-COMP message received from the PIU 14, extracts the call No., and activates the message analyzer 62 (at step S130). The message analyzer 62 searches the other station data memory 70 by the extracted call No., extracts the trunk No. of the leased circuit 26 from the coincident block, and activates the message transmission/reception controller 60.

The message transmission/reception controller 60 reads the information element of the REL-COMP message, extracts a reason element, and activates the message analyzer 62. If the extracted reason element indicates a "position registration failure" (certification failure), the message transmission/reception controller 60 clears the area corresponding to the other station data memory 70, and activates the message transmission/reception controller 60. If the extracted reason element indicates a "position registration success" (certification success), the message analyzer 62 keeps the message transmission/reception controller 60 activating.

After activating the message converting unit 69 and converting the message into the leased circuit protocol, the message transmission/reception controller 60 transmits the REL-COMP message to the PBX16 through the extracted leased circuit 26 (at step S131).

Figure 18:
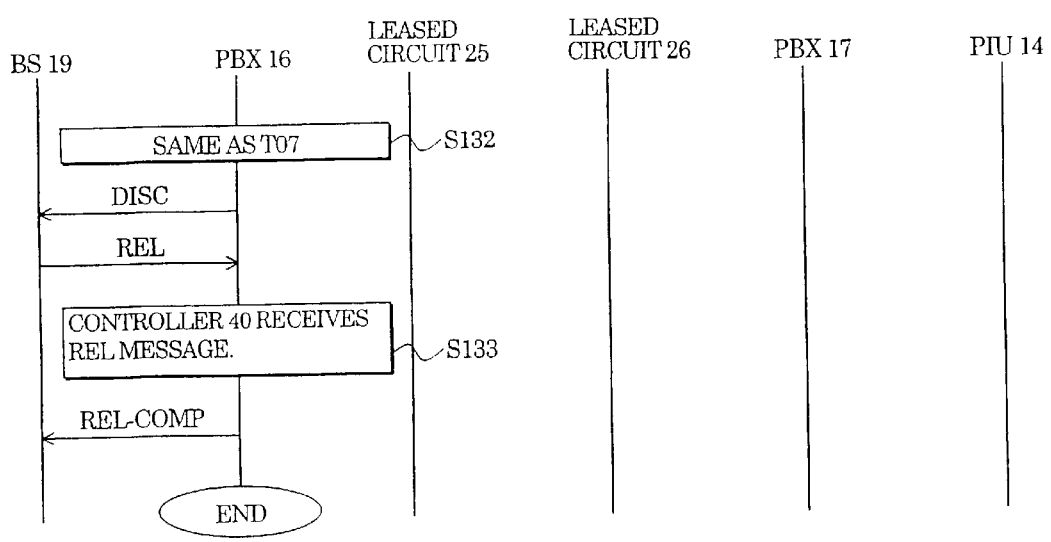
FIG. 18 is a flow chart (4) showing a position registering sequence of an embodiment (1) of a mobile communication system according to the present invention.

In FIG. 18, after receiving the REL-COMP message from the leased circuit 25, activating the message converting unit 49, and converting the message into the BS protocol, the message transmission/reception controller 40 of the PBX 16 transmits a DISC message to the PHS 22 (at step S132 in FIG. 18).

The message transmission/reception controller 40 receives an REL message from the PHS 22 and returns the REL-COMP message to the PHS 22 (at step S133).

This operation enables the PHS 22 to make the position registration through the leased circuit 25 and the PIU 14 of the other PBX 17 if the position registration is made within the management area 81 but the PIU 13 of the PBS 16 is unavailable.

There will now be described a procedure by which the PHS 22 makes a call transmission request for the mobile communication network 10.

It is supposed that the maintenance person of the PBX 16 initially presets the data shown in FIG. 10 in the same way as the case of position registration.

Figure 21:
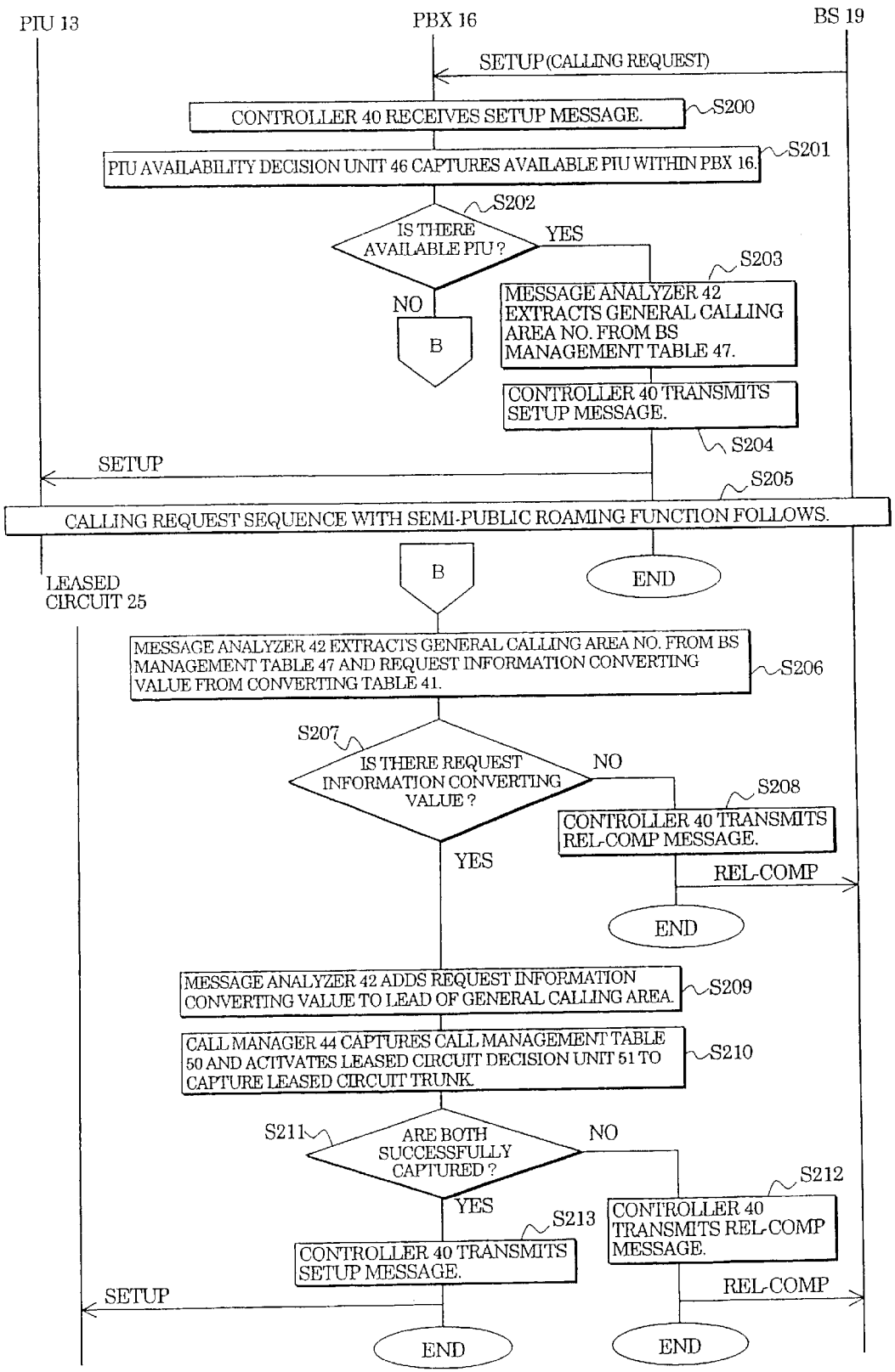
FIG. 21 is a flow chart (1) showing a calling sequence of an embodiment (1) of a mobile communication system according to the present invention.

In FIG. 21, the message transmission/reception controller 40 receives the SETUP message (call transmission request) from the PHS 22 through the BS 19 (at step S200), reads the information element of the SETUP message, and recognizes the BS No. and the PS No. (the access No. of the PHS) to activate the message analyzer 42.

The message analyzer 42 decides whether or not there is an available PIU accommodated in the PBX 16 at the PIU availability decision unit 46 (at steps S201 and S202).

If there is an available PIU 13, the message analyzer 42 extracts the general calling area No.="1" from the BS management table 47 based on the BS No., and activates the message transmission/reception controller 40 (at steps S203 and S204).

The message transmission/reception controller 40 makes the call transmission request for the PIU 13 by performing a calling sequence of the semi-public roaming function with the captured PIU 13 (at step S205).

If there is no available PIU, the message analyzer 42 extracts the general calling area No.="1" from the BS management table 47 based on the BS No. and the request information converting value="3" set in the request information converting table 41 (at step S206).

If the extracted request information converting value is e.g. "0" indicating no converting value, the message analyzer 42 decides it impossible to process, and activates the message transmission/reception controller 40. The message transmission/reception controller 40 returns the REL-COMP (release completed) message to the PHS 22 to wait for a re-position registration from the PHS 22 (at steps S207 and S208).

Since the extracted request information converting value is "3" as mentioned above, the message analyzer 42 adds the request information converting value="3" to the lead of the extracted general calling area No.="1" to activate the message transmission/reception controller 40. The message transmission/reception controller 40 transfers the general calling area No.="31" extracted at the message analyzer 42 to the call manager 44 to be activated (at step S209).

The call manager 44 captures a blank of the call management table 50 and activates the leased circuit decision unit 51 to capture the leased circuit trunk (at step S210).

When the call management table 50 or the leased circuit trunk can not be captured, the call manager 44 decides it impossible to process, and activates the message transmission/reception controller 40. The message transmission/reception controller 40 returns the REL-COMP (release completed) message to the PHS 22 to wait for the re-position registration from the PHS 22 (at steps S211 and S212).

When both are captured, the call manager 44 activates the message transmission/reception controller 40 after setting the call No., the PS No., the general calling area No.="31", and the captured leased circuit trunk No. in the call management table 50. The message transmission/reception controller 40 sets the call No., the PS No. and the general calling area No. (=normalizing call area No.)="31" within the call management table 50 in the SETUP message to activate the message converting unit 49. The message converting unit 49 converts the SETUP message into the leased circuit protocol, which is transmitted to the PBX 17 through the captured leased circuit 25 (at step S213).

Figure 22:
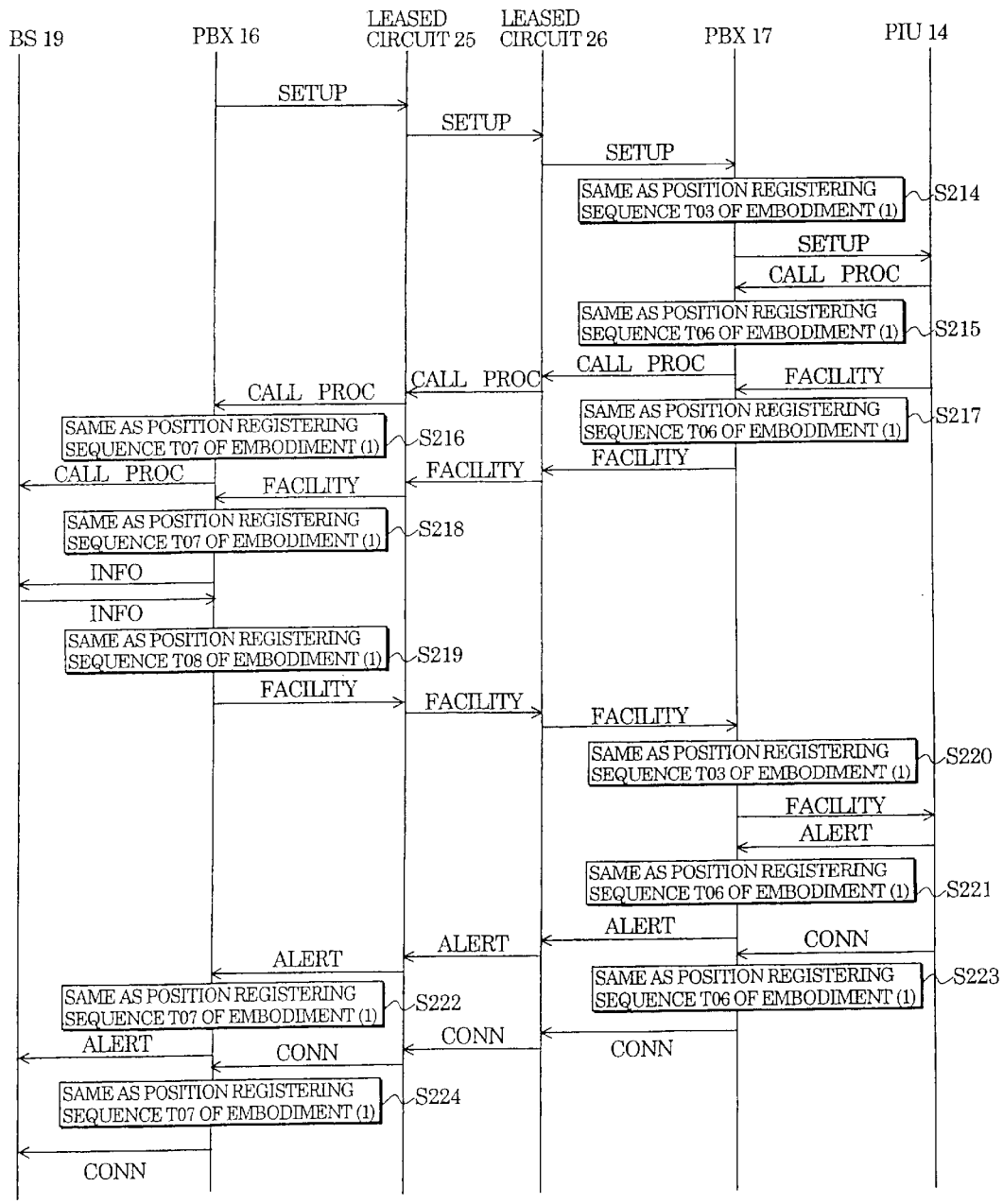
FIG. 22 is a flow chart (2) showing a calling sequence of an embodiment (1) of a mobile communication system according to the present invention.

In FIG. 22, the message transmission/reception controller 60 of the PBX 17 receives the SETUP message from the leased circuit 26, reads the information element of the message, and extracts the normalizing call area No.="31" as well as the trunk No. of the leased circuit 26 which has received the SETUP message to activate the message transmission/reception controller 60.

The message transmission/reception controller 60 searches the leased circuit management table 65 with the trunk No. of the leased circuit 26 which is extracted and called, determines the block corresponding to the called trunk No. of the other station data memory by the block No., sets the call No., the PS No., the normalizing call area No., and the trunk No. of the called leased circuit 26 upon receiving the SETUP message in the block, and activates the message transmission/reception controller 60.

After activating the message converting unit 69 and converting the message into the PIU protocol, the message transmission/reception controller 60 starts the calling sequence of the semi-public roaming function to transmit the SETUP message which is the call transmission request to the PIU 14 (at step S214).

The message transmission/reception controller 60 reads the information element of the CALL-PROC message received from the PIU 14, extracts the call No., and activates the message transmission/reception controller 60.

Hereinafter, the same process as the step T06 corresponding to steps S118–S120 and T07 corresponding to steps S121 and S122 all in FIG. 16 for the position registering sequence will be performed so that the CALL-PROC message is transmitted to the PBX 16 through the leased circuits 26 and 25, and then transmitted from the PBS 16 to the PHS 22 as the certification request (at steps S215 and S216 in FIG. 22).

Also, the message transmission/reception controller 60 of the PBX 17 reads the FACILITY message transmitted from the mobile communication network 10 through the PIU 14, extracts the call No., and activates the message analyzer 62.

Hereinafter, in the same way as the CALL-PROC message, the same process as the steps T06 and T07 for the position registering sequence will be performed so that the FACILITY message is transmitted to the PBX 16 through the leased circuits 26 and 25 and converted into the INFO message by the PBX 16 to be transmitted to the PHS 22 (at steps S217 and S218).

The message transmission/reception controller 40 of the PBX 16 receives the INFO message from the PHS 22, extracts the call No., and activates the message analyzer 42.

Hereinafter, the same process as the steps T08 (S123–S126) and T03 (S114–S117) for the position registering sequence will be performed. The INFO message is converted into the FACILITY message and is transmitted to the PBX 17 through the leased circuits 25 and 26, and then transmitted to the mobile communication network 10 through the PIU 14 by the PBX 17 (at steps S219 and S220).

Hereinafter, in the same procedure as the transmission procedure of the CALL-PROC message, an ALERT message transmitted from the PIU 14 to the PBX 17 is transmitted to the PHS 22 (at steps S221 and S222). When the PHS 22 responds to this ALERT message, a CONN message from the PIU 14 is transmitted from the PBX 17 to the PHS 22 in the same procedure (at steps S223 and S224).

Figure 23:
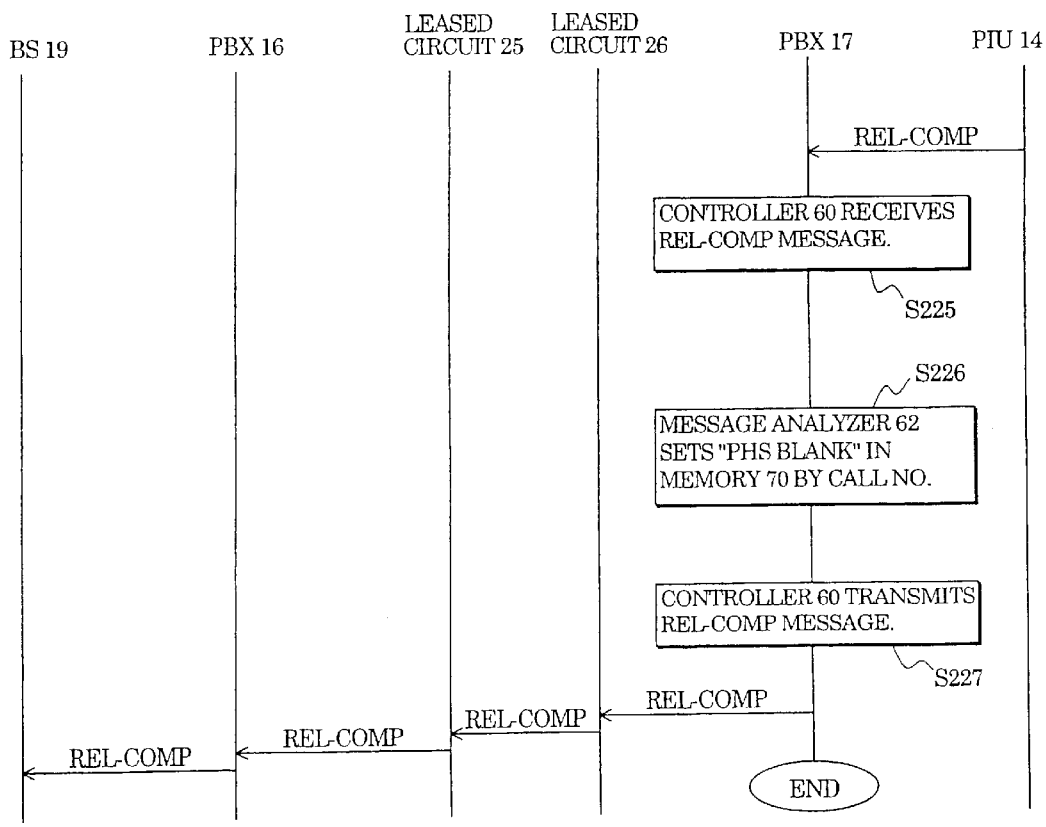
FIG. 23 is a flow chart (3) showing a calling sequence of an embodiment (1) of a mobile communication system according to the present invention.

In FIG. 23, receiving the REL-COMP message from the leased circuit 26 or the PIU 14 by finishing the call or communication, the message transmission/reception controller 60 of the PBS 17 reads the information element, extracts the call No., and activates the message analyzer 62. FIG. 23 shows a sequence when the REL-COMP message is received from the PIU 14 (at step S225).

The message analyzer 62 searches the other station data memory 70 with the extracted call No., and sets e.g. the blank="35" as a PHS blank within the PBX 17 in the normalizing call area No. in the coincident block area (at step S226).

The message analyzer 62 activates the message transmission/reception controller 60, which transmits the REL-COMP message to the PHS 22 through the leased circuits 26, 25 and the PBX 16 (at step S227).

Thus, the PHS within the area of the PBX 16 can perform a call transmission/call reception by using a PIU of another PBX.

Hereinafter, a call reception procedure will be described when the position of the PHS 22 within the PBX 16 is preliminarily registered in the mobile communication network 10 by the above-mentioned position registering sequence or calling sequence and the call reception request to the PHS 22 is sent from the mobile communication network 10 to the PBX 17.

The maintenance person of the PBX 16 sets the general calling area No. of the BS's 19 and 20 in the BS management table 47 in the same way as the position registering sequence (see FIG. 11).

Figure 24:
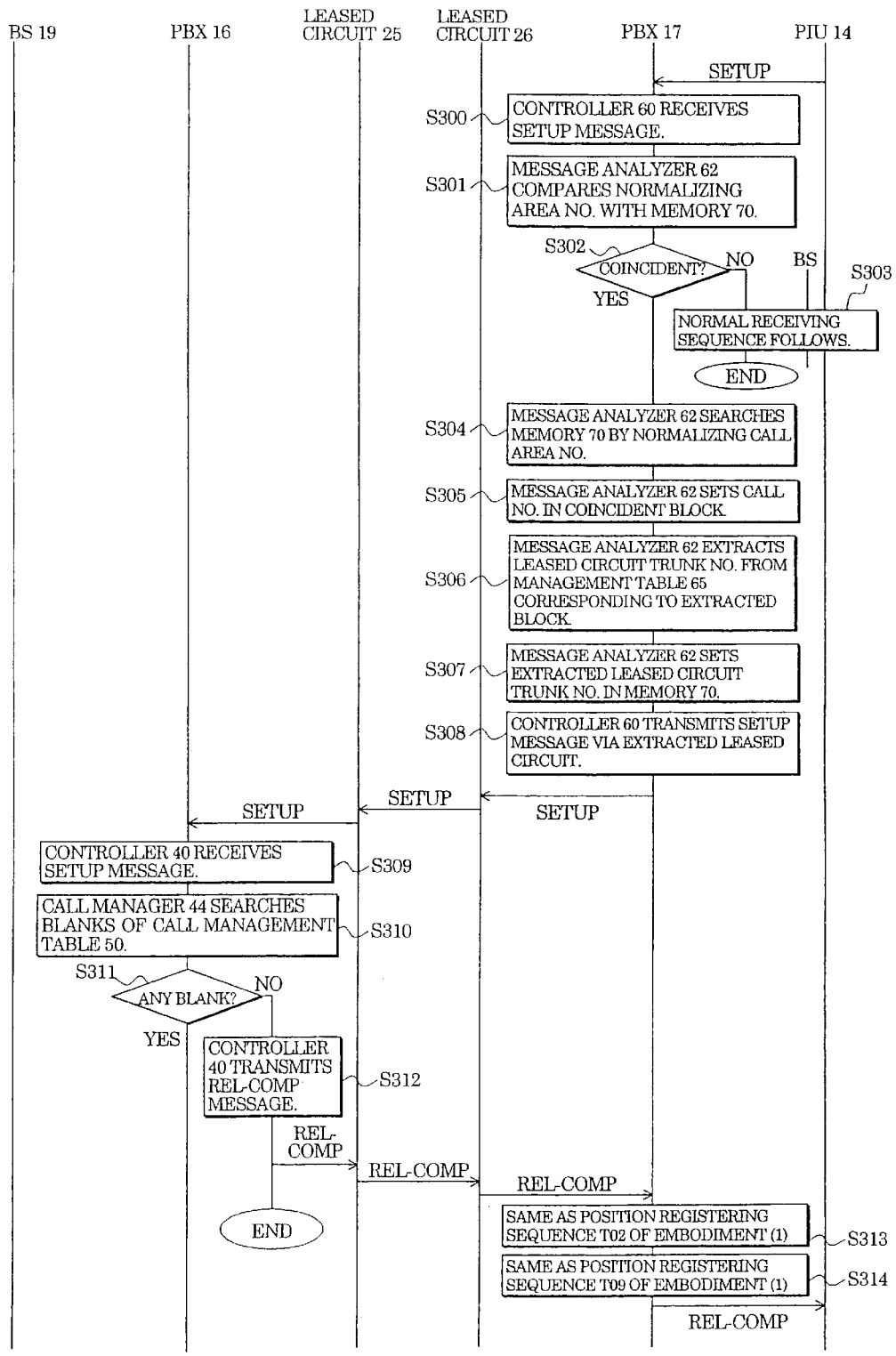
FIG. 24 is a flow chart (1) showing a called sequence of an embodiment (1) of a mobile communication system according to the present invention.

In FIG. 24, the message transmission/reception controller 60 receives the SETUP message (call reception request) from the PIU 14 (mobile communication network 10) (at step S300), reads the information element of the SETUP message, extracts the normalizing call area No.=e.g. "31", and activates the message analyzer 62.

The message analyzer 62 searches the other station data memory 70 (see FIG. 20) by the normalizing call area No.="31" (at step S301) and decides that the call reception request is addressed to itself to perform a normal called sequence when there is no coincident No. (at steps S302 and S303).

When there is a coincident No., the message analyzer 62 sets the call No. in the coincident block (at steps S304 and S305), recognizes the block No., extracts the trunk No. "26" of the leased circuit 26 from the blocks of the leased circuit management table 65 (see FIG. 13) corresponding to the recognized block No. (at step S306), and activates the message transmission/reception controller 60.

It is to be noted that the data set in FIG. 13 is a data example of the leased circuit management table 45 of the PBX 16, which is different from the data set in the leased circuit management table 65.

The message transmission/reception controller 60 captures the leased circuit 26 with the extracted leased circuit trunk No.="26" to activate the message analyzer 62. The message analyzer 62 sets the trunk No. of the extracted leased circuit 26 in the other station data memory 70 (at step S307) to activate the message transmission/reception controller 60.

The message transmission/reception controller 60 converts the SETUP message into the leased circuit protocol at the message converting unit 69 to transmit the leased circuit protocol to the PBX 16 through the leased circuit 26 (at step S308).

The message transmission/reception controller 40 of the PBX 16 receives the SETUP message from the leased circuit 25, reads the information element, extracts the call No. and normalizing call area No., and activates the message analyzer 42 (at step S309). The message analyzer 42 transfers the normalizing call area No.=e.g. "31" to the call manager 44 to activates the same.

The call manager 44 searches "blanks" in the call management table 50 (at step S310).

When such "blanks" can not be captured, the call manager 44 decides it impossible to process, so that the call management table 50 activates the message transmission/reception controller 40 (at step S311). The message transmission/reception controller 40 transmits the REL-COMP (release completed) message to the PBX 17 through the leased circuit 25 to decide it impossible to receive calls (at step S312).

The message transmission/reception controller 60 of the PBX 17 receives the REL-COMP message.

Hereinafter, the same process as the above mentioned position registering sequence of the steps T02(=S114) and T09(=S128 and S129) will be performed (see FIGS. 16 and 17) so that the REL-COMP message is transmitted to the mobile communication network 10 through the PIU 14 (at steps S313 and S314 in FIG. 24).

Figure 25:
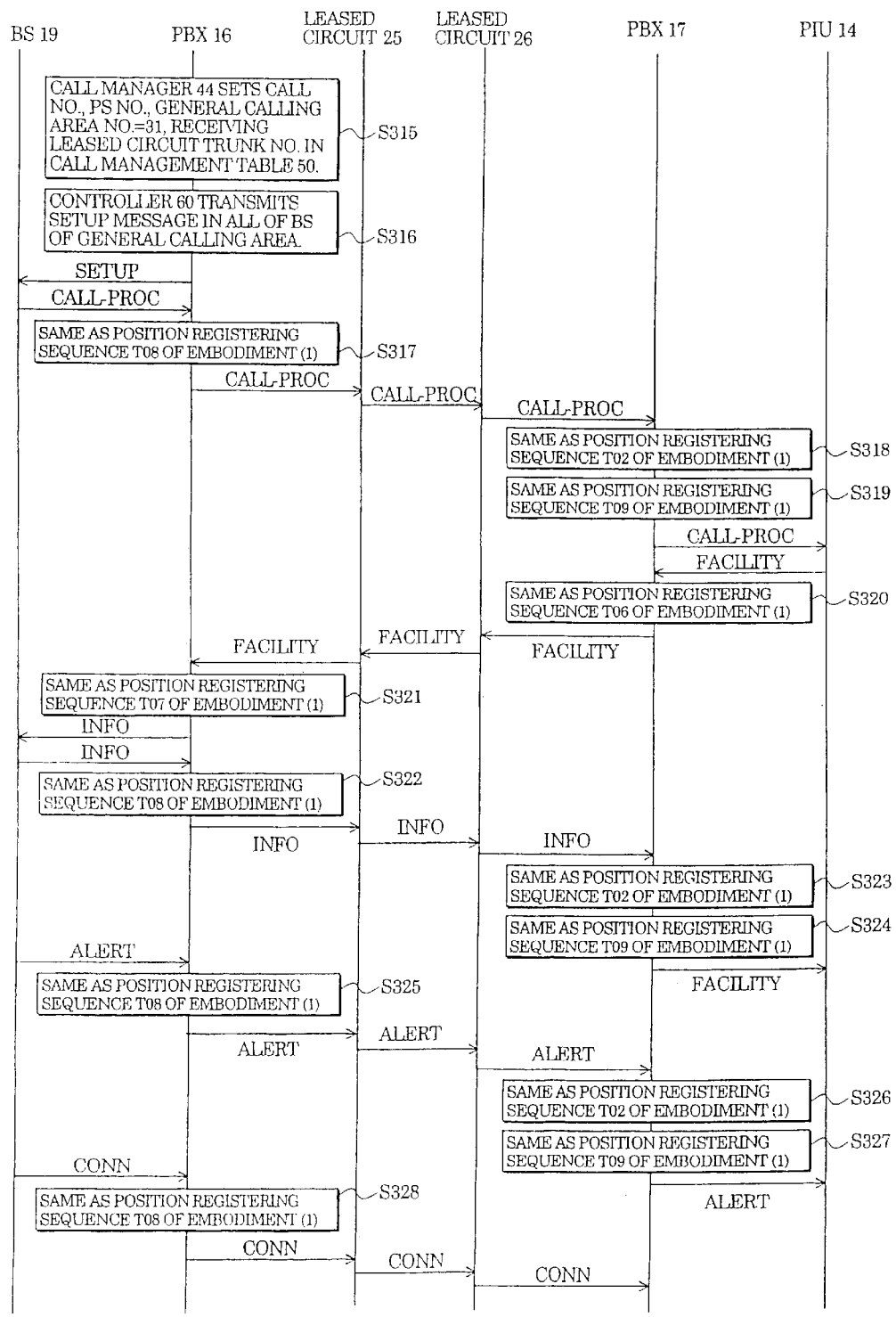
FIG. 25 is a flow chart (2) showing a called sequence of an embodiment (1) of a mobile communication system according to the present invention.

In FIG. 25, when such "blanks" in the call management table 50 for the PBX 16 is successfully captured, the call manager 44 sets the call No., the PS No., the general calling area No.="31", and the trunk No. of the called leased circuit 25="25" in the call management table 50 to activate the message transmission/reception controller 40 (at step S315).

After converting the message into the BS protocol at the message converting unit 49, the message transmission/reception controller 40 transmits the SETUP message to all of the accommodated BS's 19 and 20 (at step S316).

The message transmission/reception controller 40 receives the CALL-PROC message from the PHS 22.

Hereinafter, the same process as step T08 of the position registering sequence will be performed so that the CALL-PROC message is transmitted to the PBX 17 (at step S317). It is to be noted that in this step S317 the message analyzer 42 of the PBX 16 searches the call management table 50 with the call No. extracted from the CALL-PROC message, adds the request information converting value="3" to the lead of the normalizing call area No.="1" of the block having the same call No., and resets the general calling area No.="31" in the call management table 50.

In the PBX 17, the same process as steps T02 and T09 of the position registering sequence will be sequentially performed so that the CALL-PROC message is transmitted to the mobile communication network 10 through the PIU 14 (at steps S318 and S319).

The message transmission/reception controller 60 of the PBX 17 receives the FACILITY message transmitted from the PIU 14.

Hereinafter, the same process as steps T06 and T07 of the position registering sequence will be performed so that the FACILITY message is converted into the INFO message through the PBX 16 and the BS 19 to be transmitted to the PHS 22 (at steps S320 and S321).

It is to be noted that in the step S321 the message analyzer 42 deletes the lead "3" (request information converting value) from the normalizing call area No.="31" to convert the normalizing call area No. into the general calling area No.="1". The INFO message is transmitted to the PHS 22 through the BS 19 based on the general calling area No.

The PBX 16 receives the INFO message from the PHS 22 through the BS 19.

Hereinafter, the same process as step T08 of the position registering sequence will be performed so that the INFO message is transmitted to the PBX 17 (at step S322).

After performing the same process as steps T02 and T09 of the position registering sequence and converting the received INFO message into the FACILITY message in the PBX 17, the message is transmitted to the mobile communication network 10 through the PIU 14 (at steps S323 and S324).

Figure 26:
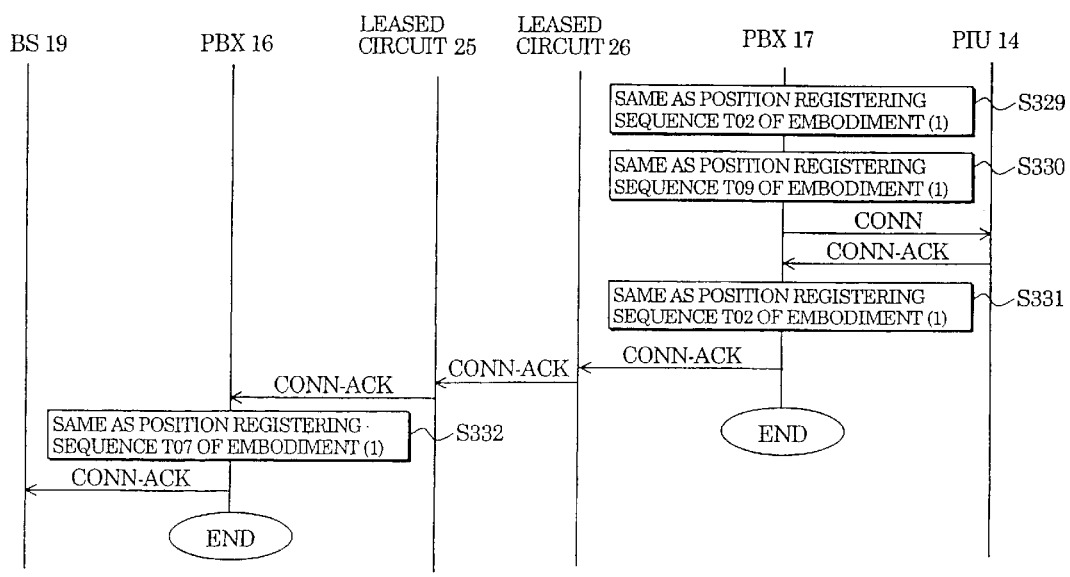
FIG. 26 is a flow chart (3) showing a called sequence of an embodiment (1) of a mobile communication system according to the present invention.

Similarly, the ALERT message and the CONN message transmitted from the PHS 22 are transferred to the mobile communication network 10 through the PBX 16, the PBX 17 and the PIU 14 (at steps S325–S328, steps S329 and S330 in FIG. 26).

In FIG. 26, the PBX 17 receives a CONN-ACK message from the PIU 14.

Hereinafter, the same process as steps T02 and T07 of the position registering sequence will be performed so that the CONN-ACK message is transmitted from the PBX 17 to the PHS 22 through the PBX 16 and the BS 19 (at steps S331 and S332).

It is now found that the call reception addressed to the PHS 22 from the mobile communication network 10 as well as the communication can be made even when the position registration of the PHS 22 within the area of the PBX 16 is performed through the PIU 14 of the PBX 17.

Figure 27:
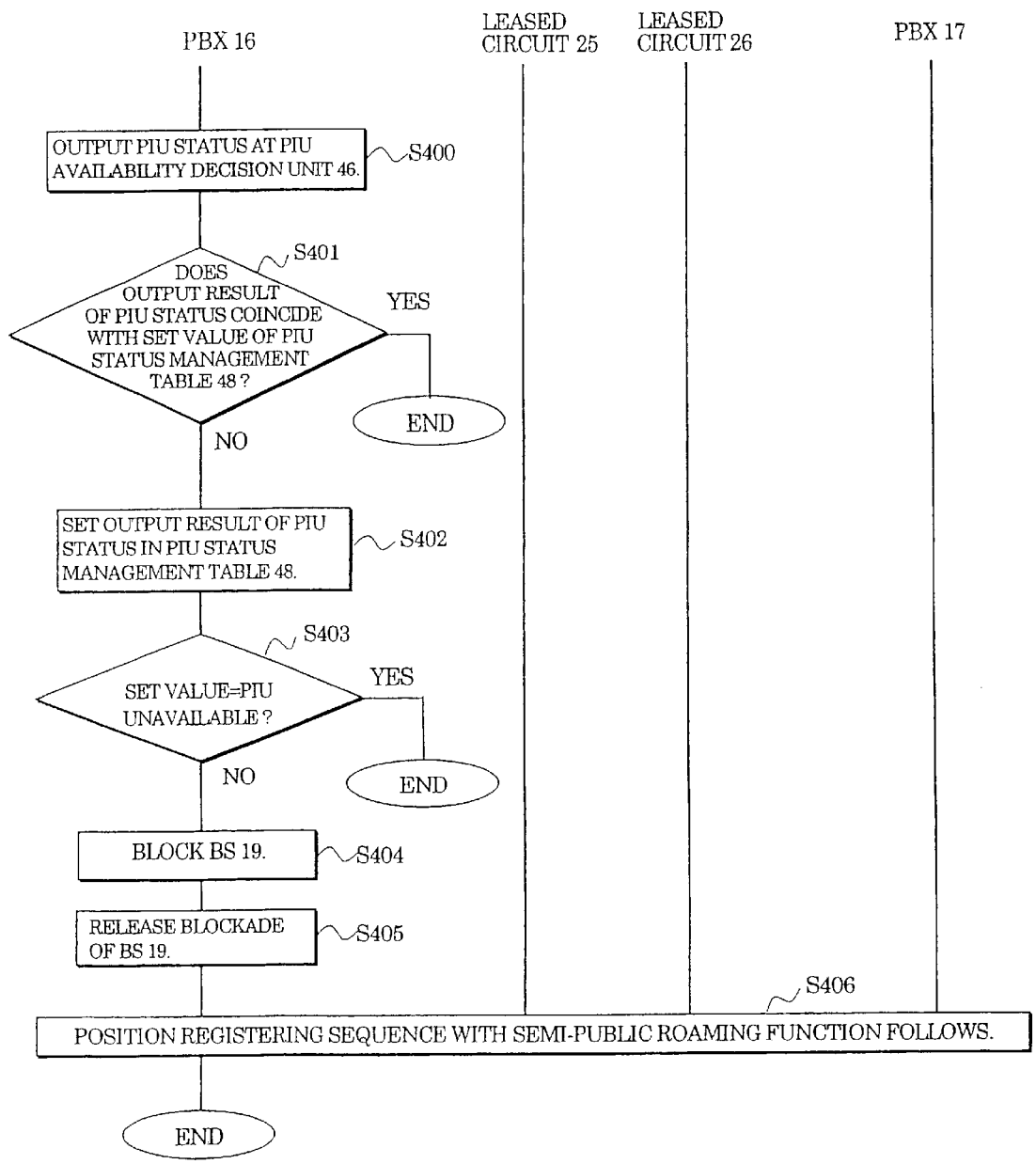
FIG. 27 is a flow chart showing a re-position registering sequence of an embodiment (1) of a mobile communication system according to the present invention.

Next, there will be described referring to FIG. 27 a procedure example by which the PBX 16 makes a re-position registration through its own PIU when the position registration of the PHS 22 has been already made through another PBX and its own PIU 13 is restored to be available.

The PIU checking unit 52 of the PBX 16 (see FIG. 9) is periodically activated and checks whether or not at least the PIU is available with the PIU availability decision unit 46. Namely, the PIU availability decision unit 46 outputs e.g. "2" indicating that there is no available PIU when the PIU 13 or the like accommodated in the PBX 16 is not equipped, all of the PIU's are equipped but occupied, or all of the PIU's are faulted. Otherwise, the PIU availability decision unit 46 outputs e.g. "1" indicating that there is an available PIU, and activates the PIU checking unit 52 (at step S400 in FIG. 27).

Figure 28:
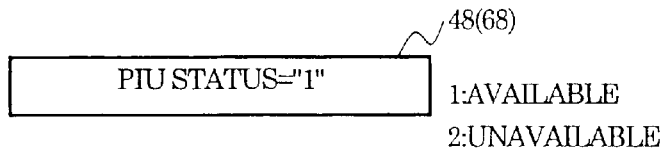
FIG. 28 is a diagram showing a PIU status management table example in an embodiment (1) of a mobile communication system according to the present invention.

FIG. 28 shows an example of PIU status management table 48, where the status of the PIU connected to the PBX 16 is set. Namely, "2" is set in the table 48 when all of the PIU's accommodated in the PBX 16 are unavailable. Otherwise "1" is set.

The PIU checking unit 52 leaves the set value as it is when the set value of the PIU status management table 48 coincides with the output result, and otherwise resets the output result in the PIU status management table 48 (at steps S401 and S402).

When the output result does not coincide with the set value which is "2" (unavailable), the set value is left as it is (at step S403). When the set value is "1" (available), a block/block release request is made from the PBX 16 to the BS 19 (at steps S404 and S405). Accordingly, BS 19 is re-started so that the position registering request is made again from the PHS 22 existing in the general calling area to which the BS 19 belongs.

Hereinafter, the position registering sequence by the normal semi-public roaming function through the PIU 13 will be performed (at step S406).

Thus, it becomes possible to make a re-position registration of the PHS 22 existing in the general calling area 81 in the mobile communication network 10 through the PIU 13.

Next, there will be described a procedure by which the PBX 16 checks whether or not its own PIU 13 and the leased circuits 25 and 27 are available and the position registration is performed through the available PIU or the available leased circuit. It is to be noted that the PIU which the PBX 16 accommodates may be plural.

Figure 29:
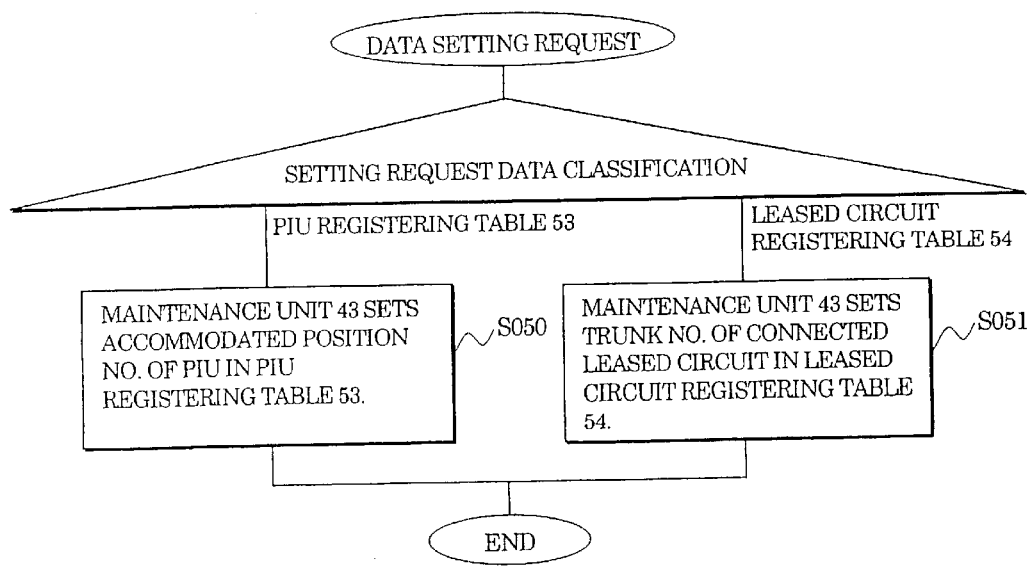
FIG. 29 is a flow chart showing a data setting procedure (3) in an embodiment (1) of a mobile communication system according to the present invention.

FIG. 29 shows a data initial setting procedure in the form of flow chart in which the maintenance person of the PBX 16 transmits registration request data of the PIU 13 and the leased circuits 25 and 27 preliminarily connected to the PBX 16 to the maintenance unit 43 through the maintenance terminal 29.

Figure 30:
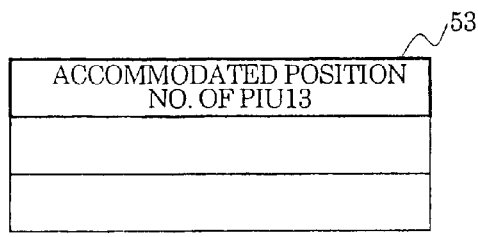
FIG. 30 is a diagram showing a PIU registering table example in an embodiment (1) of a mobile communication system according to the present invention.
Figure 31:
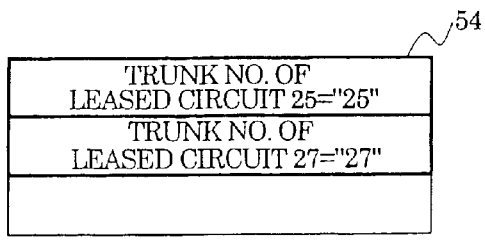
FIG. 31 is a diagram showing a leased circuit registering table example in an embodiment (1) of a mobile communication system according to the present invention.

When the data indicates a PIU registering table setting request, the maintenance unit 43 sets an accommodated position number of the PIU 13 accommodated in the PBX 16 in the PIU registering table 53 shown in FIG. 30 (at step S050 in FIG. 29), while setting the trunk No. of the leased circuits 25 and 27 connected to the PBX 16 in the leased circuit registering table 54 shown in FIG. 31 when the data indicates the setting request of the leased circuit registering table (at step S051).

It is to be noted that in the embodiment of the PIU registering table 53 shown in FIG. 30, the accommodated No. of the PIU 13 which the PBX 16 accommodates is set. Also, in the embodiment of the leased circuit registering table 54 shown in FIG. 31, the trunk Nos. "25" and "27" of the leased circuits 25 and 27 connected to the PBX 16 are set.

Furthermore, the maintenance persons of the PBX 16 and PBX 17 respectively perform the data setting shown in FIGS. 10 and 14.

Figure 32:
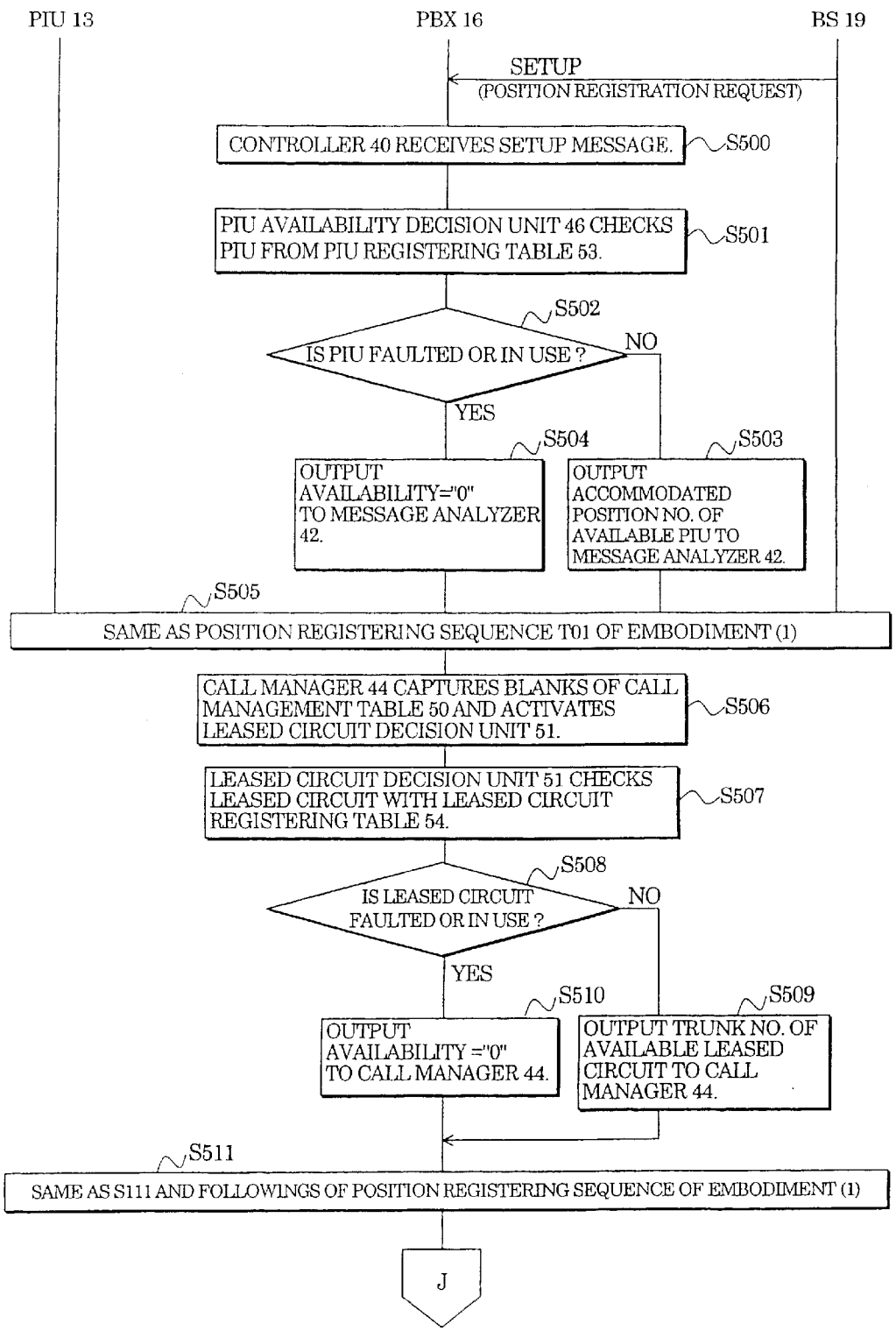
FIG. 32 is a flow chart showing a PIU and a leased circuit checking sequence of an embodiment (1) of a mobile communication system according to the present invention.

FIG. 32 shows a procedure of checking the available PIU and the leased circuit and of performing the position registration. The message transmission/reception controller 40 of the PBX 16 receives the SETUP message (position registering request) from the PHS 22 through the BS 19 (at step S500). Then the message transmission/reception controller 40 reads the information element of the SETUP message, and recognizes the BS No. and the PS No. to activate the massage analyzer 42. This message analyzer 42 activates the PIU availability decision unit 46.

The PIU availability decision unit 46 decides whether the PIU 13 is faulted or occupied corresponding to the accommodated position number of the PIU 13 set in the PIU registering table 53 (at steps S501 and S502), outputs "0" indicating that there is no available PIU if it is the case (at step S504), outputs "the accommodated position number of the PIU 13" indicating that there is an available PIU if it is not the case (at step S503), and activates the message analyzer 42.

Hereinafter, the same process as step T01 (within a dotted line) of the position registering sequence shown in FIG. 15 will be performed regardless of the existence of available PIU. Namely, in the presence of an available PIU, the position registration is made through this PIU, while otherwise the request information converting value is added to the lead of the general calling area No. (at step S505).

The call manager 44 captures blanks of the call management table 50 to activate the leased circuit decision unit 51 (at step S506). The leased circuit decision unit 51 checks whether the PIU is faulted or occupied according to the trunk No. of the leased circuit 25 set in the leased circuit registering table 54 (at steps S507 and S508), outputs "0" indicating that there is no available leased circuit if it is the case (at step S510), and outputs e.g. "the trunk No. 25 of the leased circuit 25" indicating that there is an available leased circuit if it is not the case (at step S509), thereby activating the call manager 44.

The following operation is the same as step S111 and the followings of the position registering sequence shown in FIG. 15 (at step S511).

Thus, the position registration of the PHS 22 within the PBS 16 is made possible through an available PIU or leased circuit after deciding whether or not the PIU 13 and leased circuits 25 and 27 connected to the PBX 16 are available.

Next, there will be described a procedure by which the PBX 16 inquires the availability of the PIU of another PBX through the leased circuit and performs the position registration from the PBX accommodating the available PIU.

The maintenance person of the PBX 16 makes the leased circuit registering table setting request for the leased circuit preliminarily connected to the PBX 16 from the maintenance terminal 29. The maintenance unit 43 sets the trunk No. of the leased circuit 25 connected to the PBX 16 in the leased circuit registering table 54. Also, the maintenance persons of the PBX's 16 and 17 respectively perform the data setting shown in FIGS. 10 and 14.

The message transmission/reception controller 40 of the PBX 16 firstly receives the SETUP message (position registering request) from the PHS 22. Then, the message transmission/reception controller 40 reads the information element of the SETUP message, recognizes the BS No. and PS No., and activates the message analyzer 42. The message analyzer 42 activates the PIU availability decision unit 46.

The PIU availability decision unit 46 checks whether or not there is an available PIU referring to the PIU registering table 53 to activate the message analyzer 42. When there is no available PIU, the message analyzer 42 activates the call manager 44 in order to inquiry the other PBX's 17 and 18 whether or not there is an available PIU.

Figure 33:
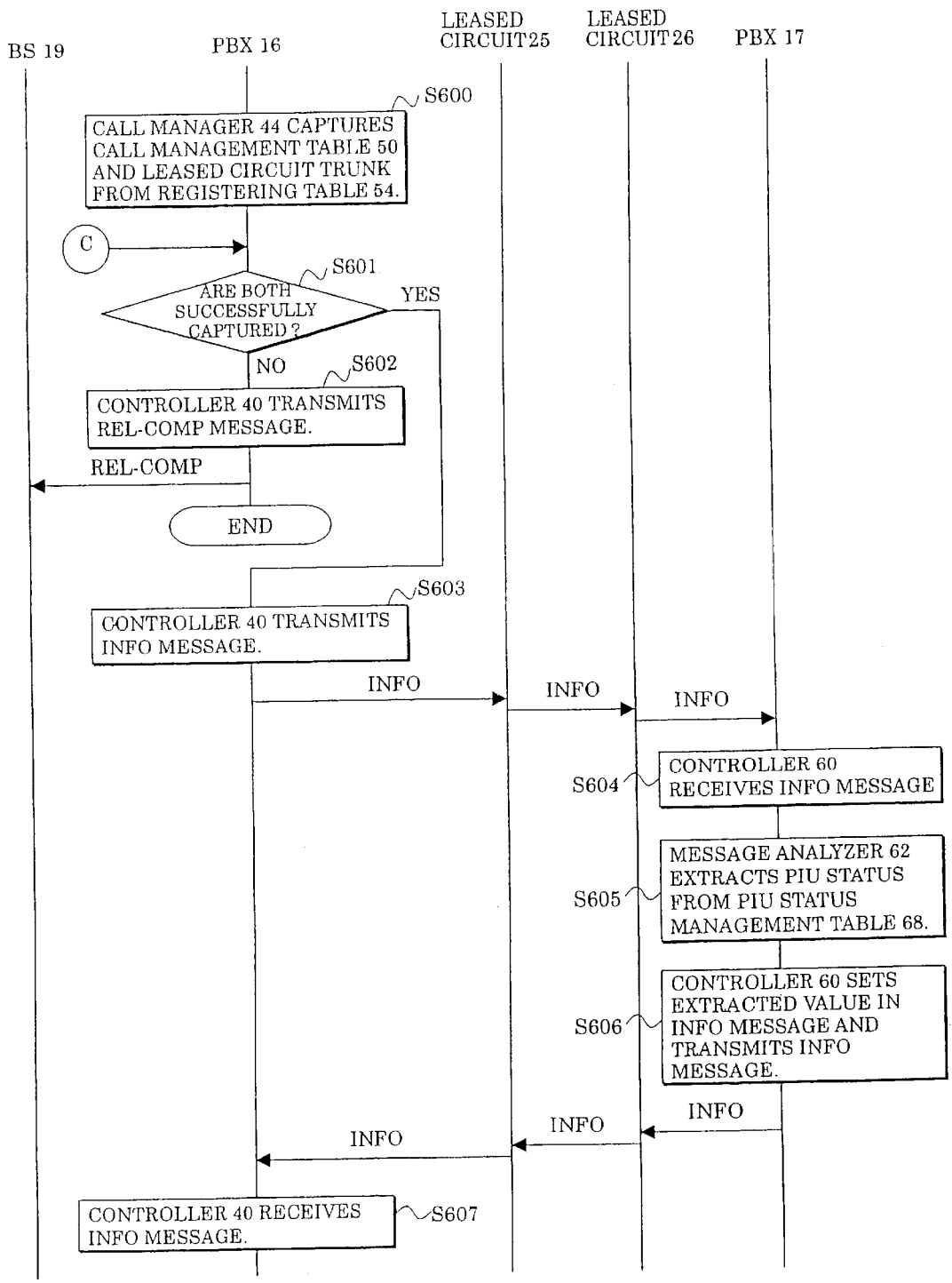
FIG. 33 is a flow chart (1) showing an inquiring sequence of an embodiment (1) of a mobile communication system according to the present invention.

In FIG. 33, the call manager 44 captures blanks of the call management table 50 and the leased circuit trunk from the leased circuit registering table 54 (at step 600).

Upon the failure of capturing blanks of the call management table 50 or the leased circuit trunk, the call manager 44 decides it impossible to process, and activates the message transmission/reception controller 40 to transmit the REL-COMP (release completed) to the PHS's 22 and 23 (at steps S601 and S602).

When both are captured, the call manager 44 sets the call No., the PS No., and an inquiring value as to the presence of an available PIU (e.g. "35") in the call management table 50, and makes an activation request for the message transmission/reception controller 40. The message transmission/reception controller 40 sets the call No. and the inquiring value within the call management table 50 in the INFO message (an inquiry message) to transmit the message to the PBX 17 through the captured leased circuit 25 (at step S603).

The message transmission/reception controller 60 of the PBX 17 receives the INFO message (at step S604), reads the information element of the INFO message, extracts the inquiring value="35", and activates the message analyzer 62. The message analyzer 62 extracts the set value of the PIU status management table 68, and activates the message transmission/reception controller 60 (at step S605).

The message transmission/reception controller 60 sets the extracted set value in the INFO message, which is transmitted to the PBX 16 through the called leased circuit 26 (at step S606).

The message transmission/reception controller 40 of the PBX 16 receives the INFO message (at step S607), reads the information element from this message, extracts the set value of the PIU status management table 68, and activates the message analyzer 42.

Figure 34:
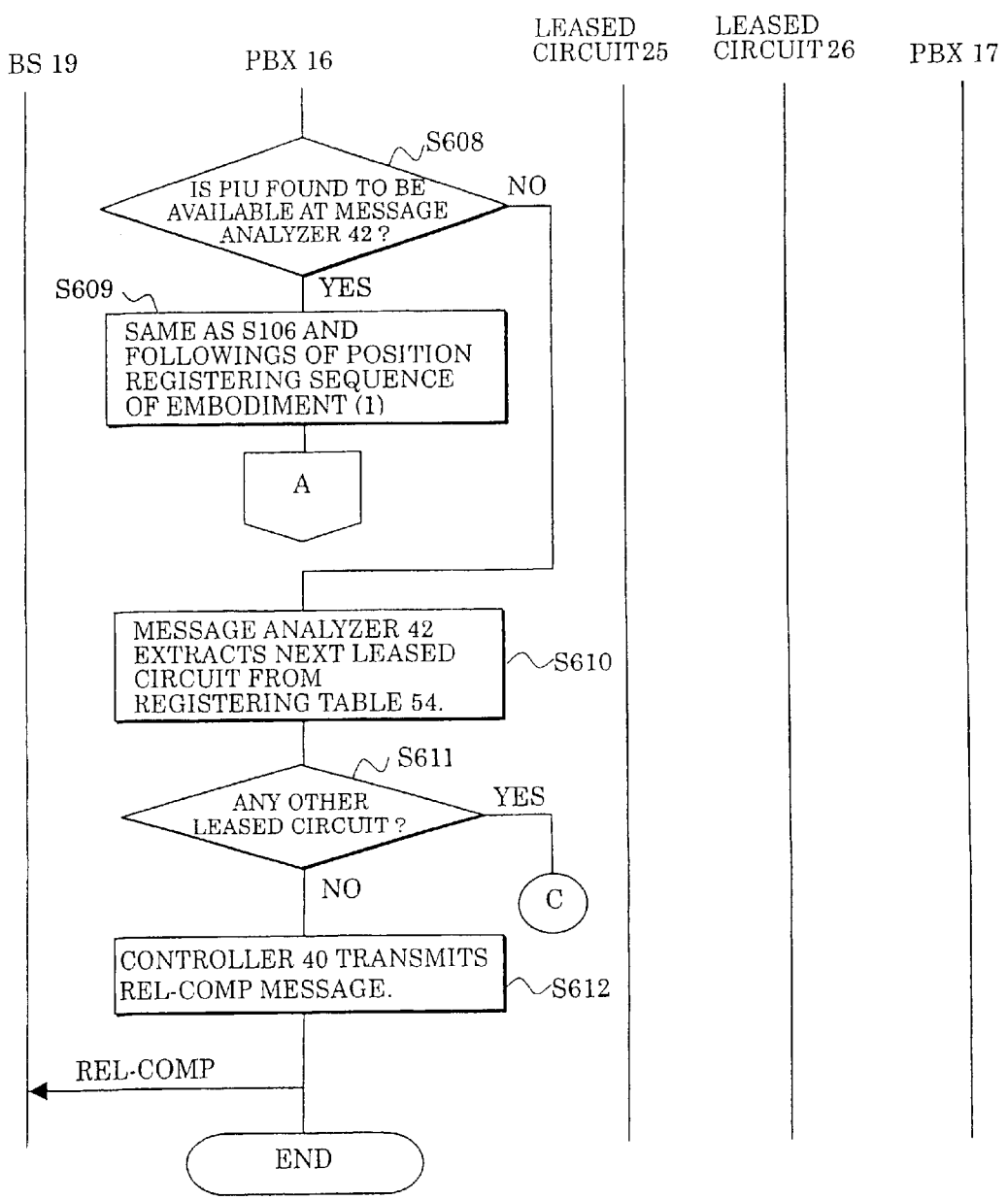
FIG. 34 is a flow chart (2) showing an inquiring sequence of an embodiment (1) of a mobile communication system according to the present invention.

In FIG. 34, if it is found that the extracted set value indicates "available" e.g. "1" (at step S608 in FIG. 34), the message analyzer 42 shifts to the same process as step S106 and the followings of the position registering sequence to make the position registering request by the PBX 17 (at step S609 in FIG. 34).

If it is found that the extracted set value indicates "unavailable" e.g. "2", the message analyzer 42 captures the next available leased circuit trunk from the leased circuit registering table 54 (at steps S610 and S611), and returns to step S601 in FIG. 33 for the repetition of the same process.

If all of the leased circuits registered in the leased registering table 54 are unavailable, the message analyzer 42 decides it impossible to process, activates the message transmission/reception controller 40 to return the REL-COMP (release completed) message to the PHS 22 (at step S612).

Thus, when the PIU 13 accommodated in the PBX 16 is not available, the message analyzer 42 inquiries whether or not there is an available PIU to another PBX whereby the position registration/communication and the like of the PHS 22 can be performed through the PBX accommodating the available PIU.

Figure 35:
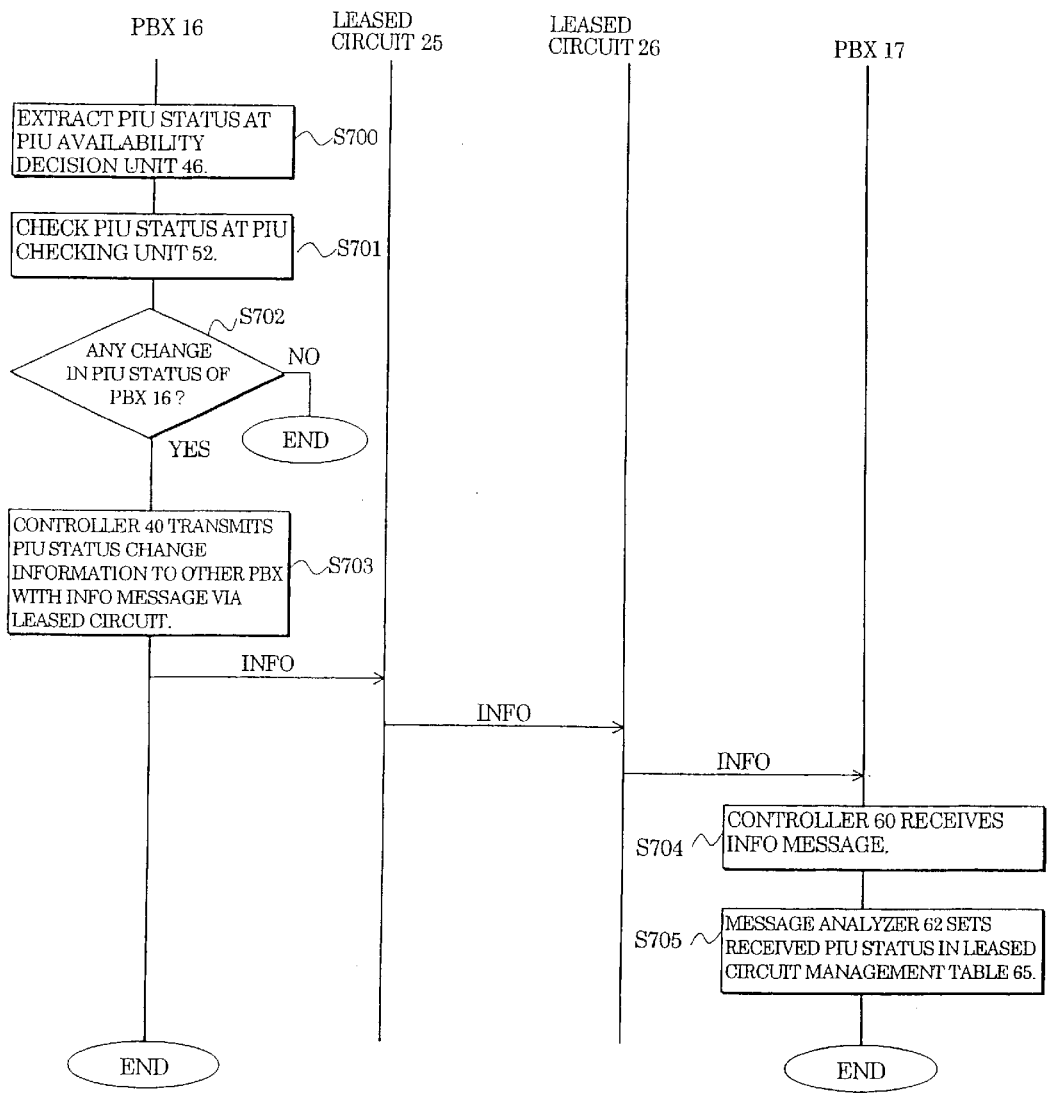
FIG. 35 is a flow chart showing a PIU information/storage sequence of an embodiment (1) of a mobile communication system according to the present invention.

A procedure will now be described referring to FIG. 35 when each PBX monitors the availability of its own PIU and notifies the monitored information to all of the PBX's through the leased circuit, and the PBX manages the monitored information and performs the position registration based on the monitored information.

The PIU checking unit 52 of the PBX 16 periodically activates the PIU availability decision unit 46, which checks whether or not the PIU 13 is available. Namely, the PIU availability decision unit 46 checks whether or not the PIU within the PBX 16 is equipped, and whether or not it is occupied/faulted if equipped (at step S700).

The PIU availability decision unit 46 extracts e.g. "2" (unavailable) when the PIU is not equipped, occupied, or faulted, and otherwise extracts e.g. "1" (available) to activate the PIU checking unit 52.

When the set value of the PIU status management table 48 coincides with the extracted result, the PIU checking unit 52 leaves the set value as it is, and otherwise checks its own PIU status by setting the extracted result in the PIU status management table 48 (at step S701).

The PIU checking unit 52 activates the message transmission/reception controller 40 when the PIU status is changing from "available" status to "unavailable" status, or vice versa (at step S702).

The message transmission/reception controller 40 captures the leased circuit 25 by the leased circuit decision unit 51, and sets the set value of the PIU status management table 48 as PIU status change information in the INFO message to be transmitted to the PBX 17 through the captured leased circuit 25 (at step S703).

The message transmission/reception controller 60 of the PBX 17 receives the INFO message (at step S704). Then, the message transmission/reception controller 60 extracts the trunk No. of the called leased circuit 26 as well as the PIU status change information from the information element of the INFO message to activate the message analyzer 62.

The message transmission/reception controller 60 searches the leased circuit management table 65 with the trunk No. of the leased circuit which is extracted and called, and sets the PIU status change information in the usage status area of the coincident block (at step S705).

Similarly, each of the PBX's 16, 17, and 18 notifies its own PIU status change information to other PBX's. The PBX having received the notification manages this in its own leased circuit management table.

Thus, it becomes possible to manage the PIU statuses which its own PBX and other PBX's accommodate.

Next, there will be described a procedure by which the PBX 16 selects the leased circuit according to the predetermined priority and makes the position registration or the call transmission request through the selected leased circuit.

Figure 36:
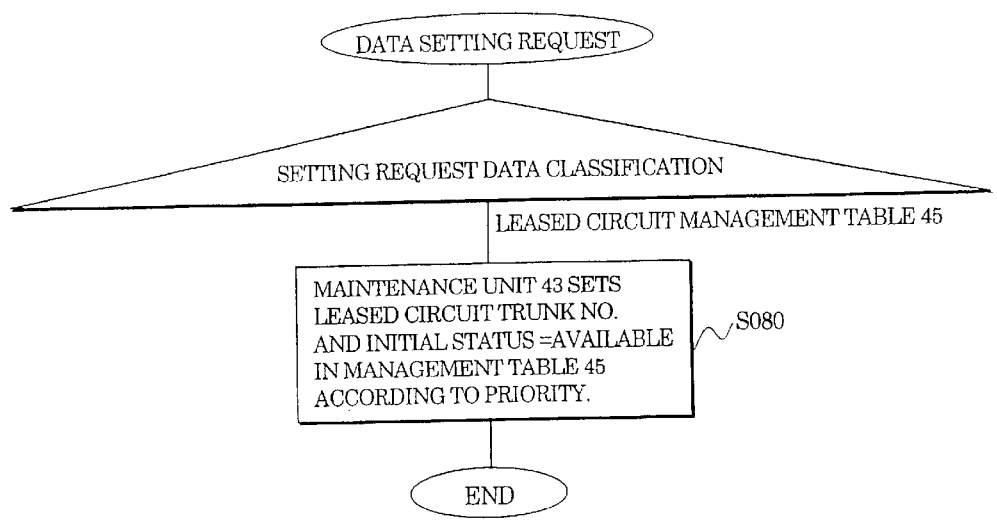
FIG. 36 is a flow chart showing a data setting procedure (4) in an embodiment (1) of a mobile communication system according to the present invention.

In FIG. 36, the maintenance person of the PBX 16 preliminarily registers the trunk No. of the leased circuit 25="25" as well as the usage status "1" (available) as the leased circuit whose priority is "1" in the leased circuit management table 45 (see FIG. 13) of the PBX 16 from the maintenance terminal 29. Furthermore, the maintenance person of the PBX 16 registers the trunk No. of the leased circuit 27="27" as the leased circuit whose priority is "2" as well as the usage status "1" (available) from the maintenance terminal 29 (at step S080).

The maintenance unit 43 sets the trunk No.="25" as well as the usage status "1" (available) of the leased circuit 25 in the first block of the leased circuit management table 45 and sets the trunk No.="27" as well as the usage statue "1" of the leased circuit 27 in the second block.

Firstly, for the position registration, the same process as steps S100–S109 of the position registering sequence shown in FIG. 15 is executed. For the call transmission request, steps S200–S213 of the calling sequence are executed.

Figure 37:
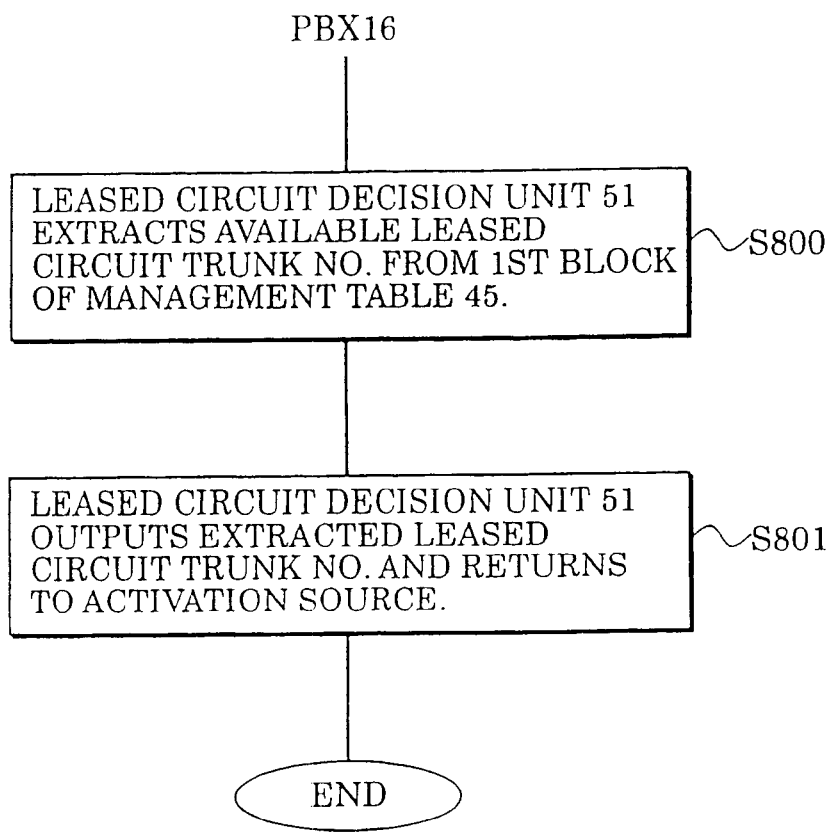
FIG. 37 is a flow chart showing a leased circuit decision sequence based on a priority of an embodiment (1) of a mobile communication system according to the present invention.

In FIG. 37, the leased circuit decision unit 51 is activated for the leased circuit capturing request. This leased circuit decision unit 51 checks the status of the leased circuit of the first block registered in the leased circuit management table 45 (at step S800).

In case of "1" (available), the leased circuit decision unit 51 captures the leased circuit 25 with the leased circuit trunk No. registered in the first block, outputs the same, and returns to the activation program (at step S801).

In case of "2" (unavailable), the leased circuit decision unit 51 checks the status of the leased circuit trunk registered in the next block to capture the available leased circuit. When all of the least circuits are unavailable, the leased circuit decision unit 51 decides that no leased circuit is captured, outputs e.g. "0", and returns to the activation program.

Thus, when the PHS 22 within the PBX 16 makes a position registration or call, an available PIU can be selected from the PIU of other PBX's according to the priority if the PIU within the PBX 16 is unavailable.

Next, there will be described a procedure by which the PBX 16 equally selects the other PBX's registered and makes the position registration or the call transmission.

Figure 38:
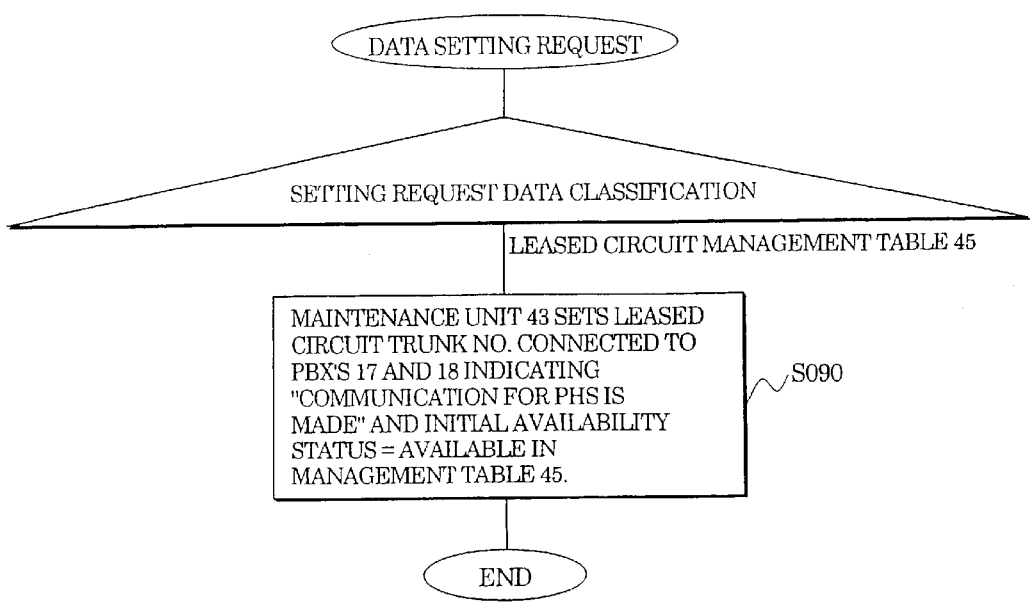
FIG. 38 is a flow chart showing a data setting procedure (5) in an embodiment (1) of a mobile communication system according to the present invention.

FIG. 38 shows a procedure example of presetting data in the leased circuit management table 45 (see FIG. 13). The maintenance person registers the trunk No.="25" as well as the usage status "1" (available) of the leased circuit 25 in the first block of the leased circuit management table 45 from the maintenance terminal 29 and registers the trunk No.="27" as well as usage status "1" (available) of the leased circuit 27 in the second block.

For the position registration, the same process as steps S100–S109 of the position registering sequence shown in FIG. 15 is executed. For the call transmission, steps S200–S213 of the calling sequence shown in FIG. 21 are executed.

Figure 39:
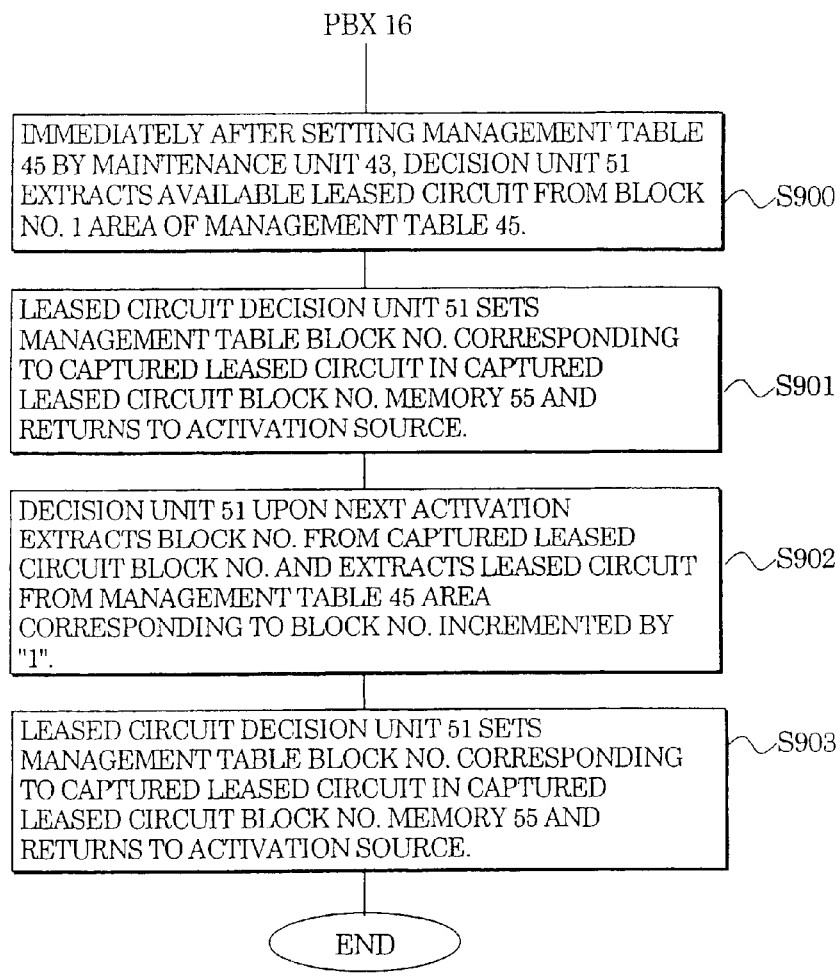
FIG. 39 shows a flow chart showing an equal leased circuit decision sequence of an embodiment (1) of a mobile communication system according to the present invention.

In FIG. 39, the leased circuit decision unit 51 is activated for the leased circuit capturing request. The leased circuit decision unit 51 checks the status of the leased circuit of the first block registered in the leased circuit management table 45. In case of "available"="1", the leased circuit decision unit 51 captures the leased circuit 25 with the leased circuit trunk No. "25" registered in the first block (at step S900), sets the block No.="1" in the capturing leased circuit block No. memory 55 shown in FIG. 40, and outputs the capturing leased circuit 25, and returns to the activation program (at step S901).

Figure 40:
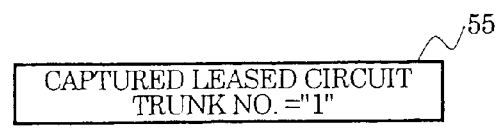
FIG. 40 is a diagram showing an example of a capturing leased circuit-block number memory in an embodiment (1) of a mobile communication system according to the present invention.

The block No. of the captured leased circuit is set in the captured leased circuit block number memory 55 shown in FIG. 40.

At the next activation time of the leased circuit decision unit 51, the leased circuit decision unit 51 extracts a captured leased circuit block No. from the captured leased circuit block number memory, adds the extracted block No. "1" in the leased circuit management table 45 by "1" to obtain the next block No. "2". The leased circuit decision unit 51 checks the status of the leased circuit registered in the area corresponding to the block No. "2" (at step S902).

In case of "available"="1", the leased circuit decision unit 51 captures the leased circuit 27 based on the trunk No. of the registered leased circuit "27", sets the block No.="2" in the captured leased circuit block number memory 55, and outputs the captured leased circuit 27, and returns to the activation program (at step S903).

Namely, the leased circuit decision unit 51 decides the next block No. by sequentially incrementing the block No. by "1" every time the leased circuit decision unit 51 is activated. In excess of the block No. which is not registered, the leased circuit decision unit 51 returns to the initial first block for the repetition of the same process.

Thus, when the PIU 13 of the PBX 16 is not available upon the position registration or the call transmission from the PHS within the PBX 16, it becomes possible to equally select an available PIU from the PIU's (registered leased circuits) of other registered PBX's.

Embodiment (2)

Next, an embodiment (2) of the mobile communication system according to the present invention will be described referring to FIG. 41.

The mobile communication system of this embodiment is composed of the PBX 16 connected to the maintenance terminal 29, the PIU 13 connected to the PBX 16 and the mobile communication network 10, the BS's 19 and 20 connected to the PBX 16 and having the general calling areas 81 and 82 where the PHS's 22 and 23 respectively exist, the PBX 17 connected to the PBX 16 through the leased circuits 25 and 26, and the PIU 14 connected to the PBX 17 and mobile communication network 10.

The PBX 16 is composed of the channel unit 31, the central control unit 32, and the storage 33. The storage 33 is composed of the message transmission/reception controller 40, the message analyzer 42, the maintenance unit 43, the BS management table 47, a time readout unit 71, a PIU circuit-available number switchover table 72, a PIU circuit occupation table 73, a position registering decision unit 74, a time zone-PIU availability checking table 75, a time zone-available PIU switchover unit 76, a PIU extraction unit 77 corresponding to the general calling area, and a general calling management table 78.

There will be firstly described a sequence (1) in which the PIU 13 of the PBX 16 makes the position registration or the call transmission through the PIU 14 of the other PBX 17 and the leased circuit 25 in excess of a predetermined usage status.

Figure 42:
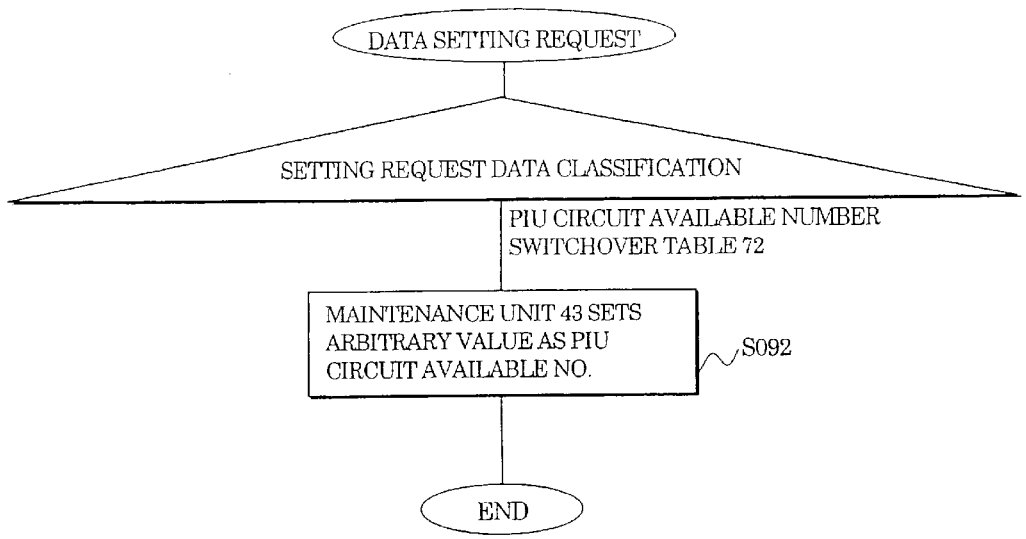
FIG. 42 is a flow chart showing a data setting procedure (1) in an embodiment (2) of a mobile communication system according to the present invention.
Figure 43:
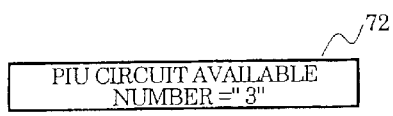
FIG. 43 is a diagram showing an example of an available PIU circuit number-switchover table in an embodiment (2) of a mobile communication system according to the present invention.

FIG. 42 shows a procedure of presetting data, where the maintenance person of the PBX 16 makes the setting request for the PIU circuit-available number=e.g. "3" to the switchover table 72 shown in FIG. 43, from the maintenance terminal 29.

The maintenance unit 43 receives the setting request from the maintenance terminal 29 to set the PIU circuit available number="3" in the switchover table 72.

Figure 44:
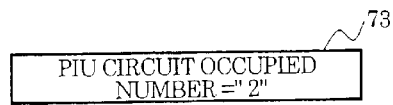
FIG. 44 is a diagram showing a PIU circuit-occupied table example in an embodiment (2) of a mobile communication system according to the present invention.

FIG. 44 shows an example of the occupation table 73, where the PIU circuit available number is set. When the PIU 13 is captured the PBX 16 increments the PIU circuit occupied number of the occupation table 73 by "1".

Figure 45:
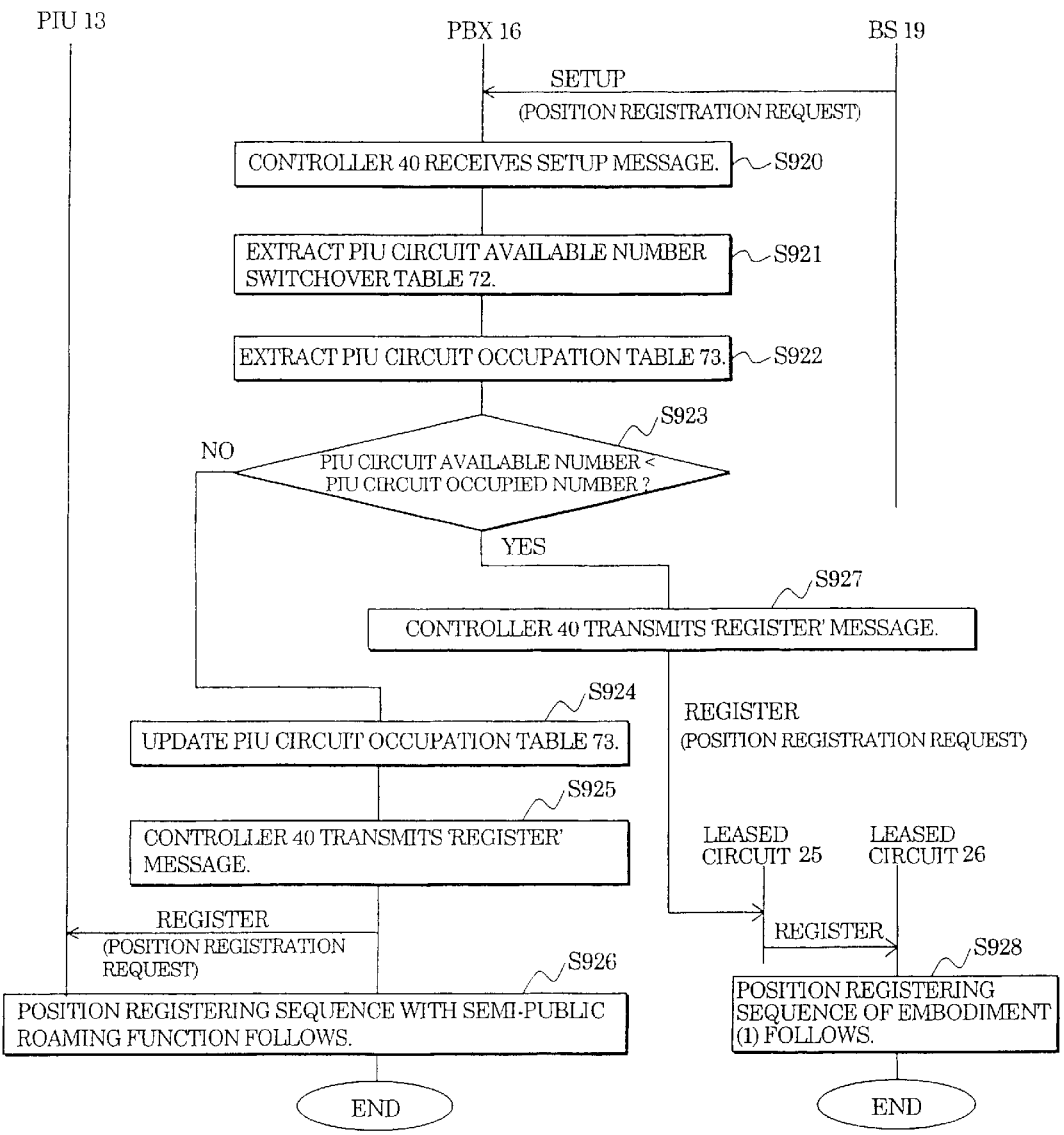
FIG. 45 is a flow chart showing a position registering sequence (1) of an embodiment (2) of a mobile communication system according to the present invention.

In FIG. 45, the message transmission/reception controller 40 receives the SETUP message (position registration) from the PHS 22 through the BS 19 and activates the position registering decision unit 74 (at step S920). The position registering decision unit 74 compares the PIU circuit occupation table 73 after updated with the switchover table 72 (at steps S921–S923).

In case of the occupation table 73 (e.g. "4")>the switchover table 72 (e.g. "3"), the position registering decision unit 74 recognizes that the position registration or the call transmission request is made at the PIU 14 of the PBX 17 through the leased circuit 25, and activates the message analyzer 42 to transmit the REGISTER message (position registration) from the transmission/reception controller 40 (at step S927).

The following position registration process is the same as that of step S106 and the followings of the position registering sequence of the embodiment (1) (at step S928).

On the other hand, in case of the PIU circuit occupation table 73 (e.g. "2")≦the PIU circuit available number switchover table 72 (e.g. "3"), the position registering decision unit 74 recognizes that the REGISTER message (position registration) is made through the PIU 13 which the PBX 16 accommodates, updates the PIU circuit occupation table 73 (at step S924), and transmits the REGISTER message to the PIU 13 (at step S925).

The following position registering process is the same as the position registering sequence of the semi-public roaming function (at step S926).

It is to be noted that when the call transmission request is made at the PIU 14 of the other PBX 17 after the message transmission/reception controller 60 receives the call transmission request at step S920 and performs the same process, the same process as step S206 and the followings of the calling sequence of the embodiment (1) may be performed.

Next, there will be described a sequence by which the PBX 16 selects the leased circuit according to the time zone and makes the position registering or the call transmission request of the PHS 22 by using the semi-public roaming function of the PIU of another PBX through the selected leased circuit.

Figure 46:
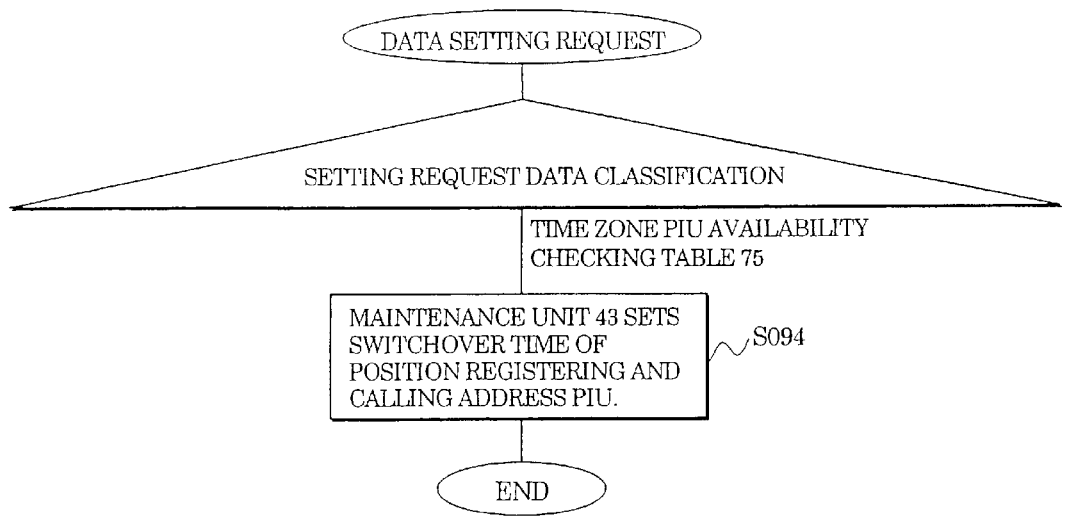
FIG. 46 is a flow chart showing a procedure example (2) of a data setting in an embodiment (2) of a mobile communication system according to the present invention.

FIG. 46 shows a procedure of presetting data, where the maintenance person of the PBX 16 sets a time zone when the position registration can be made with the semi-public roaming function of the PIU 13 in the checking table 75 (at step S094).

Figure 47:
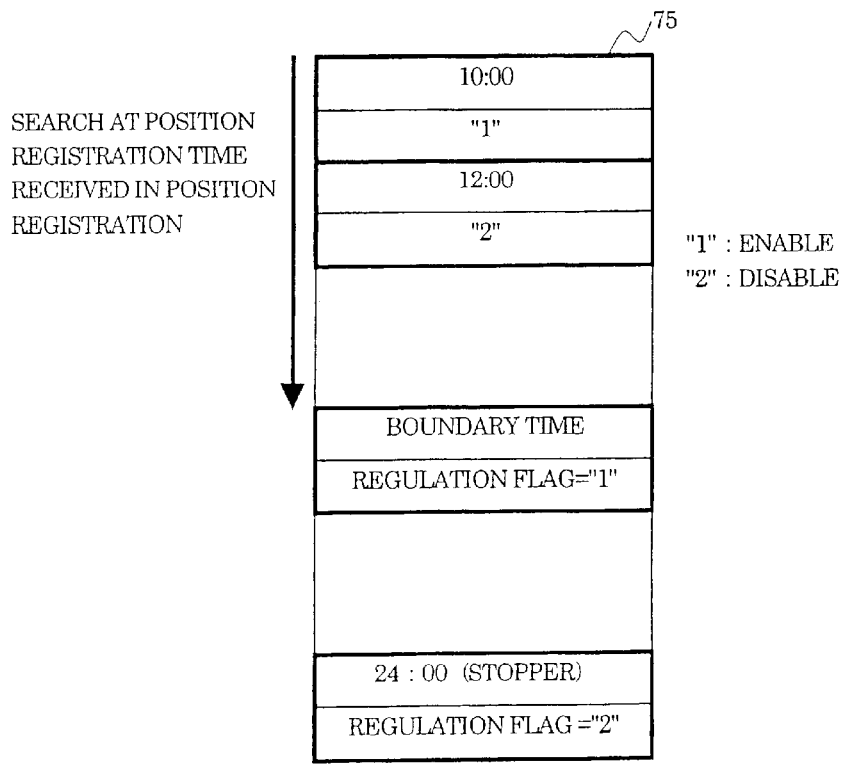
FIG. 47 is a diagram showing an example of a time zone PIU available checking table in an embodiment (2) of a mobile communication system according to the present invention.

The checking table 75 shown in FIG. 47 is composed of a plurality of blocks comprising a boundary time and a regulation flag. The boundary time of the time zone is set in "boundary time" so that the regulation flag indicates whether or not the time zone up to the designated boundary time is available. In case of "available", "1" is set and otherwise "2" is set.

In a setting example of FIG. 47, "the PIU 13 of the PBX 16 is available from AM0:00 to AM9:59 while being unavailable from AM10:00 to AM11:59" is set. It is to be noted that if 24:00 is set in the boundary time the block forms a stopper, indicating no data in the following area.

Figure 48:
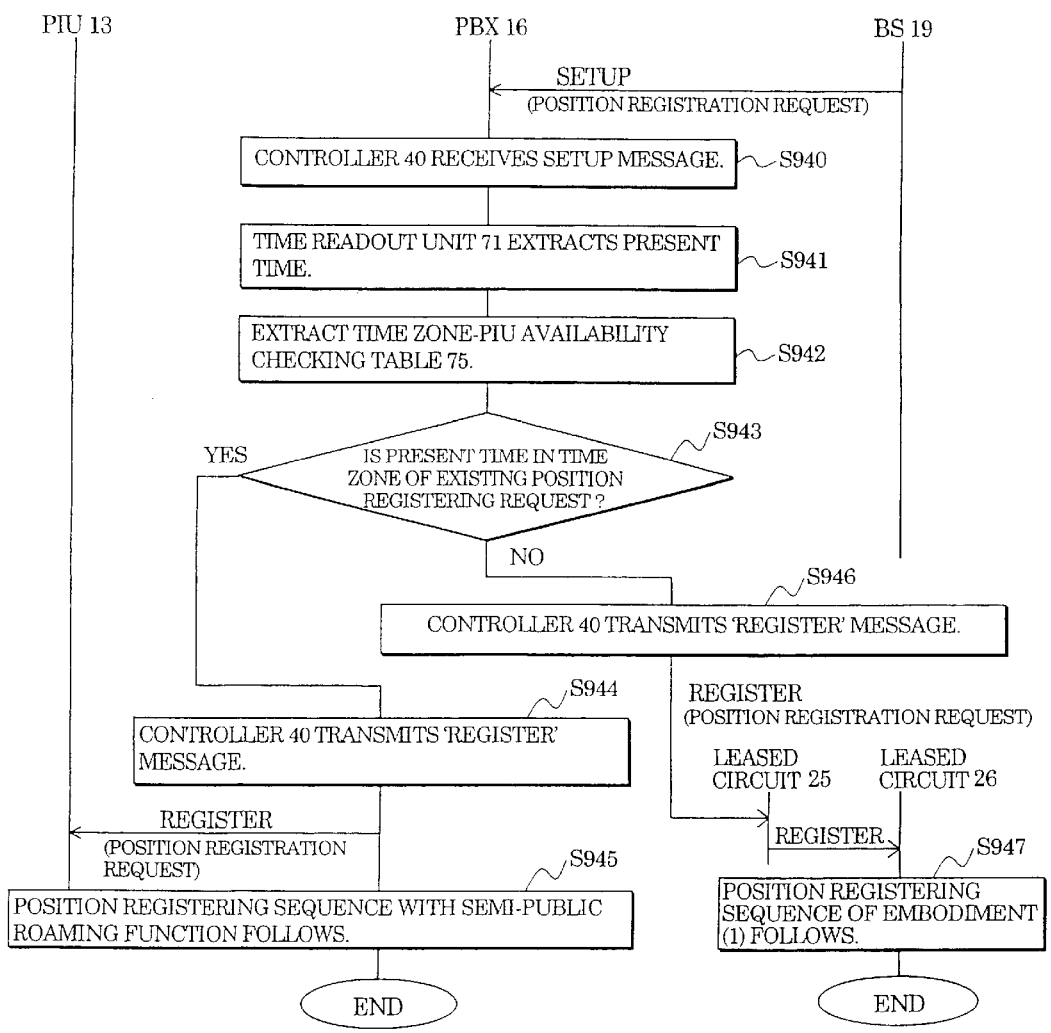
FIG. 48 is a flow chart showing a position registering sequence (2) of an embodiment (2) of a mobile communication system according to the present invention.

In FIG. 48, the message transmission/reception controller 40 receives the SETUP message (position registration) from the PHS 22 through the BS 19 (at step S940) to activate the switchover unit 76.

The switchover unit 76 reads the present time by the time readout unit 71 (at step S941), and compares the time with the information set in the checking table 75 (at steps S942 and S943).

When the present time is AM0:00–AM9:59, the switchover unit 76 recognizes that "the position registration is made" through the PIU 13 within the PBX 16, and activates the message transmission/reception controller 40 to make the position registering request (at step S944).

Hereinafter, the position registering sequence with the semi-public roaming function is performed (at step S945).

When the present time is AM10:00–AM11:59, the switchover unit 76 recognizes that "the position registration is not made" through the PIU 13 within the PBX 16, and activates the message analyzer 42 (at step S946).

The following position registering process is the same as step S106 and the followings of the position registering sequence of the embodiment (1).

It is to be noted that when the call transmission request is made at the PIU 14 of the other PBX 17 after the message transmission/reception controller 60 receives the call transmission request at step S940 and performs the same process, the same process as step S206 and the followings of the calling sequence of the embodiment (1) may be performed.

Figure 41:
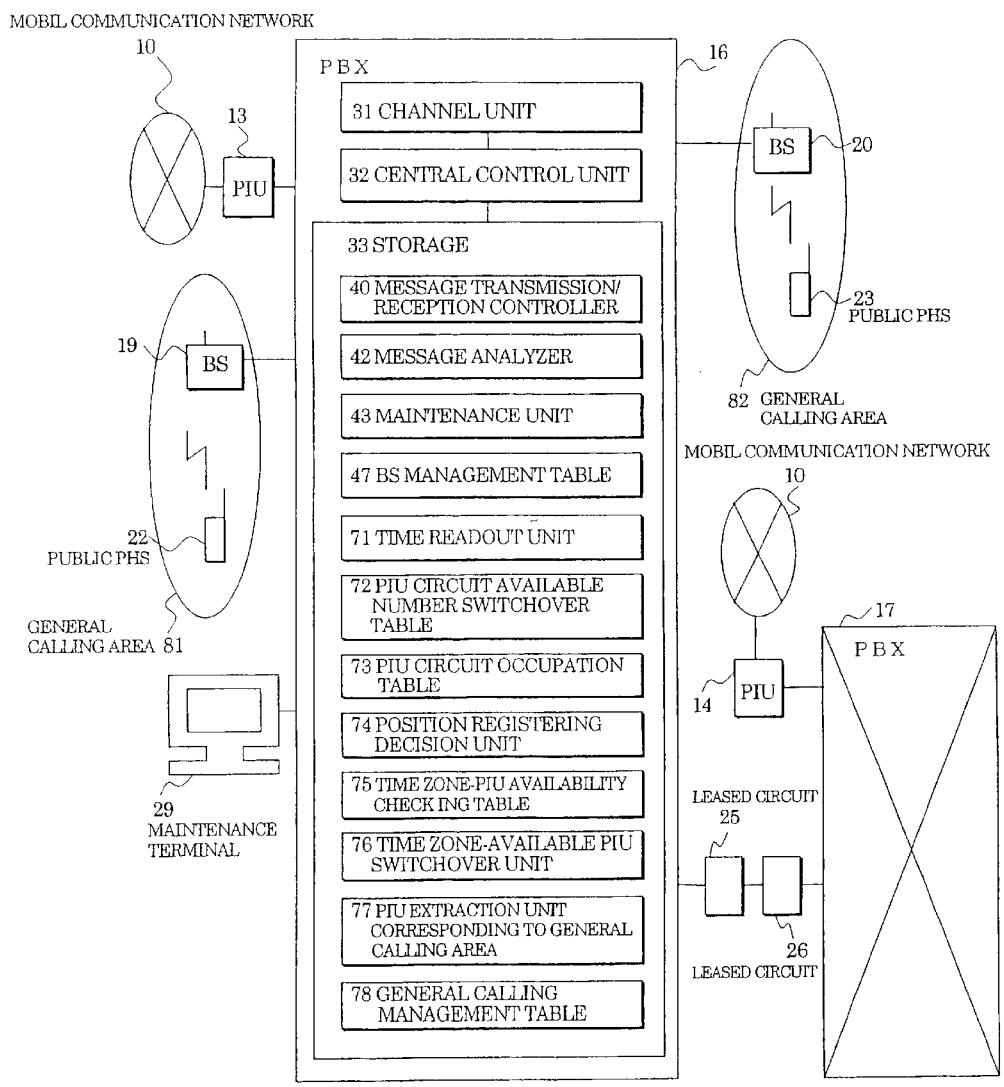
FIG. 41 is a block diagram showing a system arrangement in an embodiment (2) of a mobile communication system according to the present invention.

Next, there will be described as shown in FIG. 41 a procedure by which the PBX 16 switches over PIU's to be used according to the BS's 19 and 20 when a plurality of BS's 19 and 20 are accommodated in the PBX 16 to make the position registration/call transmission.

Figure 49:
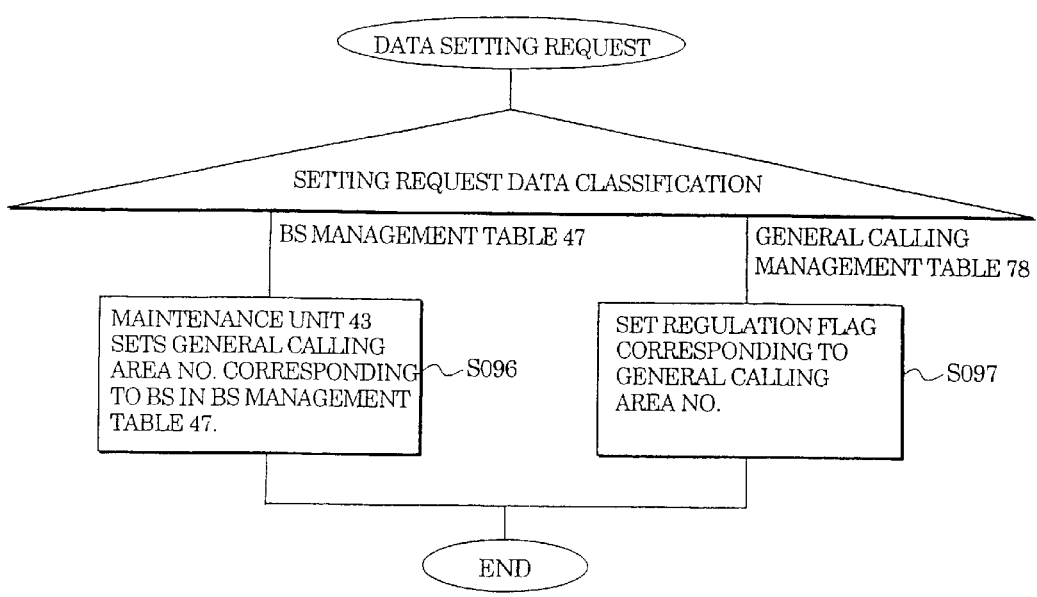
FIG. 49 is a flow chart showing a data setting procedure (3) in an embodiment (2) of a mobile communication system according to the present invention.

FIG. 49 shows a procedure example of presetting data, where the maintenance person of the PBX 16 registers the general calling area No. corresponding to the BS in the BS management table 47 (see FIG. 11).

For example, the maintenance person of the PBX 16 registers "the general calling area No. of BS 19="1" as well as the general calling area No. of BS 20=2" with the BS management table 47 (at step S096).

Figure 50:
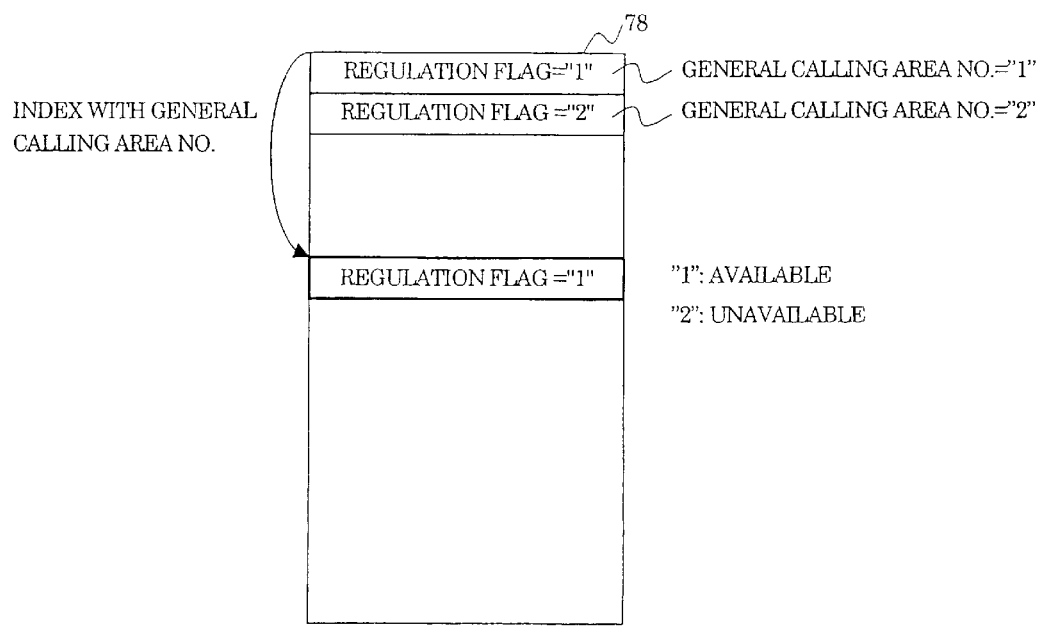
FIG. 50 is a diagram showing an example of a general calling management table in an embodiment (2) of a mobile communication system according to the present invention.

In addition, the maintenance person presets the regulation flag indicating whether or not the PIU 13 is available corresponding to the general calling area No. in the general calling management table 78 shown in FIG. 50 (at step S097 in FIG. 49).

It is to be noted that the regulation flag corresponding to the general calling area No. is set in the general calling management table 78 shown in FIG. 50. The regulation flag="1" indicates "available", while the regulation flag="2" indicates "unavailable".

In FIG. 50, since the regulation flag of the general calling area No.="1" is set to "1", the BS 19 of the general calling area No. "1" is set as "the PIU 13 within the PBX 16 is available". Since the regulation flag of the general calling area No.="2" is set to "2", the BS 20 of the general calling area No. "2" is set as "the PIU 13 within the PBX 16 is unavailable".

Figure 51:
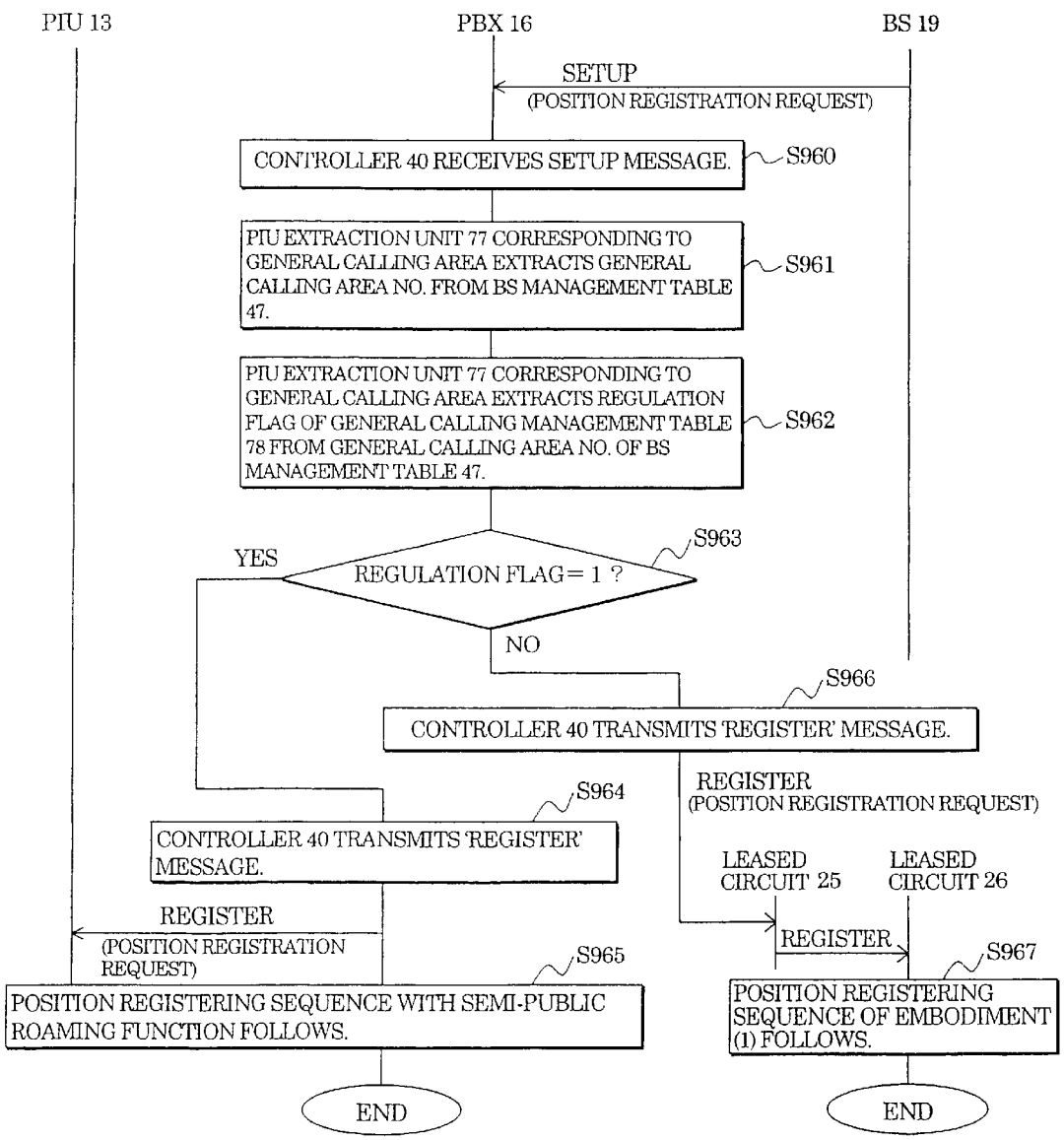
FIG. 51 is a flow chart showing a position registering sequence (3) of an embodiment (2) of a mobile communication system according to the present invention.
Figure 52:
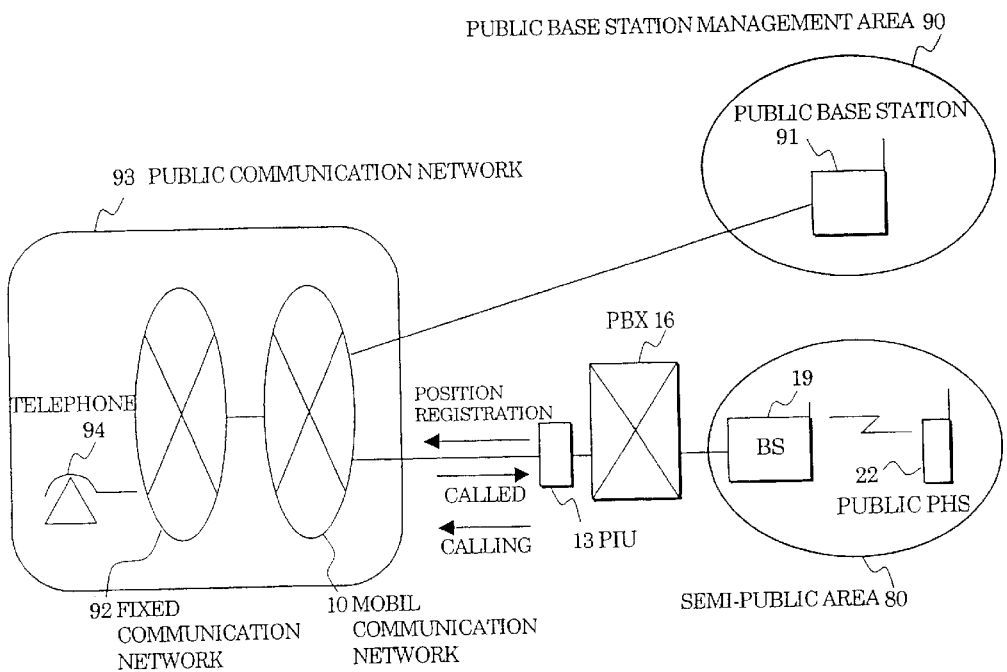
FIG. 52 is a block diagram showing an arrangement of a conventional mobile communication system.
Figure 53:
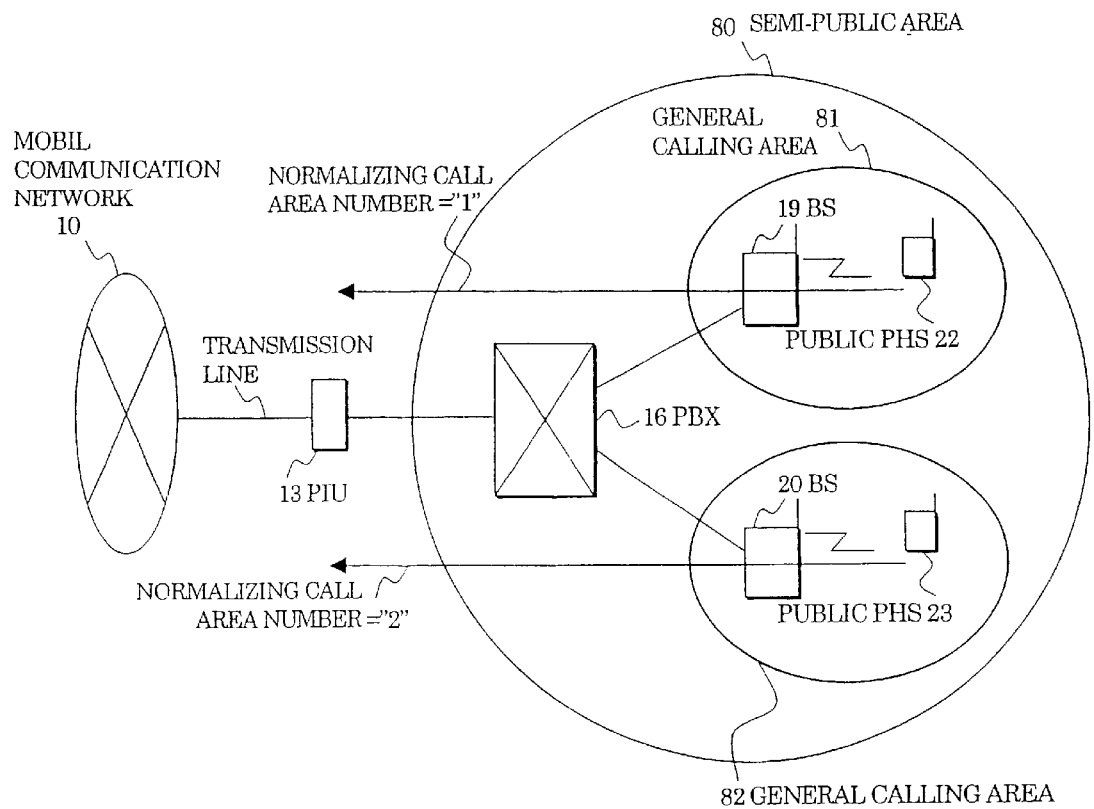
FIG. 53 is a block diagram showing an operation principle of a position registration of a conventional mobile communication system.
Figure 54:
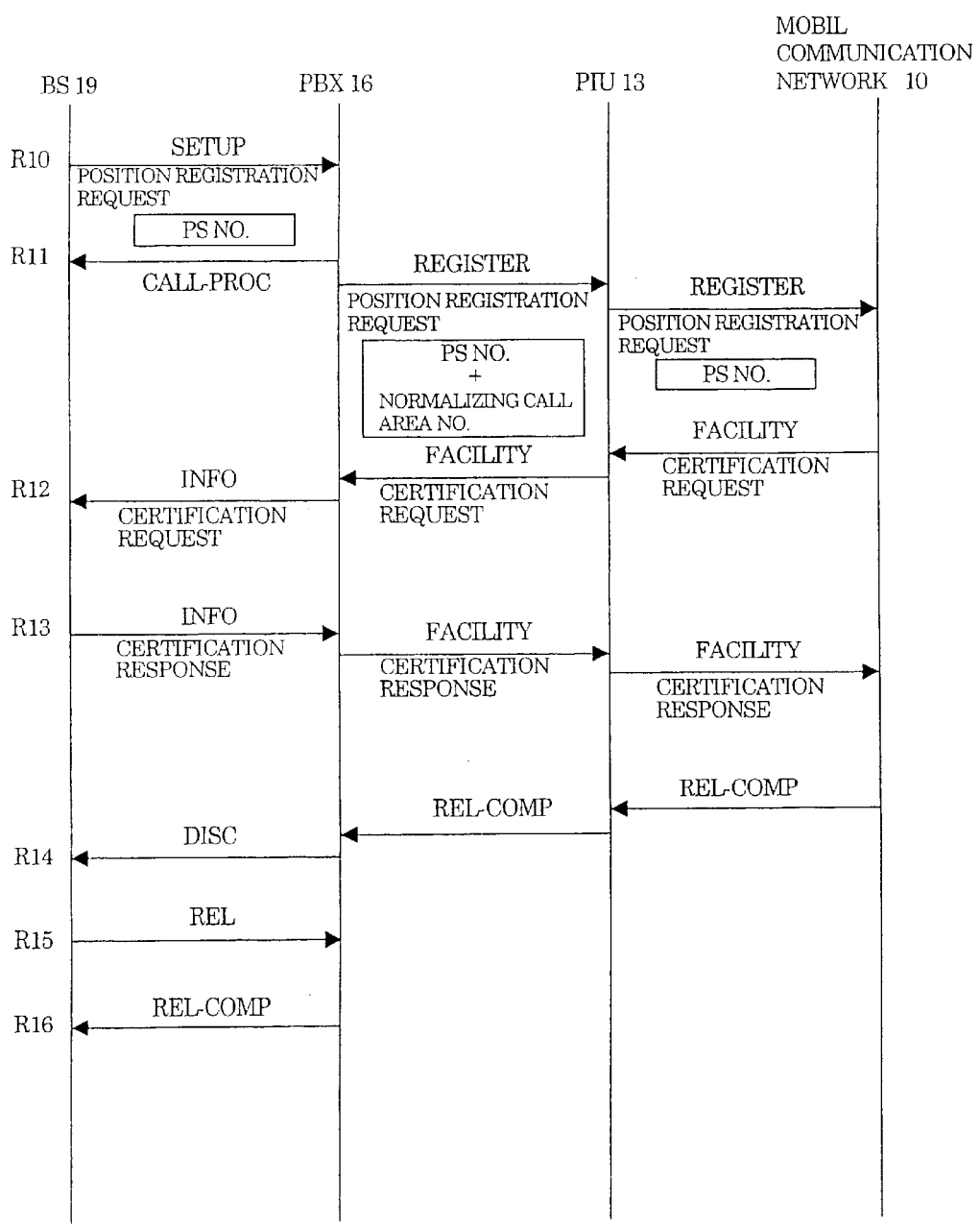
FIG. 54 is a diagram showing a semi-public roaming position registering sequence in a conventional mobile communication system.
Figure 55:
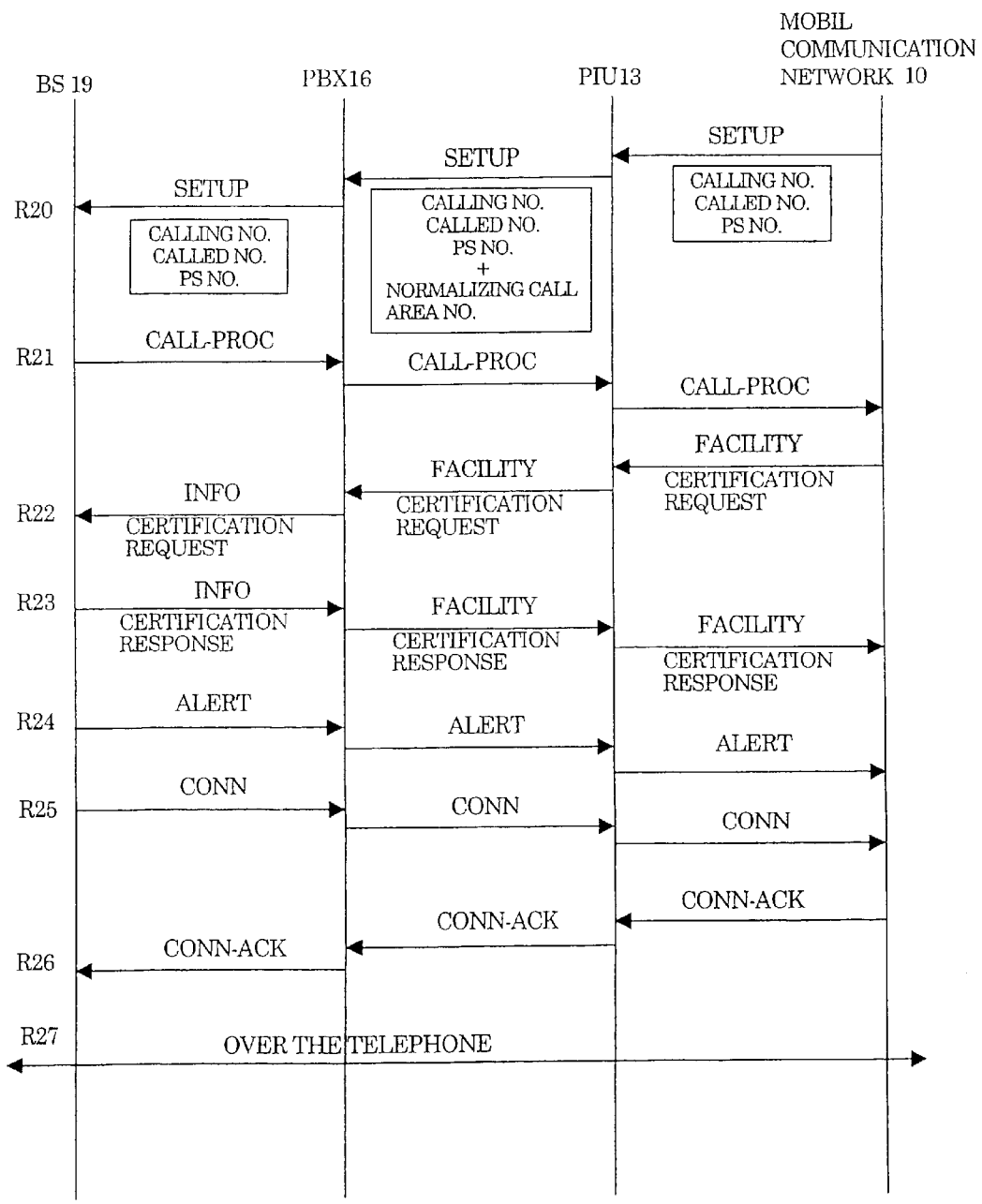
FIG. 55 is a diagram showing a semi-public roaming-called sequence in a conventional mobile communication system.
Figure 56:
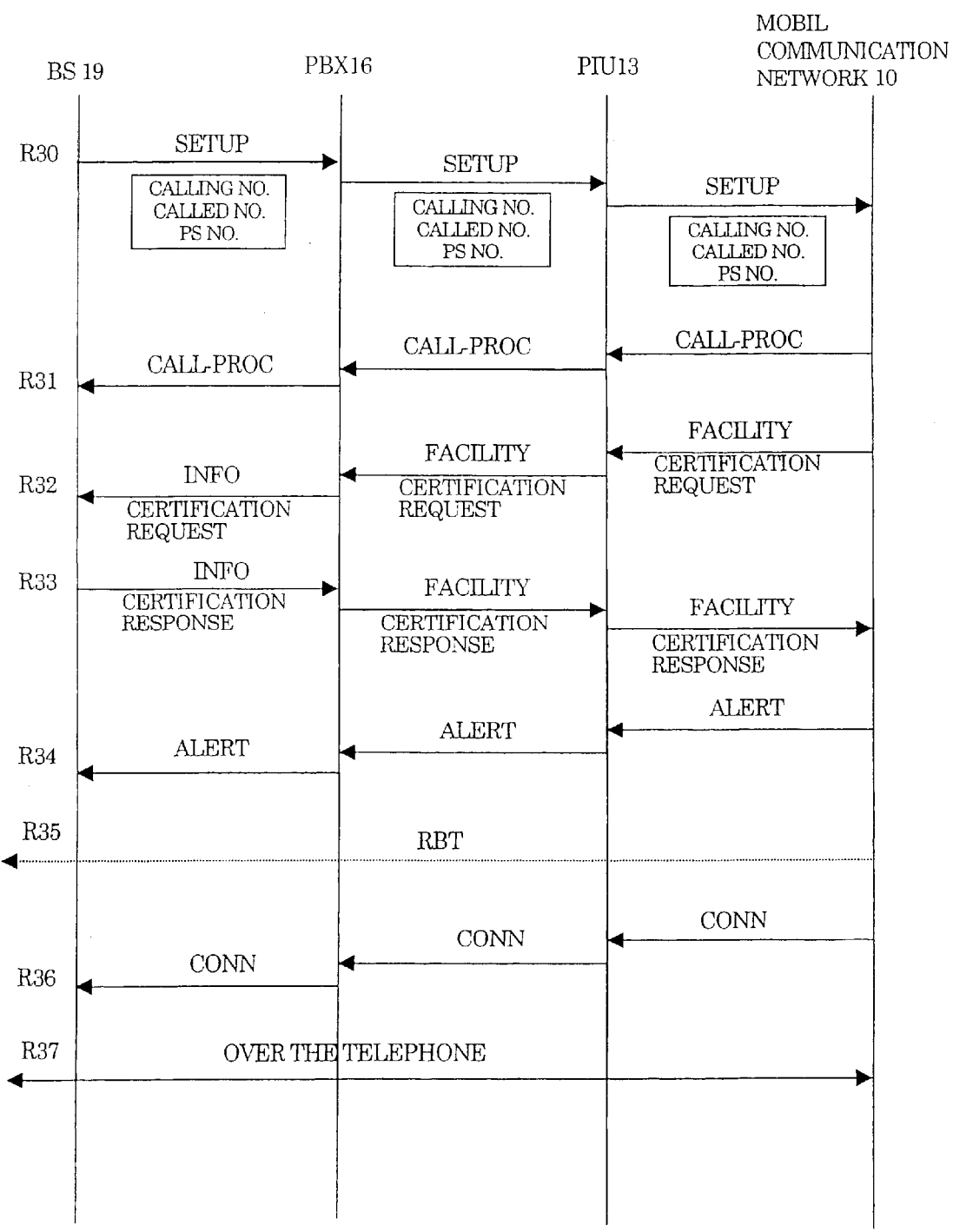
FIG. 56 is a diagram showing a semi-public roaming-calling sequence in a conventional mobile communication system.

In FIG. 51, the message transmission/reception controller 40 receives the SETUP message (position registration) from the PHS's 22 and 23 respectively through the BS's 19 and 20 (at step S960) to activate the extraction unit 77 of each of the PHS's 22 and 23 (BS's 19 and 20).

The extraction unit 77 checks the regulation flag set in the general calling management table 78 corresponding to the general calling area No. set in the BS management table 47 (at steps S961–S963).

When the regulation flag is "1" (available), the extraction unit 77 recognizes that "the position registration at the PIU 13" within the PBX 16 is made, and activates the message transmission/reception controller 40 to transmit the REGISTER message to the PIU 13 (at step S964). Hereinafter, the position registering sequence of the semi-public roaming function will be performed (at step S965).

When the regulation flag is "2" (unavailable), the extraction unit 77 recognizes that "the position registration at the PIU 14 within the PBX 17 is made" through the leased circuit 25, and activates the message transmission/reception controller 40 to transmit the REGISTER message from the leased circuit 25 (at step S966).

The following position registering process is the same as step S106 and the followings of the position registering sequence in the embodiment (1) (at step S967).

It is to be noted that when the call transmission request is made at the PIU 14 of the PBX 17 after the message transmission/reception controller 40 receives the call transmission request at step S960 and performs the same process, the same process as step S206 and followings of the calling sequence may be performed.

As described above, the mobile communication system according to the present invention is arranged such that a first PBX is connected to a second PBX having a semi-public roaming function with a leased circuit, the first PBX transmits a position registration/call transmission request of a PHS received by itself to a mobile communication network through the second PBX, and the second PBX transmits a call reception request addressed to the PHS from the mobile communication network to the PHS through the first PBS. Therefore, following effects can be obtained.

(1) Even when a PIU of the first PBX is not equipped or is in a fault/congestion condition although the PIU is equipped, it becomes possible to transmit/receive the position registration/call transmission request/call reception request between the PHS connected to the first PBX and the mobile communication network and to decrease a call-loss rate at generating/receiving a call by the PHS, which leads to the improvement of service. Also, a new PIU is not required to be equipped on the first PBX, which leads to cost reduction.

(2) Also, if the mobile communication system according to the present invention is arranged such that a plurality of PBX's having the semi-public roaming function are connected to the first PBX with the leased circuit, and the PBX or the PIU through which position registration/call transmission request/call reception request and the like pass is selected corresponding to a usage status of the PIU or the leased circuit, a time zone to communicate, a priority, and a BS, it becomes possible to determine a transmission line easy to connect. This makes it possible to certainly connect the PHS to the mobile communication network.

(3) Also, if the mobile communication system according to the present invention is arranged such that other PBX's are equally selected, an access concentration to a specific PBX can be avoided. This makes it possible to avoid a response delay to a subscriber due to a large load of the specific PBX.

(4) Also, even if the first PBX accommodates the PIU connected to the mobile communication network and has the semi-public roaming function, a repairment, and exchange of a faulted PIU as well as an addition of a new PIU are not essential, which leads to a cost reduction.

Also, even if the PIU which is originally to be equipped is not equipped, the PHS can be connected to the mobile communication network through another PBX.

Furthermore, the PHS can have services of the mobile communication network in a semi-public area of any PBX, resulting in an improved service.

What we claim is:

1. A mobile communication system comprising;
a first exchange for accommodating a base station which communicates with a mobile station, and
a second exchange having a semi-public roaming function connected to the first exchange with a leased circuit and connected to a mobile communication network through an interface unit;
the first exchange having a converting means for converting position information of the mobile station as pre-stored therein into virtual position information peculiar to the mobile communication network and for transmitting the virtual position information to the interface unit through the second exchange, and a decision means for deciding whether to transmit to the mobile communication network through the first exchange itself or through the leased circuit, and
the second exchange having a transmission setting means for setting a transmission of response information from the mobile communication network for the virtual position information to the first exchange.

2. The mobile communication system as claimed in claim 1 wherein the first and the second exchanges comprise PBX's.

3. The mobile communication system as claimed in claim 2 wherein the position information and the virtual position information respectively comprise position registering information and virtual position registering information.

4. The mobile communication system as claimed in claim 3 wherein the position information and the virtual position information respectively comprise calling information and virtual calling information including the position registering information.

5. The mobile communication system as claimed in claim 2 wherein the converting means inverts the virtual position information into the position information.

6. The mobile communication system as claimed in claim 3 wherein the transmission setting means sets a transmission of called information addressed to the mobile station position-registered from the mobile communication network to the first PBX.

7. The mobile communication system as claimed in claim 2 wherein the first PBX is connected to the mobile communication network through an interface unit the first PBX itself accommodates to perform the semi-public roaming function, and
the first PBX transmits the position information to the mobile communication network through its own interface unit when the decision means decides that the interface unit is available, and transmits the position information to the mobile communication network through the second PBX when the decision means decides that the interface unit is unavailable.

8. The mobile communication system as claimed in claim 7 wherein the first PBX is connected to a plurality of PBX's which accommodate the interface unit of the mobile communication network with a leased circuit, and
when its own interface unit is not available, the decision means decides whether or not the leased circuit is available and transmits the position information through the available leased circuit.

9. The mobile communication system as claimed in claim 7 wherein the first PBX includes a means for transmitting an inquiry message inquiring whether or not the accommodated interface unit is available to another PBX through the leased circuit, and
a PBX which has received the inquiry message has a means for returning a response message for the inquiry message.

10. The mobile communication system as claimed in claim 8 wherein PBX's except the first PBX have a means for notifying the first PBX of unit status information indicating whether or not the accommodated interface unit is available, and
the first PBX has a means for transmitting the position information to a PBX which stores the unit status information and accommodates the available interface unit.

11. The mobile communication system as claimed in claim 8 wherein the first PBX has a means for selecting a PBX which accommodates the interface unit based on a preset priority.

12. The mobile communication system as claimed in claim 8 wherein the first PBX has a means for sequentially and equally selecting a PBX which accommodates the interface unit.

13. The mobile communication system as claimed in claim 8 wherein the first PBX has a means for selecting another PBX which forms a transmission object of the position information according to a preset time zone.

14. The mobile communication system as claimed in claim 8 wherein the first PBX has a means for transmitting the position information through an interface unit of another PBX when the circuit available number of its own present interface unit is more than a preset circuit available number.

15. The mobile communication system as claimed in claim 8 wherein the first PBX accommodates a plurality of base stations and has a means for designating a PBX to which the position information is transmitted for each base station.

16. The mobile communication system as claimed in claim 2 wherein the mobile station and the interface unit respectively comprise a PHS and a PHS interface unit.

* * * * *